US011405978B2

(12) United States Patent
Jeon et al.

(10) Patent No.: US 11,405,978 B2
(45) Date of Patent: *Aug. 2, 2022

(54) ACTIVATION OF GRANT-FREE TRANSMISSION

(71) Applicant: Comcast Cable Communications, LLC, Philadelphia, PA (US)

(72) Inventors: Hyoungsuk Jeon, Centreville, VA (US); Esmael Hejazi Dinan, McLean, VA (US); Alireza Babaei, Fairfax, VA (US); Kyungmin Park, Herndon, VA (US); Hua Zhou, Herndon, VA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/024,162

(22) Filed: Sep. 17, 2020

(65) Prior Publication Data

US 2021/0007171 A1    Jan. 7, 2021

Related U.S. Application Data

(63) Continuation of application No. 16/100,974, filed on Aug. 10, 2018, now Pat. No. 10,820,366.
(Continued)

(51) Int. Cl.
| | | |
|---|---|---|
| *H04W 76/27* | (2018.01) | |
| *H04J 11/00* | (2006.01) | |
| *H04W 68/00* | (2009.01) | |
| *H04L 27/26* | (2006.01) | |
| *H04J 13/00* | (2011.01) | |

(Continued)

(52) U.S. Cl.
CPC ......... *H04W 76/27* (2018.02); *H04J 11/0076* (2013.01); *H04J 13/0062* (2013.01); *H04L 5/0044* (2013.01); *H04L 5/0091* (2013.01); *H04L 27/2613* (2013.01); *H04W 68/005* (2013.01); *H04W 72/1268* (2013.01); *H04W 72/1289* (2013.01)

(58) Field of Classification Search
CPC ............... H04W 76/27; H04W 68/005; H04W 72/1268; H04W 72/1289; H04W 74/006; H04J 11/0076; H04J 13/0062; H04L 5/0044; H04L 5/0091; H04L 27/2613; H04L 5/0051; H04L 5/0098
See application file for complete search history.

(56) References Cited

U.S. PATENT DOCUMENTS

| | | |
|---|---|---|
| 2009/0257408 A1 | 10/2009 | Zhang et al. |
| 2011/0003555 A1 | 1/2011 | Guo |

(Continued)

FOREIGN PATENT DOCUMENTS

| | | |
|---|---|---|
| WO | 2017204595 A1 | 11/2017 |

OTHER PUBLICATIONS

Dec. 3, 2018—Extended European Search Report—EP 18188574.0.
(Continued)

*Primary Examiner* — Walter J Divito
(74) *Attorney, Agent, or Firm* — Banner & Witcoff, Ltd.

(57) ABSTRACT

Systems, apparatuses, and methods are described for wireless communications. A base station may send a message to a wireless device to activate grant-free uplink transmissions for a non-activated cell. The wireless device may receive the message and activate a previously non-activated cell.

50 Claims, 21 Drawing Sheets

Related U.S. Application Data

(60) Provisional application No. 62/543,829, filed on Aug. 10, 2017.

(51) Int. Cl.
    *H04L 5/00*     (2006.01)
    *H04W 72/12*    (2009.01)

(56) References Cited

U.S. PATENT DOCUMENTS

| | | |
|---|---|---|
| 2011/0032895 A1 | 2/2011 | Englund et al. |
| 2013/0188612 A1 | 7/2013 | Dinan |
| 2013/0343273 A1 | 12/2013 | Barbieri et al. |
| 2014/0098761 A1 | 4/2014 | Lee et al. |
| 2014/0362832 A1 | 12/2014 | Rudolf et al. |
| 2015/0016352 A1 | 1/2015 | Bressanelli et al. |
| 2015/0208386 A1 | 7/2015 | Yang et al. |
| 2015/0327107 A1 | 11/2015 | Kim et al. |
| 2015/0334769 A1 | 11/2015 | Kim et al. |
| 2016/0150440 A1 | 5/2016 | Lee et al. |
| 2016/0278073 A1 | 9/2016 | Dinan |
| 2018/0070403 A1 | 3/2018 | Uemura et al. |
| 2018/0124648 A1 | 5/2018 | Park et al. |
| 2018/0139734 A1 | 5/2018 | Babaei et al. |
| 2018/0176937 A1 | 6/2018 | Chen et al. |
| 2018/0183551 A1 | 6/2018 | Chou et al. |
| 2018/0279339 A1 | 9/2018 | Lohr et al. |
| 2018/0368107 A1* | 12/2018 | Babaei ............... H04L 27/2608 |
| 2018/0368132 A1* | 12/2018 | Babaei ................ H04L 1/1819 |
| 2020/0022125 A1* | 1/2020 | Li ........................ H04L 5/0005 |
| 2020/0068598 A1* | 2/2020 | Takeda ................ H04L 5/0053 |

OTHER PUBLICATIONS

CATT—Jun. 26, 2017—"Grant-free UL Transmission procedure".
Nokia Siemens Networks Oct. 5, 2010 "MAC CE for Activation Deactivation".
Huawei Sep. 17, 2017 "UL data transmission with and without SR\UL grant".
CATT May 14, 2017 "Further details of UL grant-free transmission for URLLC".
3GPP TR 38.802 V14.1.0 (Jun. 2017), Technical Report, 3rd Generation Partnership Project; Technical Specification Group Radio Access Network; Study on New Radio Access Technology Physical Layer Aspects (Release 14).
3GPP TR 38.804 V14.1.0 (Mar. 2017), Technical Report, 3rd Generation Partnership Project, Technical Specification Group Radio Access Network, Study on New Radio Access Technology, Radio Interface Protocol Aspects (Release 14).
3GPP TS 36.321 V.14.3.0 (Jun. 2017); Technical Specification; 3rd Generation Partnership Project; Technical Specification Group Radio Access Network; Evolved Universal Terrestrial Radio Access (E-UTRA); Medium Access Dontrol (MAC) protocol specification (Release 14).
3GPP TSG RAN WG1 Meeting #90, Prague, Czech Republic, Aug. 21-25, 2017, Title: RAN1 Chairman's Notes.
3GPP TSG RAN WG1 Meeting NR#3, Nagoya, Japan, Sep. 18-21, 2017, Title: RAN1 Chairman's Notes.
3GPP TSG RAN WG2 #99, Berlin, Germany, Aug. 21-25, 2017, Source: Vice-Chairwoman (InterDigital), Title Report from LTE and NR User Plane Break-Out Session.
3GPP TSG-RAN WG2 NR Ad Hoc, Qingdao, China, Jun. 27-30, 2017, Source: RAN1 Chairman, Object: Chairman Notes.
R1-1706901 3GPP TSG-RAN WG1 #89, Hangzhou, China, May 15-19, 2017, Source: Huawei, HiSilicon, Title: TB napping for slot aggregation.
R1-1706909 3GPP TSG-RAN WG1 #89, Hangzhou, China, May 15-19, 2017, Source: Huawei, HiSilicon, Title: On uplink data scheduling.
R1-1706914 3GPP TSG-RAN WG1 #89, Hangzhou, China, May 15-19, 2017, Source: Huawei, HiSilicon, Title: Numerology for multiplexing of eMBB and URLLC.
R1-1707166 3GPP TSG-RAN WG1 #89, Hangzhou, China, May 15-19, 2017, Source: ZTE, Title: HARQ for URLLC UL Grant-free transmission.
R1-1707176 3GPP TSG-RAN WG1 #89, Hangzhou, China, May 15-19, 2017, Source: ZTE, Title: Multiplexing data with different transmission durations.
R1-1707195 3GPP TSG-RAN WG1 #89, Hangzhou, China, May 15-19, 2017, Source: FiberHome, Title: Discussion on resource allocation for NR.
R1-1707237 3GPP TSG-RAN WG1 #89, Hangzhou, China, May 15-19, 2017, Source: vivo, Title: Discussion on flexible length scheduling.
R1-1707508 3GPP TSG-RAN WG1 #89, Hangzhou, China, May 15-19, 2017, Source: CATT, Title: NR DL scheduling mechanism.
R1-1707656 3GPP TSG-RAN WG1 #89, Hangzhou, China, May 15-19, 2017, Source: LG Electronics, Title: Consideration on HARQ-ACK feedback method for NR.
R1-1707662 3GPP TSG-RAN WG1 #89, Hangzhou, China, May 15-19, 2017, Source: LG Electronics, Title: Consideration on CB group based HARQ-ACK feedback.
R1-1708017 3GPP TSG-RAN WG1 #89, Hangzhou, China, May 15-19, 2017, Source: Samsung, Title: DL Resource Allocation Aspects.
R1-1709991 3GPP TSG-RAN WG1 NR Ad Hoc, Qingdao, China, Jun. 27-30, 2017, Source: Huawei, HiSilicon, Title: Resource configuration on UL transmission without grant.
R1-1710015 3GPP TSG-RAN WG1 NR Ad Hoc, Qingdao, China, Jun. 27-30, 2017, Source: ZTE, Title: Considerations on the procedures of UL data transmission without grant.
R1-1710094 3GPP TSG-RAN WG1 NR Ad Hoc, Qingdao, China, Jun. 27-30, 2017, Source: CATT, Title: Grant-free UL transmission procedure.
R1-1710327 3GPP TSG-RAN WG1 NR Ad Hoc, Qingdao, China, Jun. 27-30, 2017, Source: LG Electronics, Title: Discussion on UL transmission without grant.
R1-1710380 3GPP TSG-RAN WG1 NR Ad Hoc, Qingdao, China, Jun. 27-30, 2017, Source: vivio, Title: Discussion on UL grant-free transmission.
R1-1710568 3GPP TSG-RAN WG1 NR Ad Hoc, Qingdao, China, Jun. 27-30, 2017, Source: Intel Corporation, Title: UL grant-free transmissions: Resource configuration.
R1-1710621 3GPP TSG-RAN WG1 NR Ad Hoc, Qingdao, China, Jun. 27-30, 2017, Source: ETRI, Title: Resource allocation and transmission scheme for URLLC grant-free transmission.
R1-1710723 3GPP TSG-RAN WG1 NR Ad Hoc, Qingdao, China, Jun. 27-30, 2017, Source: Samsung, Title: Procedures for Grant-Free UL Transmissions.
R1-1710724 3GPP TSG-RAN WG1 NR Ad Hoc, Qingdao, China, Jun. 27-30, 2017, Source: Samsung, Title: Grant-fee and grant-based UL transmissions.
R1-1710887 3GPP TSG-RAN WG1 NR Ad Hoc, Qingdao, China, Jun. 27-30, 2017, Source: Intel Corporation, Title: UL grant-free transmissions: Physical layer procedures.
R1-1710963 3GPP TSG-RAN WG1 NR Ad Hoc, Qingdao, China, Jun. 27-30, 2017, Source: NEC, Title: On network resources and UE transmission configurations for grant-free access.
R1-1710971 3GPP TSG-RAN WG1 NR Ad Hoc, Qingdao, China, Jun. 27-30, 2017, Source: China Telecom, Title: UL grant-free transmission for URLLC.
R1-1711006 3GPP TSG-RAN WG1 NR Ad Hoc, Qingdao, China, Jun. 27-30, 2017, Source: Institute for Information Industry (III), Title: Issues and Control Design for UL Grant-free URLLC.
R1-1711111 3GPP TSG-RAN WG1 NR Ad Hoc, Qingdao, China, Jun. 27-30, 2017, Source: NTT Docomo, Inc., Title: Overall solutions for UL grant free transmission.
R1-1711253 3GPP TSG-RAN WG1 NR Ad Hoc, Qingdao, China, Jun. 27-30, 2017, Source: NICT, Title: Resource configuration for UL transmission without grant.
R1-1711504 3GPP TSG-RAN WG1 NR Ad Hoc, Qingdao, China, Jun. 27-30, 2017, Source: Ericsson, Title: On SPS/Grant-Free Transmission.

(56) References Cited

OTHER PUBLICATIONS

R1-1712689 3GPP TSG RAN WG1 Meeting #90, Prague, Czech Republic, Aug. 21-25, 2017, Source: Lenovo, Motorola Mobility, Title: HARQ design for uplink grant-free transmission.
R1-1712743 3GPP TSG RAN WG1 Meeting #90, Prague, Czech Republic, Aug. 21-25, 2017, Source: Fujitsu, Title: Discussions on HARQ for grant-free transmission.
R1-1712823 3GPP TSG RAN WG1 Meeting #90, Prague, Czech Republic, Aug. 21-25, 2017, Source: Orange, China Unicom, Nokia, Nokia Shanghai Bell, Ericsson, ZTE, Apple, Title: WF on Scenario 1.
R1-1712863 3GPP TSG RAN WG1 Meeting #90, Prague, Czech Republic, Aug. 21-25, 2017, Source: vivo, Title: Discussion on UL grant-free transmission.
R1-1713189 3GPP TSG RAN WG1 Meeting #90, Prague, Czech Republic, Aug. 21-25, 2017, Source: LG Electronics, Title: Discussion on UL transmission without grant.
R1-1713639 3GPP TSG RAN WG1 Meeting #90, Prague, Czech Republic, Aug. 21-25, 2017, Source: Samsung, Title: Procedures for Grant-Free UL Transmissions.
R1-1714011 3GPP TSG RAN WG1 Meeting #90, Prague, Czech Republic, Aug. 21-25, 2017, Source: Nokia, Nokia Shanghai Bell, Title: UL transmission procedure without grant.
R1-1715419 3GPP TSG RAN WG1 Meeting NR Ad Hoc, Nagoya, Japan, Sep. 18-21, 2017, Source: Huawei, HiSilicon, Title: UL data transmission with and without SR/UL grant.
R1-1715425 3GPP TSG RAN WG1 Meeting NR Ad Hoc, Nagoya, Japan, Sep. 18-21, 2017, Source: Huawei, HiSilicon, Title: Overview of bandwidth part, CA, and DC operation including SRS switching.
R1-1715490 3GPP TSG RAN WG1 Meeting NR Ad Hoc, Nagoya, Japan, Sep. 18-21, 2017, Source: Fujitsu, Title: Discussions on HARQ for UL data transmission without grant.
R1-1715492 3GPP TSG RAN WG1 Meeting NR Ad Hoc, Nagoya, Japan, Sep. 18-21, 2017, Source: Fujitsu, Title: Considerations on UCI feedback for carrier aggregation.
R2-1706589 3GPP TSG-RAN WG2 NR Ad Hoc, Qingdao, China, Jun. 27-29, 2017, Source: Nokia, Alcatel-Lucent Shanghai Bell, Title: Unified SPS and Grant-free operation.
R2-1706645 3GPP TSG-RAN WG2 NR Ad Hoc, Qingdao, China, Jun. 27-29, 2017, Source: ZTE, Title: Consideration on the multiple SPS and grant free.
R2-1706687 3GPP TSG-RAN WG2 NR Ad Hoc, Qingdao, China, Jun. 27-29, 2017, Source: InterDigital, Title: SPS and Grant-free operation for NR.
R2-1707098 3GPP TSG-RAN WG2 NR Ad Hoc, Qingdao, China, Jun. 27-29, 2017, Source: Samsung, Title: Uplink SPS and Grant-free Transmission Aspects.
R2-1707174 3GPP TSG-RAN WG2 NR Ad Hoc, Qingdao, China, Jun. 27-29, 2017, Source: Ericsson, Title: Grant Free and Semi-Persistent Scheduling in NR.
R2-1707Z47 3GPP TSG-RAN WG2 NR Ad Hoc, Qingdao, China, Jun. 27-29, 2017, Source: Huawei, HiSilicon, Title: Modelling of Grant free and SPS.
R2-1707Z68 3GPP TSG-RAN WG2 NR Ad Hoc, Qingdao, China, Jun. 27-29, 2017, Source: MediaTek Inc., Title: Comparison of SPS and grant-free schemes.
R2-1707500 3GPP TSG-RAN WG2 NR Ad Hoc, Quingdao, China, Jun. 27-29, 2017, Source: Vice-Chairwoman (InterDigital), Title: Report from NR User Plane Break-Out Session.
R2-170873Z 3GPP TSG RAN WG2 #99, Berlin, Germany, Aug. 21-25, 2017, Source: InterDigital, Title: SPS and grant free operation.
R2-1708956 3GPP TSG RAN WG2 #99, Berlin, Germany, Aug. 21-25, Z017, Source: Huawei, HiSilicon, Title: Considerations on SPS and TTI-bundling in EN-DC.
R2-17091Z5 3GPP TSG RAN WG2 #99, Berlin, Germany, Aug. 21-25, 2017, Source: Qualcomm, Title: On reliable transmission of URLLC data.
R2-1709264 3GPP TSG RAN WG2 #99, Berlin, Germany, Aug. 21-25, 2017, Source: Huawei, HiSilicon, Title Discussion on type 1 grant-free for connected mode UE.
R2-1710134 3GPP TSG RAN WG2 Meeting #99bis, Prague, Czech Republic, Oct. 9-13, 2017, Source: OPPO, Title: SPS operations for BWP switching.
R2-1710662 3GPP TSG RAN WG2 Meeting #99bis, Prague, Czech Republic, Oct. 9-13, 2017, Source InterDigital, Inc., Title: SPS and grant free operation.
R2-1710958 3GPP TSG RAN WG2 Meeting #99bis, Prague, Czech Republic, Oct. 9-13, 2017, Source: vivo, Title Duplication deactivation due to Scell or BWP deactivation.
R2-1711441 3GPP TSG RAN WG2 Meeting #99bis, Prague, Czech Republic, Oct. 9-13, 2017, Source: Huawei, HiSilicon, Title: MAC impact of bandwidth part activation/deactivation.
R2-1711613 3GPP TSG RAN WG2 Meeting #99bis, Prague, Czech Republic, Oct. 9-13, 2017, Source: LG Electronics, Title: PHR for wider bandwidth operation.
R2-1711643 3GPP TSG RAN WG2 Meeting #99bis, Prague, Czech Republic, Oct. 9-13, 2017, Source: Intel Corporation, Title: Activation of SCell containing BWPs.
R2-1711856 3GPP TSG-RAN WG2 #99bis, Prague, Czech Republic, Oct. 9-13, 2017, Source: RAN2, Title: LS to RAN1 on SPS and Grant-free.
R2-1711904 3GPP Tsg Ran WG2 Meeting #99bis, Prague, Czech Republic, Oct. 9-13, 2017, Source: Qualcomm Incorporated, Title: UE Power Saving during Active State.
R2-1711993 3GPP TSG-RAN WG2 #99bis, Prague, Czech Republic, Oct. 9-13, 2017, Source: RAN2, Title: LS to RAN1 on SPS and Grant-free.
Jul. 14, 2020—European Extended Search Report—EP 20177046.8.
R1-1707511 3GPP TSG-RAN WG1 Meeting #89, Hangzhou, China, May 15-19, 2017, Source: CATT, Title: Further details of UL grant-free transmission for URLLC.
R1-1715517 3GPP TSG RAN WG1 Meeting NR Ad Hoc, Nagoya, Japan, Sep. 18-21, 2017, Source: Spreadtrum Communications, Title: Consideration on monitoring preemption indication in bandwidth parts.
R1-1715535 3GPP TSG RAN WG1 Meeting NR Ad Hoc, Nagoya, Japan, Sep. 18-21, 2017, Source: Lenovo, Motorola Mobility, Title: HARQ-ACK codebook size determination for CA with different numerologies.
R1-1715548 3GPP TSG RAN WG1 Meeting NR Ad Hoc, Nagoya, Japan, Sep. 18-21, 2017, Source: Nokia, Nokia Shanghai Bell, Title: Remaining issues on UL transmission without grant.
R1-1715562 3GPP TSG RAN WG1 Meeting NR Ad Hoc, Nagoya, Japan, Sep. 18-21, 2017, Source: ZTE, Sanechips, Title: Further discussion on UL transmission without grant.
R1-1715645 3GPP TSG RAN WG1 Meeting NR Ad Hoc, Nagoya, Japan, Sep. 18-21, 2017, Source: vivo, Title: Support of UL data transmission without grant.
R1-1715648 3GPP TSG RAN WG1 Meeting NR Ad Hoc, Nagoya, Japan, Sep. 18-21, 2017, Source: vivo, Title: Remaining details for bandwidth part operation.
R1-1715662 3GPP TSG RAN WG1 Meeting NR Ad Hoc, Nagoya, Japan, Sep. 18-21, 2017, Source: NEC, Title: Remaining issues on UL transmission without grant.
R1-1715692 3GPP TSG RAN WG1 Meeting NR Ad Hoc, Nagoya, Japan, Sep. 18-21, 2017, Source: Guangdong OPPO Mobile Telecom, Title: Remaining issues on bandwidth part configuration and activation.
R1-1715755 3GPP TSG RAN WG1 Meeting NR Ad Hoc, Nagoya, Japan, Sep. 18-21, 2017, Source: Nokia, Nokia Shanghai Bell, Title: On remaining aspects of NR CA/DC and BWPs.
R1-1715769 3GPP TSG RAN WG1 Meeting NR Ad Hoc, Nagoya, Japan, Sep. 18-21, 2017, Source: ETRI, Title: DL HARQ-ACK for GF PUSCH transmission.
R1-1715770 3GPP TSG RAN WG1 Meeting NR Ad Hoc, Nagoya, Japan, Sep. 18-21, 2017, Source: ETRI, Title: Remaining details of bandwidth part for initial access.

(56) References Cited

OTHER PUBLICATIONS

R1-1715774 3GPP TSG RAN WG1 Meeting NR Ad Hoc, Nagoya, Japan, Sep. 18-21, 2017, Source: Panasonic, Title: Combining DRX with BWP adaptation.
R1-1715830 3GPP TSG RAN WG1 Meeting NR Ad Hoc, Nagoya, Japan, Sep. 18-21, 2017, Source: CATT, Title: Remaining aspects of CA and wider bandwidth operation.
R1-1715888 3GPP TSG RAN WG1 Meeting NR Ad Hoc, Nagoya, Japan, Sep. 18-21, 2017, Source: LG Electronics, Title: Discussion on UL data transmission procedure.
R1-1715892 3GPP TSG RAN WG1 Meeting NR Ad Hoc, Nagoya, Japan, Sep. 18-21, 2017, Source: LG Electronics, Title: Discussion on carrier aggregation and bandwidth parts.
R1-1716019 3GPP TSG RAN WG1 Meeting NR Ad Hoc, Nagoya, Japan, Sep. 18-21, 2017, Source: Samsung, Title: On Bandwidth Part Operation.
R1-1716107 3GPP TSG RAN WG1 Meeting NR Ad Hoc, Nagoya, Japan, Sep. 18-21, 2017, Source: NTT Docomo, Inc., Title: UL data transmission without UL grant.
R1-1716109 3GPP TSG RAN WG1 Meeting NR Ad Hoc, Nagoya, Japan, Sep. 18-21, 2017, Source: NTT Docomo,Inc., Title: Remaing issues on bandwidth parts for NR.
R1-1716192 3GPP TSG RAN WG1 Meeting NR Ad Hoc, Nagoya, Japan, Sep. 18-21, 2017, Source: AT&T, Title: Remaining Details of Carrier Aggregation and Bandwidth Parts.
R1-1716202 3GPP TSG RAN WG1 Meeting NR Ad Hoc, Nagoya, Japan, Sep. 18-21, 2017, Source: MediaTek Inc., Title: Remaining Details on Bandwidth Part Operation in NR.
R1-1716258 3GPP TSG RAN WG1 Meeting NR Ad Hoc, Nagoya, Japan, Sep. 18-21, 2017, Source: InterDigital, Inc., Title: Remaining details of BWP.
R1-1716327 3GPP TSG RAN WG1 Meeting NR Ad Hoc, Nagoya, Japan, Sep. 18-21, 2017, Source: Intel Corporation, Title: Remaining aspects for carrier aggregation and bandwidth parts.
R1-1716440 3GPP TSG RAN WG1 Meeting NR Ad Hoc, Nagoya, Japan, Sep. 18-21, 2017, Source: Qualcomm Incorporated, Title: CA and BWP.
R1-1716483 3GPP TSG RAN WG1 Meeting NR Ad Hoc, Nagoya, Japan, Sep. 18-21, 2017, Source: InterDigital, Inc., Title: On remaining details of UL data transmission without grant.
R1-1716597 3GPP TSG RAN WG1 Meeting NR Ad Hoc, Nagoya, Japan, Sep. 18-21, 2017, Source: Ericsson, Title: On UL Data Transmission Procedure.
R1-1716601 3GPP TSG RAN WG1 Meeting NR Ad Hoc, Nagoya, Japan, Sep. 18-21, 2017, Source: Ericsson, Title: On CA related aspects and BWP related aspects.
R1-1716623 3GPP TSG RAN WG1 Meeting NR Ad Hoc, Nagoya, Japan, Sep. 18-21, 2017, Source: MediaTek Inc., Title: On UL data transmission without grant design and configuration.
R1-1716647 3GPP TSG RAN WG1 Meeting NR Ad Hoc, Nagoya, Japan, Sep. 18-21, 2017, Source: Convida Wireless, Title: Discussion on BWP Design.
R1-1717077 3GPP TSG RAN WG1 Meeting #90bis, Prague, Czech Republic, Oct. 9-13, 2017, Source: Huawei, HiSilicon, Title: Remaining issues on bandwidth part.
R1-1717400 3GPP TSG RAN WG1 Meeting #90bis, Prague, Czech Republic, Oct. 9-13, 2017, Source: Intel Corporation, Title: Remaining details for bandwidth parts.
R1-1717504 3GPP TSG RAN WG1 Meeting #90bis, Prague, Czech Republic, Oct. 9-13, 2017, Source: vivo, Title Remaining details for bandwidth part operation.
R1-1717675 3GPP TSG RAN WG1 Meeting #90bis, Prague, Czech Republic, Oct. 9-13, 2017, Source: Samsung, Title: On Bandwidth Part Operation.
R1-1717839 3GPP TSG RAN WG1 Meeting #90bis, Prague, Czech Republic, Oct. 9-13, 2017, Source: CATT, Title: Remaining aspects of BWP operation.
R1-1717972 3GPP TSG RAN WG1 Meeting #90bis, Prague, Czech Republic, Oct. 9-13, 2017, Source: LG Electronics, Title: Remaining issues on bandwidth parts.
R1-1718050 3GPP TSG RAN WG1 Meeting #90bis, Prague, Czech Republic, Oct. 9-13, 2017, Source: OPPO, Title: Remaining issues on bandwidth part configuration and activation.
R1-1718223 3GPP TSG RAN WG1 Meeting #90bis, Prague, Czech Republic, Oct. 9-13, 2017, Source: NTT Docomo, Inc., Title: Remaing issues on bandwidth parts for NR.
R1-1718327 3GPP TSG RAN WG1 Meeting #90bis, Prague, Czech Republic, Oct. 9-13, 2017, Source: MediaTek Inc., Title: Remaining Details on Bandwidth Part Operation in NR.
R1-1718365 3GPP TSG RAN WG1 Meeting #90bis, Prague, Czech Republic, Oct. 9-13, 2017, Source InterDigital, Inc., Title: Remaining details of BWP.
R1-1718404 3GPP TSG RAN WG1 Meeting #90bis, Prague, Czech Republic, Oct. 9-13, 2017, Source: AT&T, Title: Remaining details for bandwidth parts.
R1-1718523 3GPP TSG RAN WG1 Meeting #90bis, Prague, Czech Republic, Oct. 9-13, 2017, Source: Ericsson, Title: On bandwidth parties.
R1-1718580 3GPP TSG RAN WG1 Meeting #90bis, Prague, Czech Republic, Oct. 9-13, 2017, Source: Qualcomm Incorporated, Title: Open Issues on BWP.
R1-1718607 3GPP TSG RAN WG1 Meeting #90bis, Prague, Czech Republic, Oct. 9-13, 2017, Source: Nokia, Nokia Shanghai Bell, Title: On remaining aspects of BWPs.
R1-171xxxx 3GPP TSG-RAN WG1 NR Ad Hoc, Qingdao, China, Jun. 27-30, 2017, Source: LG Electronics, Title [draft] Summary of [89-22] Email discussion about UL data transmission without UL grant.
R1-17xXXXX 3GPP TSG RAN WG1 Meeting #90, Prague, Czech Republic, Aug. 21-25, 2017, Source: NTT Docomo, Inc., Title: Offline discussions on some topics for AI 6.1.3.1.
R2-1703453 3GPP TSG-RAN WG2 #97bis, Spokane, USA, Apr. 3-7, 2017, Source: Samsung, Title: HARQ for Numerology Multiplexing.
R2-1704479 3GPP TSG-RAN WG1 #98, Hangzhou, China, May 15-19, 2017, Source: Samsung, Title: The number of TBs per UL HARQ process.
R2-1704505 3GPP TSG-RAN WG1 #98, Hangzhou, China, May 15-19, 2017, Source: Samsung, Title: HARQ for numerology multiplexing.
R2-1704684 3GPP TSG-RAN WG1 #98, Hangzhou, China, May 15-19, 2017, Source: Ericsson, Title: Enhanced HARQ feedback mode in SPS.
R2-1706417 3GPP TSG-RAN WG2 NR Ad Hoc, Qingdao, China, Jun. 27-29, 2017, Source: CATT, Title: Grant-free transmission and SPS.
R2-1706448 3GPP TSG-RAN WG2 NR Ad Hoc, Qingdao, China, Jun. 27-29, 2017, Source: Spreadtrum Communications, Title: Discussion on UL grant-free transmission.

* cited by examiner

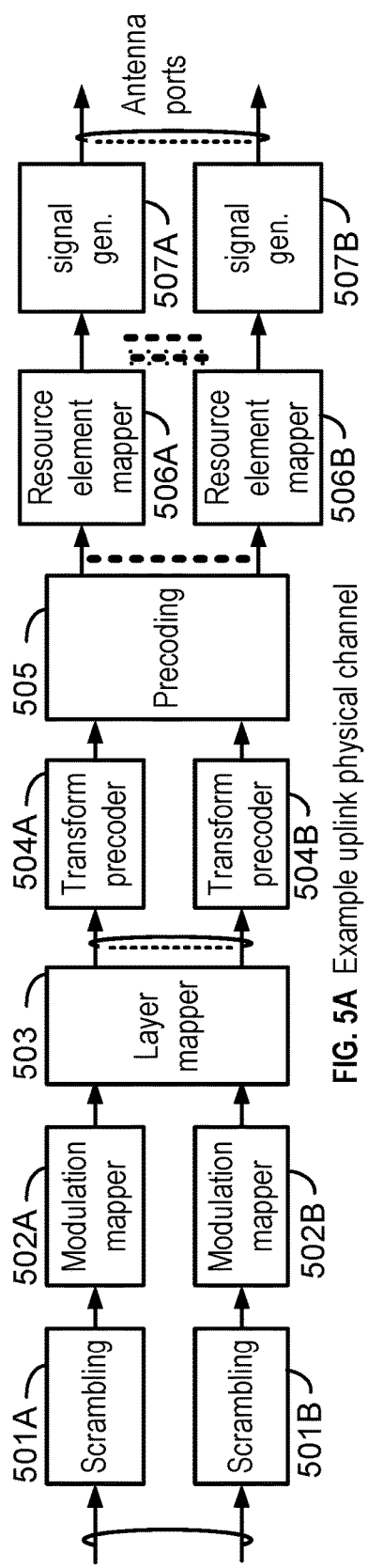
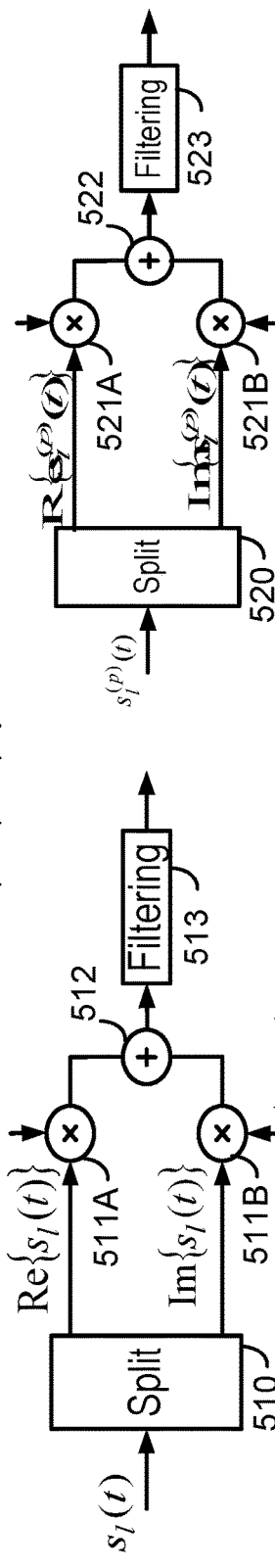
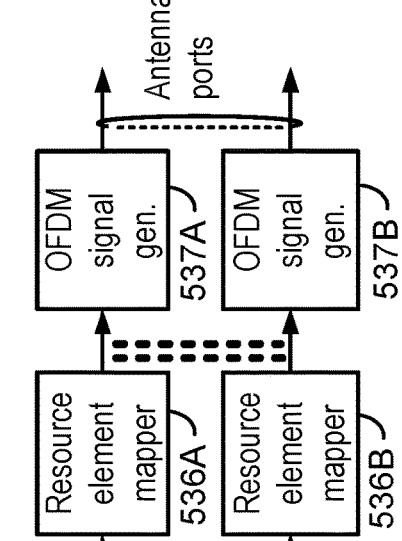
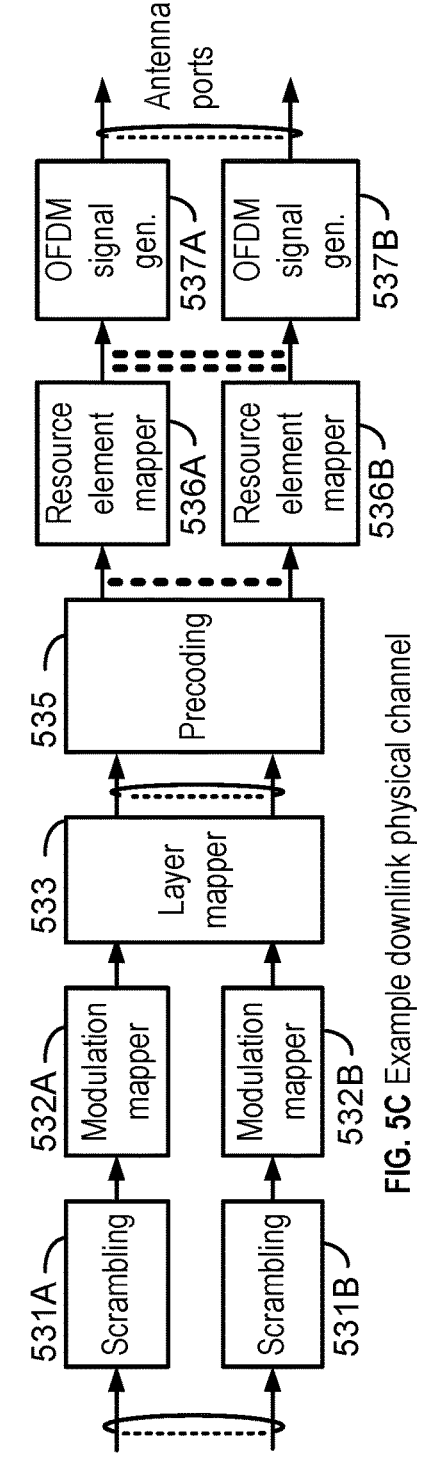
FIG. 5A Example uplink physical channel
FIG. 5B Example uplink modulation
FIG. 5C Example downlink physical channel
FIG. 5D Example downlink modulation

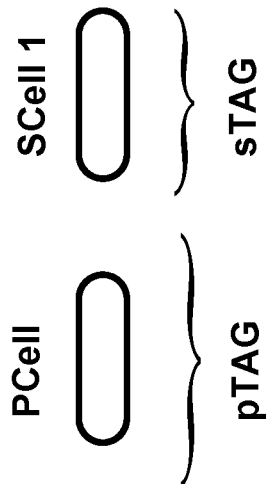
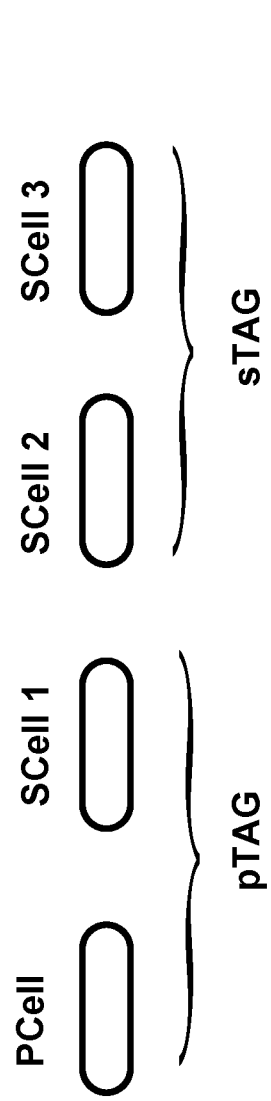
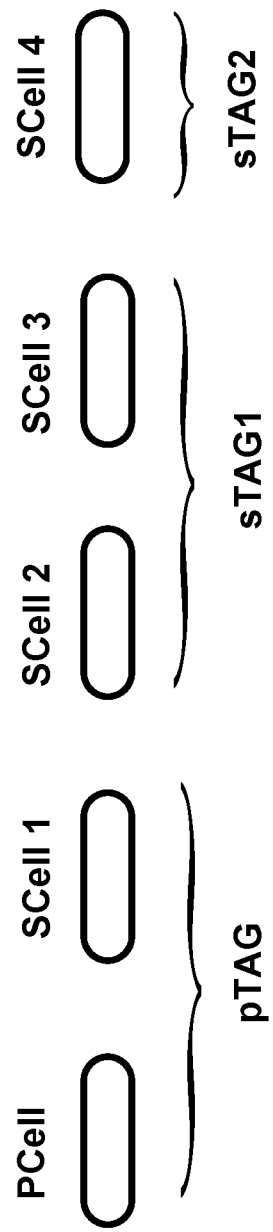
FIG. 8

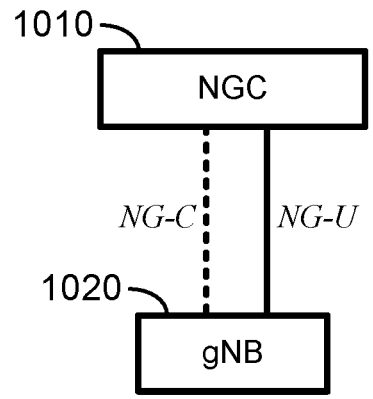
FIG. 10A gNB connected to NGC
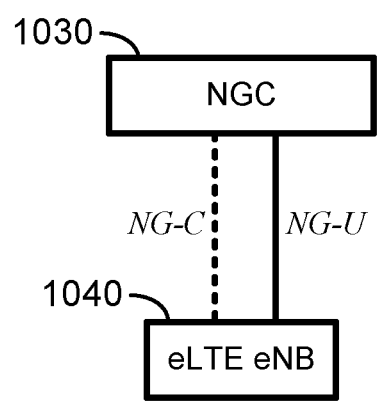
FIG. 10B eLTE eNB connected to NGC

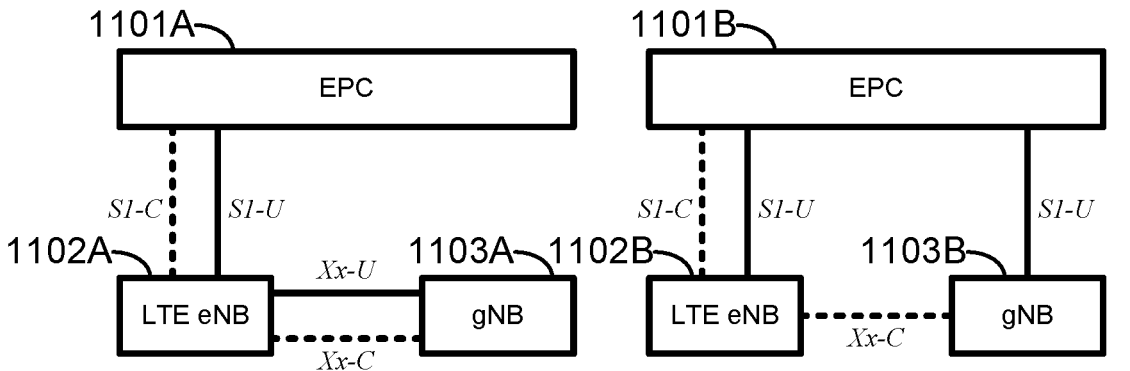

FIG. 11A LTE eNB connected to EPC with non-standalone gNB.
gNB user plane connected to EPC via LTE eNB.

FIG. 11B LTE eNB connected to EPC with non-standalone gNB.
gNB user plane connected to EPC directly.

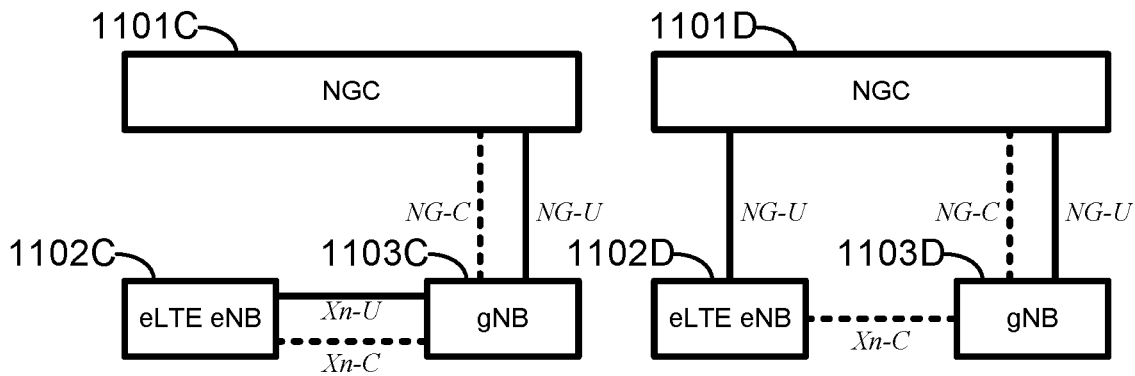

FIG. 11C gNB connected to NGC with non-standalone eLTE eNB.
eLTE eNB user plane connected to NGC via gNB.

FIG. 11D gNB connected to NGC with non-standalone eLTE eNB.
eLTE eNB user plane connected to NGC directly.

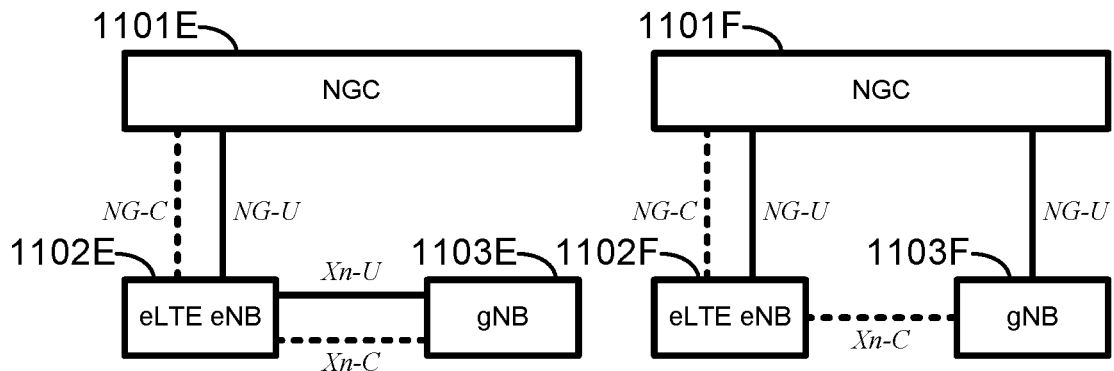

FIG. 11E eLTE eNB connected to NGC with non-standalone gNB.
gNB user plane connected to NGC via eLTE eNB.

FIG. 11F eLTE eNB connected to NGC with non-standalone gNB.
gNB user plane connected to NGC directly.

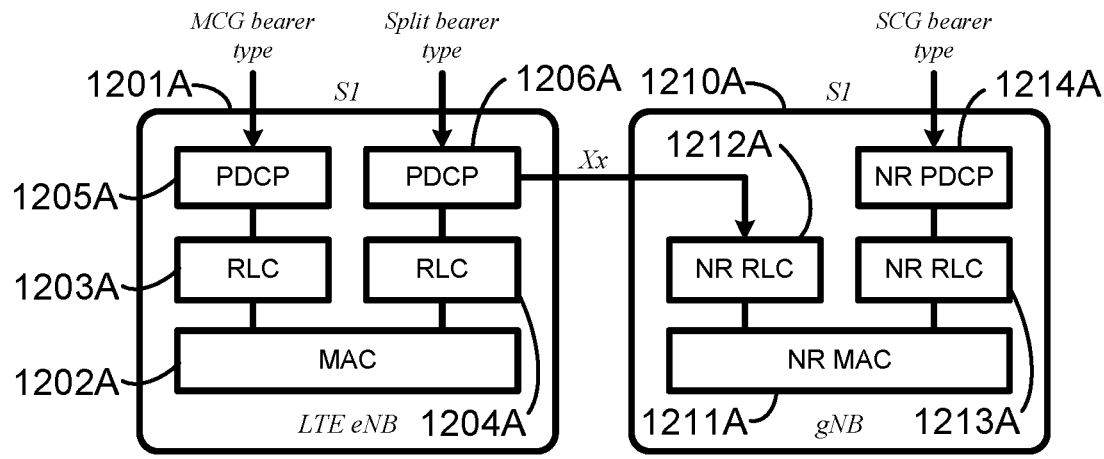
FIG. 12A Radio protocol architecture for split bearer and SCG bearer. LTE eNB connected to EPC with non-standalone gNB.
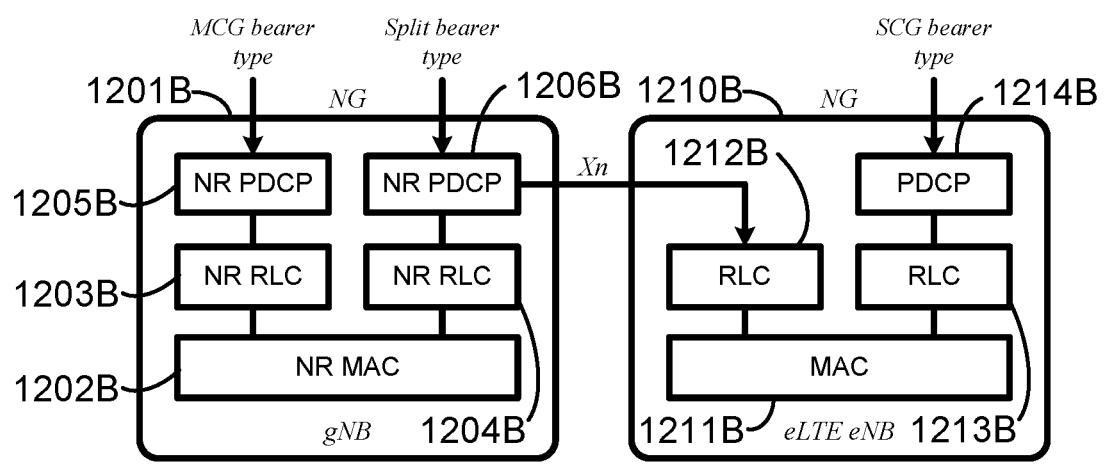
FIG. 12B Radio protocol architecture for split bearer and SCG bearer. gNB connected to NGC with non-standalone eLTE eNB.
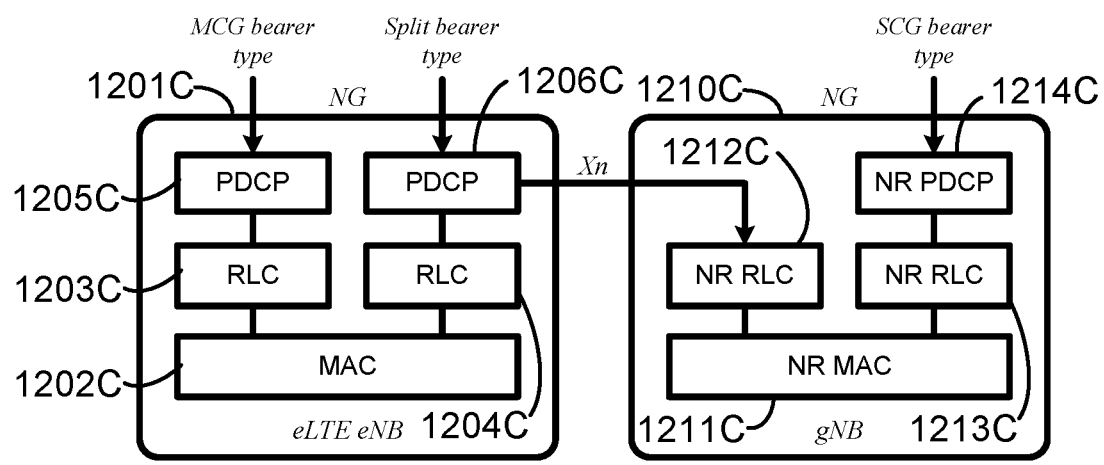
FIG. 12C Radio protocol architecture for split bearer and SCG bearer. eLTE eNB connected to NGC with non-standalone gNB.

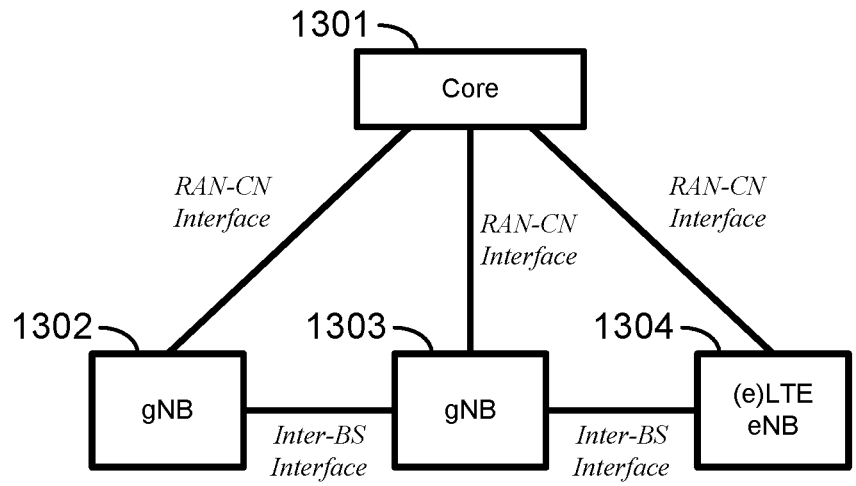
FIG. 13A Non-centralized deployment
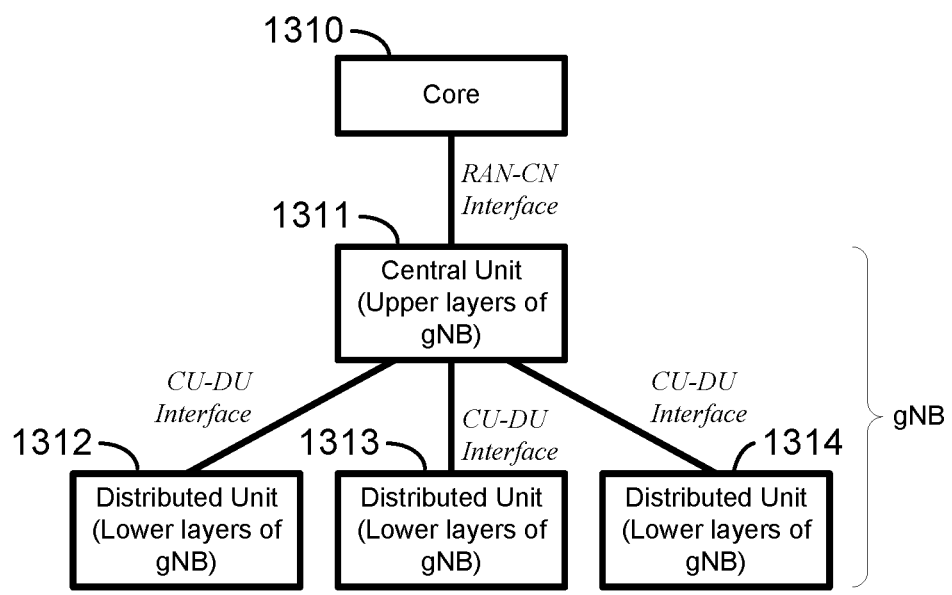
FIG. 13B Centralized deployment

ACTIVATION OF GRANT-FREE TRANSMISSION

CROSS-REFERENCE TO RELATED APPLICATIONS

This application claims priority to and is a continuation of U.S. application Ser. No. 16/100,974, filed Aug. 10, 2018, which claims the benefit of U.S. Provisional Application No. 62/543,829, titled "Activation of Grant-Free Transmission" and filed on Aug. 10, 2017, the disclosures of which are hereby incorporated by reference in their entirety.

BACKGROUND

In wireless communications, a plurality of categories of services may be provided. These categories may comprise evolved mobile broadband (eMBB), ultra-reliable and low-latency communications (URLLC), and massive machine-type communications (mMTC).

SUMMARY

The following summary presents a simplified summary of certain features. The summary is not an extensive overview and is not intended to identify key or critical elements.

Systems, apparatuses, and methods are described for communications associated with one or more categories of services, such as ultra-reliable low latency communication (URLLC). For example, URLLC may have stringent requirements on latency and reliability. URLLC traffic may be sporadic or periodic and packet sizes of URLLC traffic may depend on time and may vary in different transmissions. A wireless device may not finish an uplink (UL) transmission within the resources allocated by a base station. Different requirements for URLLC may necessitate a different treatment of URLLC traffic, such as the varying packet sizes of URLLC may require a flexible radio resource allocation that may reflect the change of packet size. A grant-free (GF) radio resource pool may be used, e.g., to allocate exclusive or partially overlapped one or more radio resources for GF UL transmissions in a cell or to organize frequency/time reuse between different cells or parts of a cell.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A, FIG. 5B, FIG. 5C and FIG. 5D show examples for uplink and downlink signal transmission.

FIG. 8 shows example timing advance group (TAG) configurations.

FIG. 10A and FIG. 10B show examples for interfaces between a 5G core network and base stations.

FIG. 11A, FIG. 11B, FIG. 11C, FIG. 11D, FIG. 11E, and FIG. 11F show examples for architectures of tight inter-working between 5G RAN and long term evolution (LTE) radio access network (RAN).

FIG. 12A, FIG. 12B, and FIG. 12C show examples for radio protocol structures of tight interworking bearers.

FIG. 13A and FIG. 13B show examples for gNodeB (gNB) deployment.

DETAILED DESCRIPTION

Figure 1:
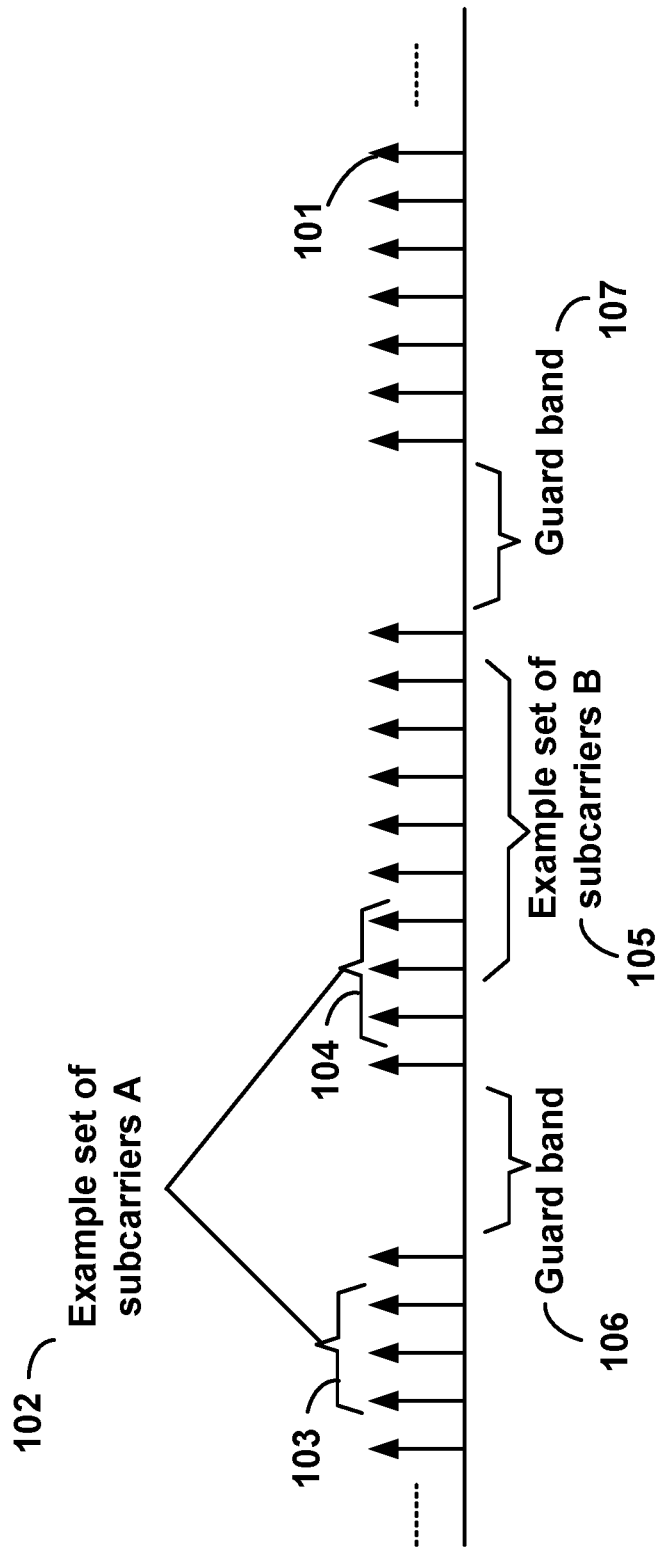
FIG. 1 shows example sets of orthogonal frequency division multiplexing (OFDM) subcarriers.

The accompanying drawings, which form a part hereof, show examples of the disclosure. It is to be understood that the examples shown in the drawings and/or discussed herein are non-exclusive and that there are other examples of how the disclosure may be practiced.

Examples may enable operation of carrier aggregation and may be employed in the technical field of multicarrier communication systems. Examples may relate to grant-free transmission in multicarrier communication systems.

The following acronyms are used throughout the present disclosure, provided below for convenience although other acronyms may be introduced in the detailed description:
3GPP 3rd Generation Partnership Project
5G 5th generation wireless systems
5GC 5G Core Network
ACK Acknowledgement
AMF Access and Mobility Management Function
ASIC application-specific integrated circuit
BPSK binary phase shift keying
CA carrier aggregation
CC component carrier
CDMA code division multiple access
CP cyclic prefix
CPLD complex programmable logic devices
CSI channel state information
CSS common search space
CU central unit
DC dual connectivity
DCI downlink control information
DFTS-OFDM discrete Fourier transform spreading OFDM
DL downlink
DU distributed unit
eLTE enhanced LTE eMBB enhanced mobile broadband
eNB evolved Node B
EPC evolved packet core
E-UTRAN evolved-universal terrestrial radio access network
FDD frequency division multiplexing
FPGA field programmable gate arrays
Fs-C Fs-control plane
Fs-U Fs-user plane
gNB next generation node B
HARQ hybrid automatic repeat request
HDL hardware description languages
ID identifier
IE information element
LTE long term evolution
MAC media access control
MCG master cell group
MeNB master evolved node B
MIB master information block
MME mobility management entity
mMTC massive machine type communications
NACK Negative Acknowledgement
NAS non-access stratum
NG CP next generation control plane core
NGC next generation core
NG-C NG-control plane
NG-U NG-user plane
NR MAC new radio MAC
NR PDCP new radio PDCP
NR PHY new radio physical
NR RLC new radio RLC
NR RRC new radio RRC
NR new radio
NSSAI network slice selection assistance information
OFDM orthogonal frequency division multiplexing
PCC primary component carrier
PCell primary cell
PDCCH physical downlink control channel
PDCP packet data convergence protocol
PDU packet data unit
PHICH physical HARQ indicator channel
PHY physical
PLMN public land mobile network
PSCell primary secondary cell
pTAG primary timing advance group
PUCCH physical uplink control channel
PUSCH physical uplink shared channel
QAM quadrature amplitude modulation
QPSK quadrature phase shift keying
RA random access
RACH random access channel
RAN radio access network
RAP random access preamble
RAR random access response
RB resource blocks
RBG resource block groups
RLC radio link control
RRC radio resource control
RRM radio resource management
RV redundancy version
SCC secondary component carrier
SCell secondary cell
SCG secondary cell group
SC-OFDM single carrier-OFDM
SDU service data unit
SeNB secondary evolved node B
SFN system frame number
S-GW serving gateway
SIB system information block
SC-OFDM single carrier orthogonal frequency division multiplexing
SRB signaling radio bearer
sTAG(s) secondary timing advance group(s)
TA timing advance
TAG timing advance group
TAI tracking area identifier
TAT time alignment timer
TDD time division duplexing
TDMA time division multiple access
TTI transmission time interval
TB transport block
UE user equipment
UL uplink
UPGW user plane gateway
URLLC ultra-reliable low-latency communications
VHDL VHSIC hardware description language
Xn-C Xn-control plane
Xn-U Xn-user plane
Xx-C Xx-control plane
Xx-U Xx-user plane Examples may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 shows example sets of OFDM subcarriers. As shown in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is shown as an example, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As shown in FIG. 1, guard band 106 is between subcarriers 103 and subcarriers 104. The example set of subcarriers A 102 includes subcarriers 103 and subcarriers 104. FIG. 1 also shows an example set of subcarriers B 105. As shown, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
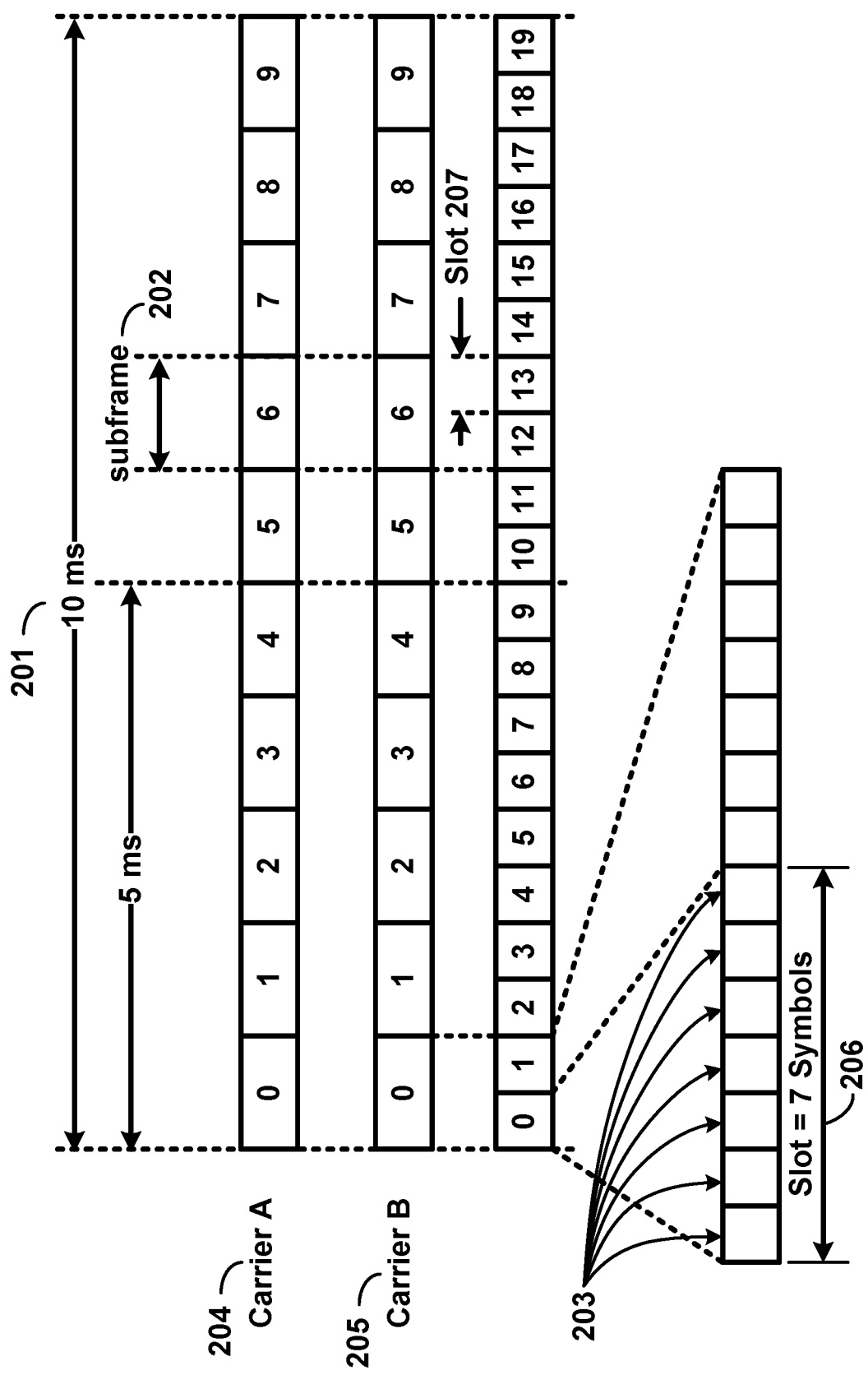
FIG. 2 shows example transmission time and reception time for two carriers in a carrier group.

FIG. 2 shows an example with transmission time and reception time for two carriers. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 milliseconds (msec). Other frame durations, for example, in the range of 1 to 100 msec may also be supported. In this example, each 10 msec radio frame 201 may be divided into ten equally sized subframes 202. Other subframe durations such as including 0.5 msec, 1 msec, 2 msec, and 5 msec may also be supported. Subframe(s) may consist of two or more slots (e.g., slots 206 and 207). For the example of FDD, 10 subframes may be available for downlink transmission and 10 subframes may be available for uplink transmissions in each 10 msec interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may include all downlink, all uplink, or a downlink part and an uplink part, and/or alike. Slot aggregation may be supported, e.g., data transmission may be scheduled to span one or multiple slots. For example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
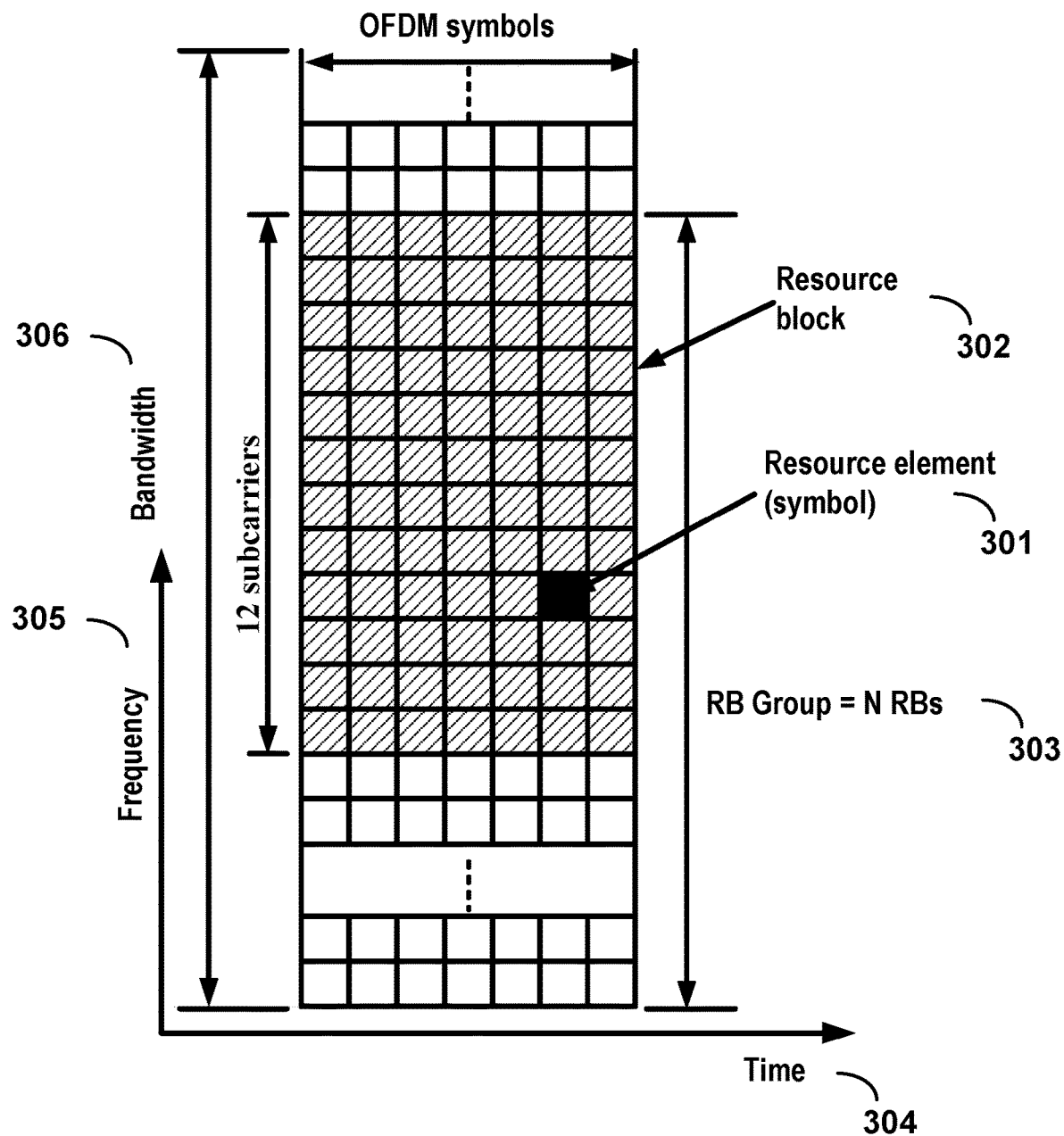
FIG. 3 shows example OFDM radio resources.

FIG. 3 shows an example of OFDM radio resources. The resource grid structure in time 304 and frequency 305 is shown in FIG. 3. The quantity of downlink subcarriers or RBs may depend, at least in part, on the downlink transmission bandwidth 306 configured in the cell. The smallest radio resource unit may be called a resource element (e.g., 301). Resource elements may be grouped into resource blocks (e.g., 302). Resource blocks may be grouped into larger radio resources called Resource Block Groups (RBG) (e.g., 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. A resource block may correspond to one slot in the time domain and 180 kHz in the frequency domain (for 15 kHz subcarrier bandwidth and 12 subcarriers).

Multiple numerologies may be supported. A numerology may be derived by scaling a basic subcarrier spacing by an integer N. Scalable numerology may allow at least from 15 kHz to 480 kHz subcarrier spacing. The numerology with 15 kHz and scaled numerology with different subcarrier spacing with the same CP overhead may align at a symbol boundary every 1 msec in a NR carrier.

Figure 4:
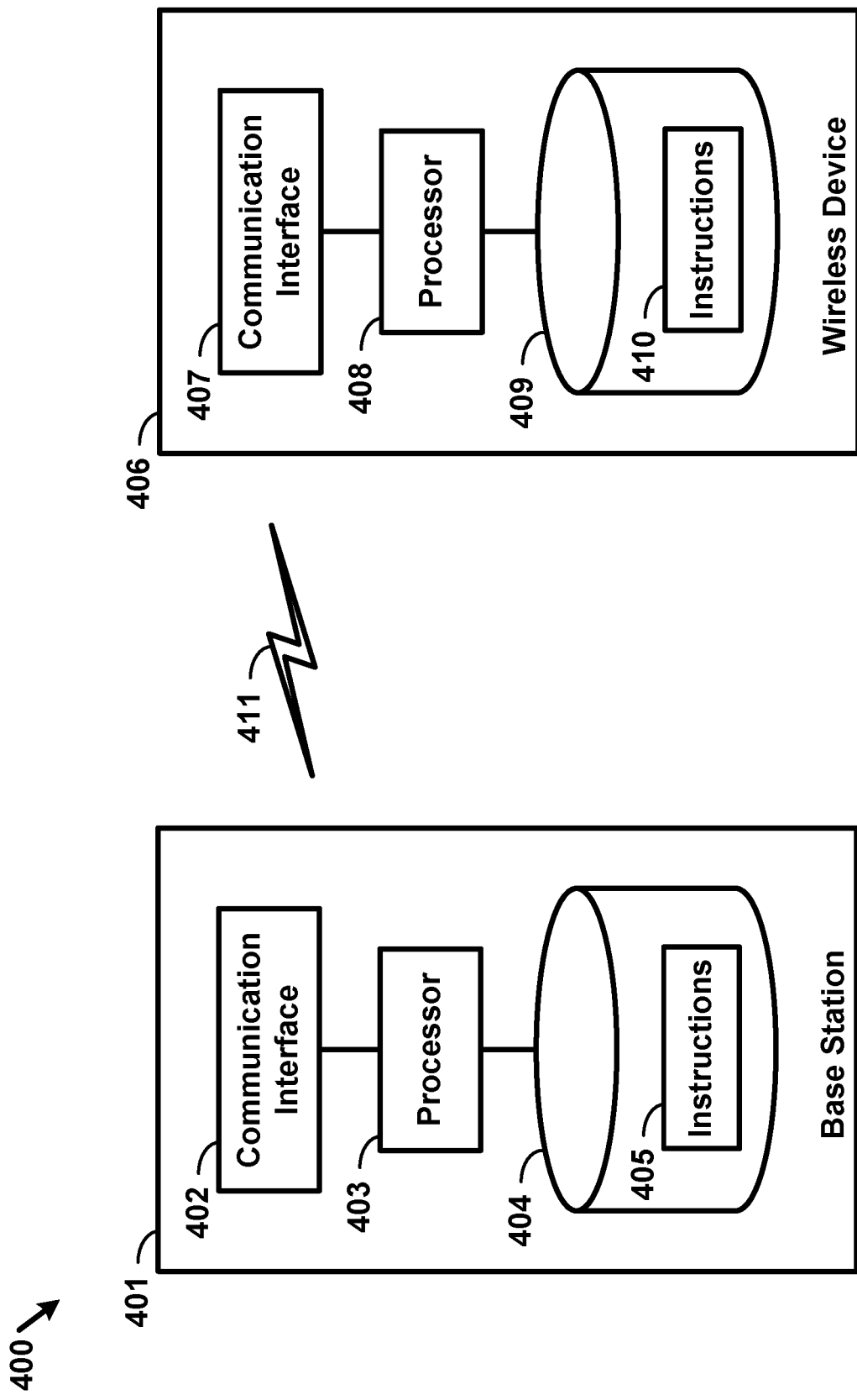
FIG. 4 shows hardware elements of a base station and a wireless device.

FIG. 4 shows hardware elements of a base station 401 and a wireless device 406. A communication network 400 may include at least one base station 401 and at least one wireless device 406. The base station 401 may include at least one communication interface 402, one or more processors 403, and at least one set of program code instructions 405 stored in non-transitory memory 404 and executable by the one or more processors 403. The wireless device 406 may include at least one communication interface 407, one or more processors 408, and at least one set of program code instructions 410 stored in non-transitory memory 409 and executable by the one or more processors 408. A communication interface 402 in the base station 401 may be configured to engage in communication with a communication interface 407 in the wireless device 406, such as via a communication path that includes at least one wireless link 411. The wireless link 411 may be a bi-directional link. The communication interface 407 in the wireless device 406 may also be configured to engage in communication with the communication interface 402 in the base station 401. The base station 401 and the wireless device 406 may be configured to send and receive data over the wireless link 411 using multiple frequency carriers. Base stations, wireless devices, and other communication devices may include structure and operations of transceiver(s). A transceiver is a device that includes both a transmitter and receiver. Transceivers may be employed in devices such as wireless devices, base stations, relay nodes, and/or the like. Examples for radio technology implemented in the communication interfaces 402, 407 and the wireless link 411 are shown in FIG. 1, FIG. 2, FIG. 3, FIG. 5, and associated text. The communication network 400 may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network 400, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

The communications network 400 may comprise Radio Access Network (RAN) architecture. The RAN architecture may comprise one or more RAN nodes that may be a next generation Node B (gNB) (e.g., 401) providing New Radio (NR) user plane and control plane protocol terminations towards a first wireless device (e.g. 406). A RAN node may be a next generation evolved Node B (ng-eNB), providing Evolved UMTS Terrestrial Radio Access (E-UTRA) user plane and control plane protocol terminations towards a second wireless device. The first wireless device may communicate with a gNB over a Uu interface. The second wireless device may communicate with a ng-eNB over a Uu interface. Base station 401 may comprise one or more of a gNB, ng-eNB, and/or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_INACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or a non-operational state. Configured may also refer to specific settings in a device that effect the operational characteristics of the device whether the device is in an operational or a non-operational state. In other words, the hardware, software, firmware, registers, memory values, and/or the like may be "configured" within a device, whether the device is in an operational or a nonoperational state, to provide the device with specific characteristics. Terms such as "a control message to cause in a device" may mean that a control message has parameters that may be used to configure specific characteristics in the device, whether the device is in an operational or a non-operational state.

A 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g., employing an Xn interface). The base stations may also be connected employing, for example, an NG interface to an NGC. FIG. 10A and FIG. 10B show examples for interfaces between a 5G core network (e.g., NGC) and base stations (e.g., gNB and eLTE eNB). For example, the base stations may be interconnected to the NGC control plane (e.g., NG CP) employing the NG-C interface and to the NGC user plane (e.g., UPGW) employing the NG-U interface. The NG interface may support a many-to-many relation between 5G core networks and base stations.

A base station may include many sectors, for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g., TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC); in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC); in the uplink, the carrier corresponding to an SCell may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or cell index may also identify the downlink carrier or uplink carrier of the cell (depending on the context in which it is used). The cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, reference to a first physical cell ID for a first downlink carrier may indicate that the first physical cell ID is for a cell comprising the first downlink carrier. The same concept may apply to, for example, carrier activation. Reference to a first carrier that is activated may indicate that the cell comprising the first carrier is activated.

A device may be configured to operate as needed by freely combining any of the examples. The disclosed mechanisms may be performed if certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. If the one or more criteria are met, various examples may be applied. Therefore, it may be possible to implement examples that selectively implement disclosed protocols.

A base station may communicate with a variety of wireless devices. Wireless devices may support multiple technologies, and/or multiple releases of the same technology. Wireless devices may have some specific capability(ies) depending on its wireless device category and/or capability(ies). A base station may comprise multiple sectors. Reference to a base station communicating with a plurality of wireless devices may indicate that a base station may communicate with a subset of the total wireless devices in a coverage area. A plurality of wireless devices of a given LTE or 5G release, with a given capability and in a given sector of the base station, may be used. The plurality of wireless devices may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

A base station may transmit (e.g., to a wireless device) one or more messages (e.g. RRC messages) that may comprise a plurality of configuration parameters for one or more cells. One or more cells may comprise at least one primary cell and at least one secondary cell. An RRC message may be broadcasted or unicasted to the wireless device. Configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). The other SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. If allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

If CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. If adding a new SCell, dedicated RRC signaling may be employed to send all required system information of the SCell. In connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. An RRC connection establishment procedure may comprise SRB1 establishment. The RRC connection establishment procedure may be used to transfer the initial NAS dedicated information message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure, e.g., after successful security activation. A measurement report message may be employed to transmit measurement results.

FIG. 5A, FIG. 5B, FIG. 5C, and FIG. 5D show examples for uplink and downlink signal transmission. FIG. 5A shows an example for an uplink physical channel. The baseband signal representing the physical uplink shared channel may be processed according to the following processes, which may be performed by structures described below. While these structures and corresponding functions are shown as examples, it is anticipated that other structures and/or functions may be implemented in various examples. The structures and corresponding functions may comprise, e.g., one or more scrambling devices 501A and 501B configured to perform scrambling of coded bits in each of the codewords to be transmitted on a physical channel; one or more modulation mappers 502A and 502B configured to perform modulation of scrambled bits to generate complex-valued symbols; a layer mapper 503 configured to perform mapping of the complex-valued modulation symbols onto one or several transmission layers; one or more transform precoders 504A and 504B to generate complex-valued symbols; a precoding device 505 configured to perform precoding of the complex-valued symbols; one or more resource element mappers 506A and 506B configured to perform mapping of precoded complex-valued symbols to resource elements; one or more signal generators 507A and 507B configured to perform the generation of a complex-valued time-domain DFTS-OFDM/SC-FDMA signal for each antenna port; and/or the like.

Example modulation and up-conversion to the carrier frequency of the complex-valued DFTS-OFDM/SC-FDMA baseband signal for each antenna port and/or the complex-valued physical random access channel (PRACH) baseband signal is shown in FIG. 5B. For example, the baseband signal, represented as $s_1(t)$, may be split, by a signal splitter 510, into real and imaginary components, $Re\{s_1(t)\}$ and $Im\{s_1(t)\}$, respectively. The real component may be modulated by a modulator 511A, and the imaginary component may be modulated by a modulator 511B. The output signal of the modulator 511A and the output signal of the modulator 511B may be mixed by a mixer 512. The output signal of the mixer 512 may be input to a filtering device 513, and filtering may be employed by the filtering device 513 prior to transmission.

An example structure for downlink transmissions is shown in FIG. 5C. The baseband signal representing a downlink physical channel may be processed by the following processes, which may be performed by structures described below. While these structures and corresponding functions are shown as examples, it is anticipated that other structures and/or functions may be implemented in various examples. The structures and corresponding functions may comprise, e.g., one or more scrambling devices 531A and 531B configured to perform scrambling of coded bits in each of the codewords to be transmitted on a physical channel; one or more modulation mappers 532A and 532B configured to perform modulation of scrambled bits to generate complex-valued modulation symbols; a layer mapper 533 configured to perform mapping of the complex-valued modulation symbols onto one or several transmission layers; a precoding device 534 configured to perform precoding of the complex-valued modulation symbols on each layer for transmission on the antenna ports; one or more resource element mappers 535A and 535B configured to perform mapping of complex-valued modulation symbols for each antenna port to resource elements; one or more OFDM signal generators 536A and 536B configured to perform the generation of complex-valued time-domain OFDM signal for each antenna port; and/or the like.

Example modulation and up-conversion to the carrier frequency of the complex-valued OFDM baseband signal for each antenna port is shown in FIG. 5D. For example, the baseband signal, represented as $s_1^{(p)}(t)$, may be split, by a signal splitter 520, into real and imaginary components, $Re\{s_1^{(p)}(t)\}$ and $Im\{s_1^{(p)}(t)\}$, respectively. The real component may be modulated by a modulator 521A, and the imaginary component may be modulated by a modulator 521B. The output signal of the modulator 521A and the output signal of the modulator 521B may be mixed by a mixer 522. The output signal of the mixer 522 may be input to a filtering device 523, and filtering may be employed by the filtering device 523 prior to transmission.

Figure 6:
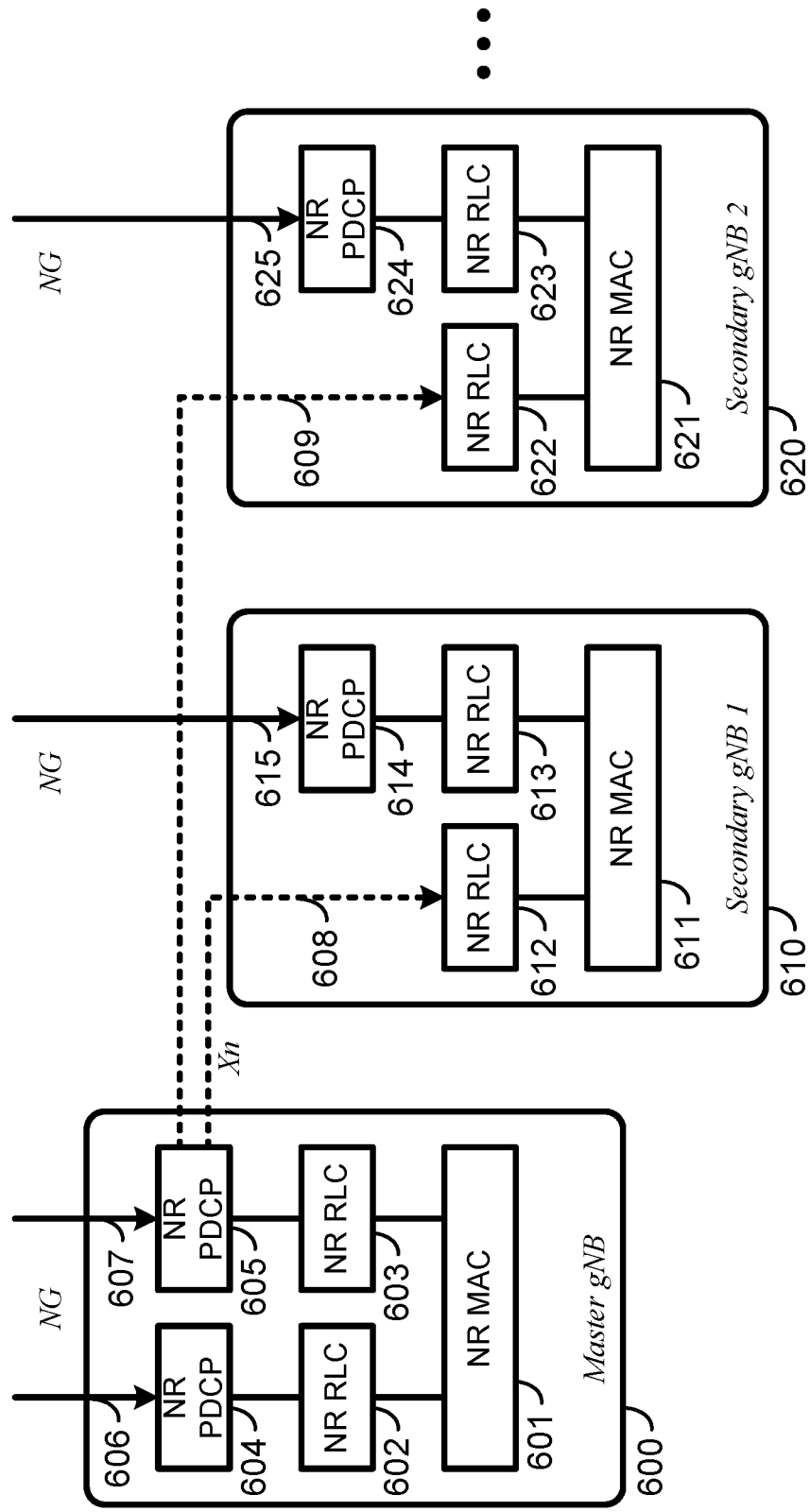
FIG. 6 shows an example protocol structure with multi-connectivity.
Figure 7:
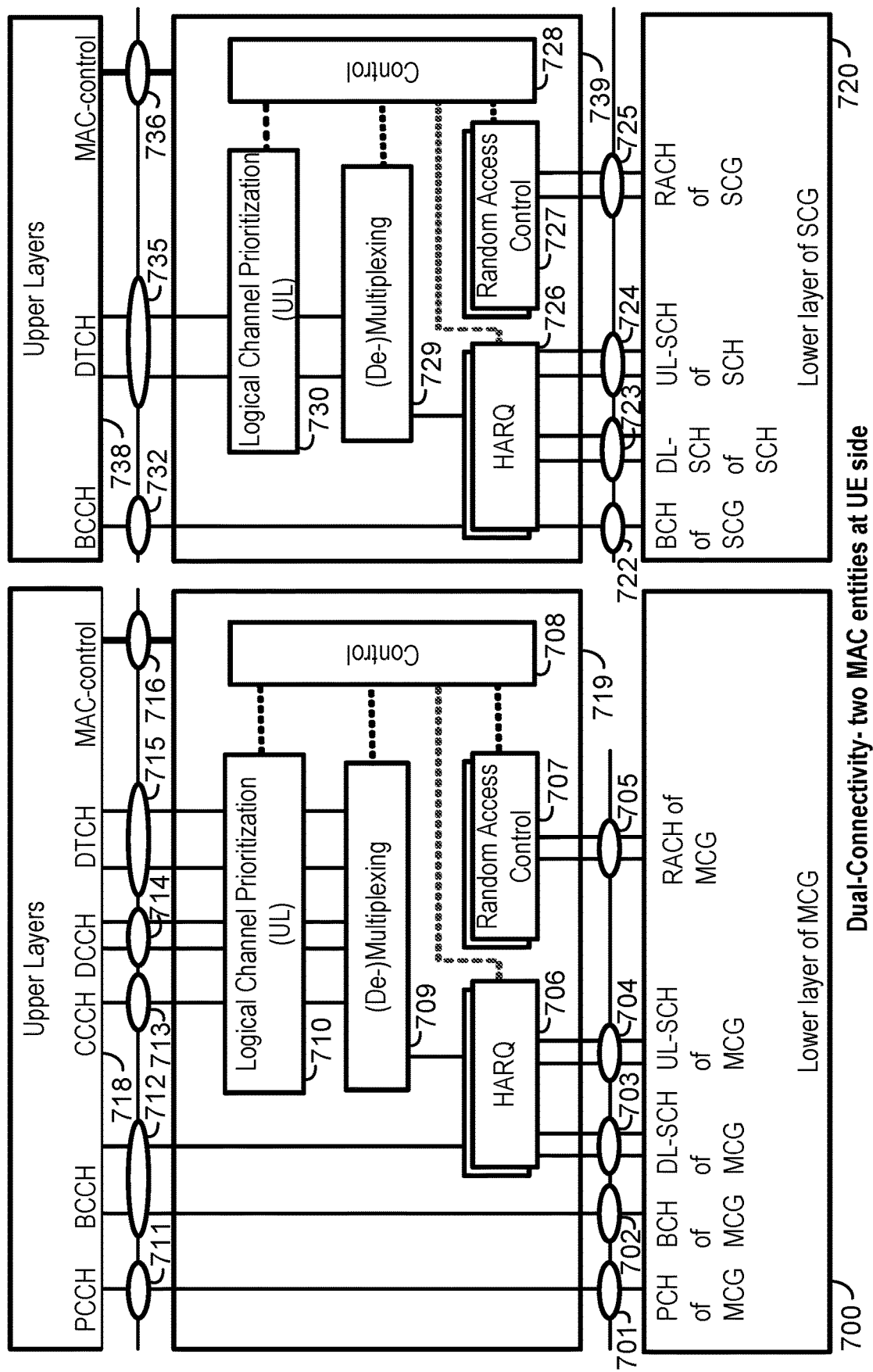
FIG. 7 shows an example protocol structure with carrier aggregation (CA) and dual connectivity (DC).

FIG. 6 and FIG. 7 show examples for protocol structures with CA and multi-connectivity. In FIG. 6, NR may support multi-connectivity operation, whereby a multiple receiver/transmitter (RX/TX) wireless device in RRC_CONNECTED may be configured to utilize radio resources provided by multiple schedulers located in multiple gNBs connected via a non-ideal or ideal backhaul over the Xn interface. gNBs involved in multi-connectivity for a certain wireless device may assume two different roles: a gNB may either act as a master gNB (e.g., 600) or as a secondary gNB (e.g., 610 or 620). In multi-connectivity, a wireless device may be connected to one master gNB (e.g., 600) and one or more secondary gNBs (e.g., 610 and/or 620). Any one or more of the Master gNB 600 and/or the secondary gNBs 610 and 620 may be a Next Generation (NG) NodeB. The master gNB 600 may comprise protocol layers NR MAC 601, NR RLC 602 and 603, and NR PDCP 604 and 605. The secondary gNB may comprise protocol layers NR MAC

611, NR RLC 612 and 613, and NR PDCP 614. The secondary gNB may comprise protocol layers NR MAC 621, NR RLC 622 and 623, and NR PDCP 624. The master gNB 600 may communicate via an interface 606 and/or via an interface 607, the secondary gNB 610 may communicate via an interface 615, and the secondary gNB 620 may communicate via an interface 625. The master gNB 600 may also communicate with the secondary gNB 610 and the secondary gNB 621 via interfaces 608 and 609, respectively, which may include Xn interfaces. For example, the master gNB 600 may communicate via the interface 608, at layer NR PDCP 605, and with the secondary gNB 610 at layer NR RLC 612. The master gNB 600 may communicate via the interface 609, at layer NR PDCP 605, and with the secondary gNB 620 at layer NR RLC 622.

FIG. 7 shows an example structure for the UE side MAC entities, e.g., if a Master Cell Group (MCG) and a Secondary Cell Group (SCG) are configured. Media Broadcast Multicast Service (MBMS) reception may be included but is not shown in this figure for simplicity.

In multi-connectivity, the radio protocol architecture that a particular bearer uses may depend on how the bearer is set up. As an example, three alternatives may exist, an MCG bearer, an SCG bearer, and a split bearer, such as shown in FIG. 6. NR RRC may be located in a master gNB and SRBs may be configured as a MCG bearer type and may use the radio resources of the master gNB. Multi-connectivity may have at least one bearer configured to use radio resources provided by the secondary gNB. Multi-connectivity may or may not be configured or implemented.

For multi-connectivity, the wireless device may be configured with multiple NR MAC entities: e.g., one NR MAC entity for a master gNB, and other NR MAC entities for secondary gNBs. In multi-connectivity, the configured set of serving cells for a wireless device may comprise two subsets: e.g., the Master Cell Group (MCG) including the serving cells of the master gNB, and the Secondary Cell Groups (SCGs) including the serving cells of the secondary gNBs.

At least one cell in a SCG may have a configured UL component carrier (CC) and one of the UL CCs, e.g., named PSCell (or PCell of SCG, or sometimes called PCell), may be configured with PUCCH resources. If the SCG is configured, there may be at least one SCG bearer or one split bearer. If a physical layer problem or a random access problem on a PSCell occurs or is detected, if the maximum number of NR RLC retransmissions has been reached associated with the SCG, or if an access problem on a PSCell during a SCG addition or a SCG change occurs or is detected, then an RRC connection re-establishment procedure may not be triggered, UL transmissions towards cells of the SCG may be stopped, a master gNB may be informed by the wireless device of a SCG failure type, and for a split bearer the DL data transfer over the master gNB may be maintained. The NR RLC Acknowledge Mode (AM) bearer may be configured for the split bearer Like the PCell, a PSCell may not be de-activated. The PSCell may be changed with an SCG change (e.g., with a security key change and a RACH procedure). A direct bearer type may change between a split bearer and an SCG bearer, or a simultaneous configuration of an SCG and a split bearer may or may not be supported.

With respect to the interaction between a master gNB and secondary gNBs for multi-connectivity, one or more of the following may be applied. The master gNB may maintain the RRM measurement configuration of the wireless device, and the master gNB may, (e.g., based on received measurement reports, and/or based on traffic conditions and/or bearer types), decide to ask a secondary gNB to provide additional resources (e.g., serving cells) for a wireless device. If a request from the master gNB is received, a secondary gNB may create a container that may result in the configuration of additional serving cells for the wireless device (or the secondary gNB decide that it has no resource available to do so). For wireless device capability coordination, the master gNB may provide some or all of the Active Set (AS) configuration and the wireless device capabilities to the secondary gNB. The master gNB and the secondary gNB may exchange information about a wireless device configuration, such as by employing NR RRC containers (e.g., inter-node messages) carried in Xn messages. The secondary gNB may initiate a reconfiguration of its existing serving cells (e.g., PUCCH towards the secondary gNB). The secondary gNB may decide which cell is the PSCell within the SCG. The master gNB may or may not change the content of the NR RRC configuration provided by the secondary gNB. In an SCG addition and an SCG SCell addition, the master gNB may provide the latest measurement results for the SCG cell(s). Both a master gNB and a secondary gNBs may know the system frame number (SFN) and subframe offset of each other by operations, administration, and maintenance (OAM) (e.g., for the purpose of discontinuous reception (DRX) alignment and identification of a measurement gap). If adding a new SCG SCell, dedicated NR RRC signaling may be used for sending required system information of the cell for CA, except, e.g., for the SFN acquired from an MIB of the PSCell of an SCG.

FIG. 7 shows an example of dual-connectivity (DC) for two MAC entities at a wireless device side. A first MAC entity may comprise a lower layer of an MCG 700, an upper layer of an MCG 718, and one or more intermediate layers of an MCG 719. The lower layer of the MCG 700 may comprise, e.g., a paging channel (PCH) 701, a broadcast channel (BCH) 702, a downlink shared channel (DL-SCH) 703, an uplink shared channel (UL-SCH) 704, and a random access channel (RACH) 705. The one or more intermediate layers of the MCG 719 may comprise, e.g., one or more hybrid automatic repeat request (HARM) processes 706, one or more random access control processes 707, multiplexing and/or de-multiplexing processes 709, logical channel prioritization on the uplink processes 710, and a control processes 708 providing control for the above processes in the one or more intermediate layers of the MCG 719. The upper layer of the MCG 718 may comprise, e.g., a paging control channel (PCCH) 711, a broadcast control channel (BCCH) 712, a common control channel (CCCH) 713, a dedicated control channel (DCCH) 714, a dedicated traffic channel (DTCH) 715, and a MAC control 716.

A second MAC entity may comprise a lower layer of an SCG 720, an upper layer of an SCG 738, and one or more intermediate layers of an SCG 739. The lower layer of the SCG 720 may comprise, e.g., a BCH 722, a DL-SCH 723, an UL-SCH 724, and a RACH 725. The one or more intermediate layers of the SCG 739 may comprise, e.g., one or more HARQ processes 726, one or more random access control processes 727, multiplexing and/or de-multiplexing processes 729, logical channel prioritization on the uplink processes 730, and a control processes 728 providing control for the above processes in the one or more intermediate layers of the SCG 739. The upper layer of the SCG 738 may comprise, e.g., a BCCH 732, a DCCH 714, a DTCH 735, and a MAC control 736.

Serving cells may be grouped in a TA group (TAG). Serving cells in one TAG may use the same timing reference. For a given TAG, a wireless device may use at least one downlink carrier as a timing reference. For a given TAG, a wireless device may synchronize uplink subframe and frame transmission timing of uplink carriers belonging to the same TAG. Serving cells having an uplink to which the same TA applies may correspond to serving cells hosted by the same receiver. A wireless device supporting multiple TAs may support two or more TA groups. One TA group may include the PCell and may be called a primary TAG (pTAG). In a multiple TAG configuration, at least one TA group may not include the PCell and may be called a secondary TAG (sTAG). Carriers within the same TA group may use the same TA value and/or the same timing reference. If DC is configured, cells belonging to a cell group (e.g., MCG or SCG) may be grouped into multiple TAGs including a pTAG and one or more sTAGs.

FIG. 8 shows example TAG configurations. In Example 1, a pTAG comprises a PCell, and an sTAG comprises an SCell1. In Example 2, a pTAG comprises a PCell and an SCell1, and an sTAG comprises an SCell2 and an SCell3. In Example 3, a pTAG comprises a PCell and an SCell1, and an sTAG1 comprises an SCell2 and an SCell3, and an sTAG2 comprises a SCell4. Up to four TAGs may be supported in a cell group (MCG or SCG), and other example TAG configurations may also be provided. In various examples, structures and operations are described for use with a pTAG and an sTAG. Some of the examples may be applied to configurations with multiple sTAGs.

An eNB may initiate an RA procedure, via a PDCCH order, for an activated SCell. The PDCCH order may be sent on a scheduling cell of this SCell. If cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
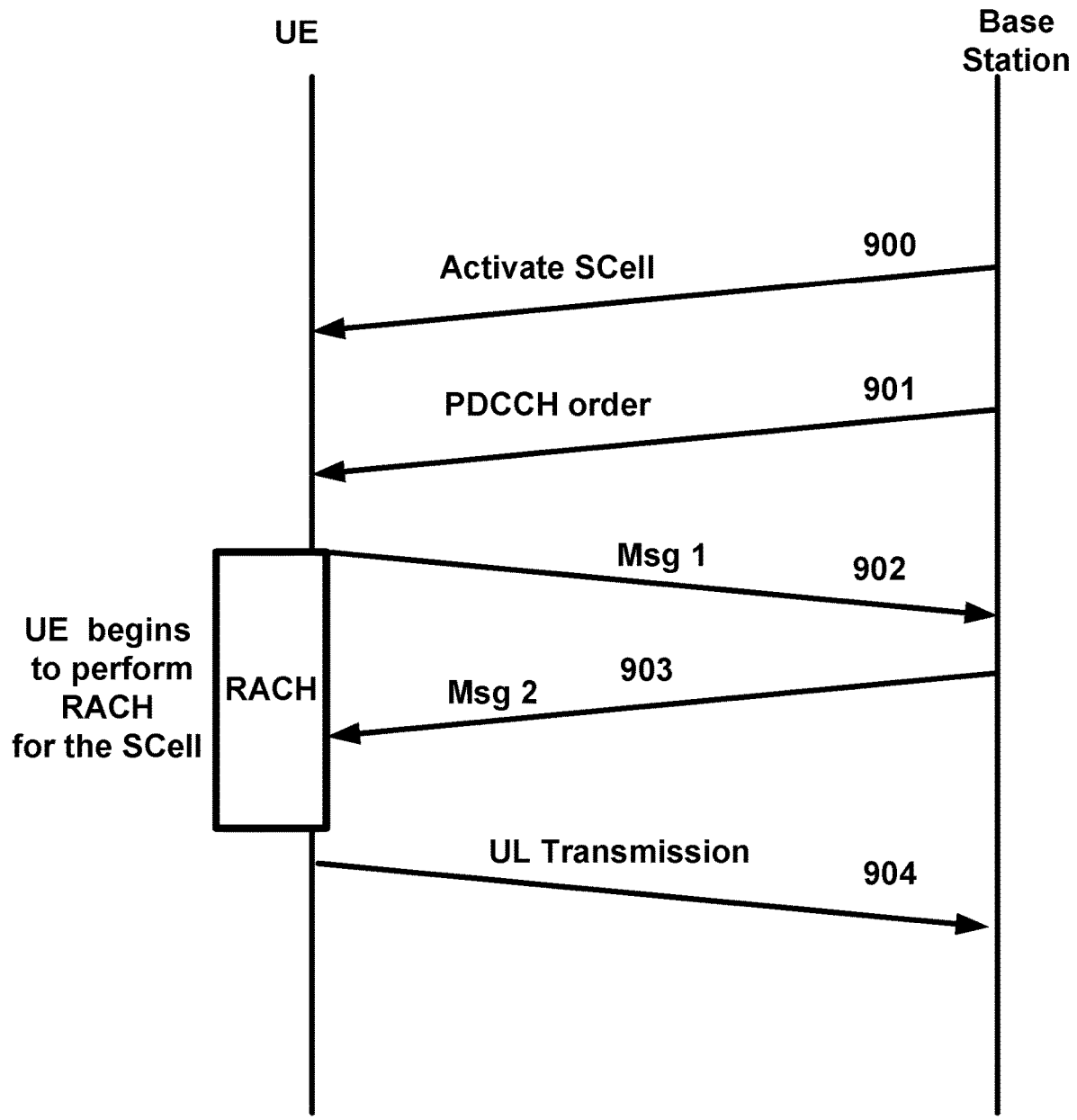
FIG. 9 shows example message flow in a random access process in a secondary TAG.

FIG. 9 shows an example of random access processes, and a corresponding message flow, in a secondary TAG. A base station, such as an eNB, may transmit an activation command 900 to a wireless device, such as a UE. The activation command 900 may be transmitted to activate an SCell. The base station may also transmit a PDDCH order 901 to the wireless device, which may be transmitted, e.g., after the activation command 900. The wireless device may begin to perform a RACH process for the SCell, which may be initiated, e.g., after receiving the PDDCH order 901. The RACH process may include the wireless device transmitting to the base station a preamble 902 (e.g., Msg1), such as a random access preamble (RAP). The preamble 902 may be transmitted in response to the PDCCH order 901. The wireless device may transmit the preamble 902 via an SCell belonging to an sTAG. Preamble transmission for SCells may be controlled by a network using PDCCH format 1A. The base station may send a random access response (RAR) 903 (e.g., Msg2 message) to the wireless device. The RAR 903 may be in response to the preamble 902 transmission via the SCell. The RAR 903 may be addressed to a random access radio network temporary identifier (RA-RNTI) in a PCell common search space (CSS). If the wireless device receives the RAR 903, the RACH process may conclude. The RACH process may conclude, e.g., after or in response to the wireless device receiving the RAR 903 from the base station. After the RACH process, the wireless device may transmit an uplink transmission 904. The uplink transmission 904 may comprise uplink packets transmitted via the same SCell used for the preamble 902 transmission.

Initial timing alignment for communications between the wireless device and the base station may be achieved through a random access procedure, such as described above regarding FIG. 9. The random access procedure may involve a wireless device, such as a UE, transmitting a random access preamble and a base station, such as an eNB, responding with an initial TA command NTA (amount of timing advance) within a random access response window. The start of the random access preamble may be aligned with the start of a corresponding uplink subframe at the wireless device assuming NTA=0. The eNB may estimate the uplink timing from the random access preamble transmitted by the wireless device. The TA command may be derived by the eNB based on the estimation of the difference between the desired UL timing and the actual UL timing. The wireless device may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. If an eNB performs an SCell addition configuration, the related TAG configuration may be configured for the SCell. An eNB may modify the TAG configuration of an SCell by removing (e.g., releasing) the SCell and adding (e.g., configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In some examples, it may not be possible to change the TAG associated with an SCell, but rather, the SCell may need to be removed and a new SCell may need to be added with another TAG. For example, if there is a need to move an SCell from an sTAG to a pTAG, at least one RRC message, such as at least one RRC reconfiguration message, may be sent to the wireless device. The at least one RRC message may be sent to the wireless device to reconfigure TAG configurations, e.g., by releasing the SCell and configuring the SCell as a part of the pTAG. If, e.g., an SCell is added or configured without a TAG index, the SCell may be explicitly assigned to the pTAG. The PCell may not change its TA group and may be a member of the pTAG.

In LTE Release-10 and Release-11 CA, a PUCCH transmission is only transmitted on a PCell (e.g., a PSCell) to an eNB. In LTE-Release 12 and earlier, a wireless device may transmit PUCCH information on one cell (e.g., a PCell or a PSCell) to a given eNB. As the number of CA capable wireless devices increase, and as the number of aggregated carriers increase, the number of PUCCHs and the PUCCH payload size may increase. Accommodating the PUCCH transmissions on the PCell may lead to a high PUCCH load on the PCell. A PUCCH on an SCell may be used to offload the PUCCH resource from the PCell. More than one PUCCH may be configured. For example, a PUCCH on a PCell may be configured and another PUCCH on an SCell may be configured. One, two, or more cells may be configured with PUCCH resources for transmitting CSI, acknowledgment (ACK), and/or non-acknowledgment (NACK) to a base station. Cells may be grouped into multiple PUCCH groups, and one or more cell within a group may be configured with a PUCCH. In some examples, one SCell may belong to one PUCCH group. SCells with a configured PUCCH transmitted to a base station may be called a PUCCH SCell, and a cell group with a common PUCCH resource transmitted to the same base station may be called a PUCCH group.

A MAC entity may have a configurable timer, e.g., timeAlignmentTimer, per TAG. The timeAlignmentTimer may be used to control how long the MAC entity considers the serving cells belonging to the associated TAG to be uplink time aligned. If a Timing Advance Command MAC control element is received, the MAC entity may apply the Timing Advance Command for the indicated TAG; and/or the MAC entity may start or restart the timeAlignmentTimer associated with a TAG that may be indicated by the Timing Advance Command MAC control element. If a Timing Advance Command is received in a Random Access Response message for a serving cell belonging to a TAG, the MAC entity may apply the Timing Advance Command for this TAG and/or start or restart the timeAlignmentTimer associated with this TAG. Additionally or alternatively, if the Random Access Preamble is not selected by the MAC entity, the MAC entity may apply the Timing Advance Command for this TAG and/or start or restart the timeAlignmentTimer associated with this TAG. If the timeAlignmentTimer associated with this TAG is not running, the Timing Advance Command for this TAG may be applied, and the timeAlignmentTimer associated with this TAG may be started. If the contention resolution is not successful, a timeAlignmentTimer associated with this TAG may be stopped. If the contention resolution is successful, the MAC entity may ignore the received Timing Advance Command. The MAC entity may determine whether the contention resolution is successful or whether the contention resolution is not successful.

FIG. 10A and FIG. 10B show examples for interfaces between a 5G core network (e.g., NGC) and base stations (e.g., gNB and eLTE eNB). For example, in FIG. 10A, a base station, such as a gNB 1020, may be interconnected to an NGC 1010 control plane employing an NG-C interface. The base station, e.g., the gNB 1020, may also be interconnected to an NGC 1010 user plane (e.g., UPGW) employing an NG-U interface. As another example, in FIG. 10B, a base station, such as an eLTE eNB 1040, may be interconnected to an NGC 1030 control plane employing an NG-C interface. The base station, e.g., the eLTE eNB 1040, may also be interconnected to an NGC 1030 user plane (e.g., UPGW) employing an NG-U interface. An NG interface may support a many-to-many relation between 5G core networks and base stations.

FIG. 11A, FIG. 11B, FIG. 11C, FIG. 11D, FIG. 11E, and FIG. 11F are examples for architectures of tight interworking between a 5G RAN and an LTE RAN. The tight interworking may enable a multiple receiver/transmitter (RX/TX) wireless device in an RRC_CONNECTED state to be configured to utilize radio resources provided by two schedulers located in two base stations (e.g., an eLTE eNB and a gNB). The two base stations may be connected via a non-ideal or ideal backhaul over the Xx interface between an LTE eNB and a gNB, or over the Xn interface between an eLTE eNB and a gNB. Base stations involved in tight interworking for a certain wireless device may assume different roles. For example, a base station may act as a master base station or a base station may act as a secondary base station. In tight interworking, a wireless device may be connected to both a master base station and a secondary base station. Mechanisms implemented in tight interworking may be extended to cover more than two base stations.

In FIG. 11A and FIG. 11B, a master base station may be an LTE eNB 1102A or an LTE eNB 1102B, which may be connected to EPC nodes 1101A or 1101B, respectively. This connection to EPC nodes may be, e.g., to an MME via the S1-C interface and/or to an S-GW via the S1-U interface. A secondary base station may be a gNB 1103A or a gNB 1103B, either or both of which may be a non-standalone node having a control plane connection via an Xx-C interface to an LTE eNB (e.g., the LTE eNB 1102A or the LTE eNB 1102B). In the tight interworking architecture of FIG. 11A, a user plane for a gNB (e.g., the gNB 1103A) may be connected to an S-GW (e.g., the EPC 1101A) through an LTE eNB (e.g., the LTE eNB 1102A), via an Xx-U interface between the LTE eNB and the gNB, and via an S1-U interface between the LTE eNB and the S-GW. In the architecture of FIG. 11B, a user plane for a gNB (e.g., the gNB 1103B) may be connected directly to an S-GW (e.g., the EPC 1101B) via an S1-U interface between the gNB and the S-GW.

In FIG. 11C and FIG. 11D, a master base station may be a gNB 1103C or a gNB 1103D, which may be connected to NGC nodes 1101C or 1101D, respectively. This connection to NGC nodes may be, e.g., to a control plane core node via the NG-C interface and/or to a user plane core node via the NG-U interface. A secondary base station may be an eLTE eNB 1102C or an eLTE eNB 1102D, either or both of which may be a non-standalone node having a control plane connection via an Xn-C interface to a gNB (e.g., the gNB 1103C or the gNB 1103D). In the tight interworking architecture of FIG. 11C, a user plane for an eLTE eNB (e.g., the eLTE eNB 1102C) may be connected to a user plane core node (e.g., the NGC 1101C) through a gNB (e.g., the gNB 1103C), via an Xn-U interface between the eLTE eNB and the gNB, and via an NG-U interface between the gNB and the user plane core node. In the architecture of FIG. 11D, a user plane for an eLTE eNB (e.g., the eLTE eNB 1102D) may be connected directly to a user plane core node (e.g., the NGC 1101D) via an NG-U interface between the eLTE eNB and the user plane core node.

In FIG. 11E and FIG. 11F, a master base station may be an eLTE eNB 1102E or an eLTE eNB 1102F, which may be connected to NGC nodes 1101E or 1101F, respectively. This connection to NGC nodes may be, e.g., to a control plane core node via the NG-C interface and/or to a user plane core node via the NG-U interface. A secondary base station may be a gNB 1103E or a gNB 1103F, either or both of which may be a non-standalone node having a control plane connection via an Xn-C interface to an eLTE eNB (e.g., the eLTE eNB 1102E or the eLTE eNB 1102F). In the tight interworking architecture of FIG. 11E, a user plane for a gNB (e.g., the gNB 1103E) may be connected to a user plane core node (e.g., the NGC 1101E) through an eLTE eNB (e.g., the eLTE eNB 1102E), via an Xn-U interface between the eLTE eNB and the gNB, and via an NG-U interface between the eLTE eNB and the user plane core node. In the architecture of FIG. 11F, a user plane for a gNB (e.g., the gNB 1103F) may be connected directly to a user plane core node (e.g., the NGC 1101F) via an NG-U interface between the gNB and the user plane core node.

FIG. 12A, FIG. 12B, and FIG. 12C are examples for radio protocol structures of tight interworking bearers.

In FIG. 12A, an LTE eNB 1201A may be an S1 master base station, and a gNB 1210A may be an S1 secondary base station. An example for a radio protocol architecture for a split bearer and an SCG bearer is shown. The LTE eNB 1201A may be connected to an EPC with a non-standalone gNB 1210A, via an Xx interface between the PDCP 1206A and an NR RLC 1212A. The LTE eNB 1201A may include protocol layers MAC 1202A, RLC 1203A and RLC 1204A, and PDCP 1205A and PDCP 1206A. An MCG bearer type may interface with the PDCP 1205A, and a split bearer type may interface with the PDCP 1206A. The gNB 1210A may include protocol layers NR MAC 1211A, NR RLC 1212A and NR RLC 1213A, and NR PDCP 1214A. An SCG bearer type may interface with the NR PDCP 1214A.

In FIG. 12B, a gNB 1201B may be an NG master base station, and an eLTE eNB 1210B may be an NG secondary base station. An example for a radio protocol architecture for a split bearer and an SCG bearer is shown. The gNB 1201B may be connected to an NGC with a non-standalone eLTE eNB 1210B, via an Xn interface between the NR PDCP 1206B and an RLC 1212B. The gNB 1201B may include protocol layers NR MAC 1202B, NR RLC 1203B and NR RLC 1204B, and NR PDCP 1205B and NR PDCP 1206B. An MCG bearer type may interface with the NR PDCP 1205B, and a split bearer type may interface with the NR PDCP 1206B. The eLTE eNB 1210B may include protocol layers MAC 1211B, RLC 1212B and RLC 1213B, and PDCP 1214B. An SCG bearer type may interface with the PDCP 1214B.

In FIG. 12C, an eLTE eNB 1201C may be an NG master base station, and a gNB 1210C may be an NG secondary base station. An example for a radio protocol architecture for a split bearer and an SCG bearer is shown. The eLTE eNB 1201C may be connected to an NGC with a non-standalone gNB 1210C, via an Xn interface between the PDCP 1206C and an NR RLC 1212C. The eLTE eNB 1201C may include protocol layers MAC 1202C, RLC 1203C and RLC 1204C, and PDCP 1205C and PDCP 1206C. An MCG bearer type may interface with the PDCP 1205C, and a split bearer type may interface with the PDCP 1206C. The gNB 1210C may include protocol layers NR MAC 1211C, NR RLC 1212C and NR RLC 1213C, and NR PDCP 1214C. An SCG bearer type may interface with the NR PDCP 1214C.

In a 5G network, the radio protocol architecture that a particular bearer uses may depend on how the bearer is setup. At least three alternatives may exist, e.g., an MCG bearer, an SCG bearer, and a split bearer, such as shown in FIG. 12A, FIG. 12B, and FIG. 12C. The NR RRC may be located in a master base station, and the SRBs may be configured as an MCG bearer type and may use the radio resources of the master base station. Tight interworking may have at least one bearer configured to use radio resources provided by the secondary base station. Tight interworking may or may not be configured or implemented.

The wireless device may be configured with two MAC entities: e.g., one MAC entity for a master base station, and one MAC entity for a secondary base station. In tight interworking, the configured set of serving cells for a wireless device may comprise of two subsets: e.g., the Master Cell Group (MCG) including the serving cells of the master base station, and the Secondary Cell Group (SCG) including the serving cells of the secondary base station.

At least one cell in a SCG may have a configured UL CC and one of them, e.g., a PSCell (or the PCell of the SCG, which may also be called a PCell), is configured with PUCCH resources. If the SCG is configured, there may be at least one SCG bearer or one split bearer. If one or more of a physical layer problem or a random access problem is detected on a PSCell, if the maximum number of (NR) RLC retransmissions associated with the SCG has been reached, and/or if an access problem on a PSCell during an SCG addition or during an SCG change is detected, then: an RRC connection re-establishment procedure may not be triggered, UL transmissions towards cells of the SCG may be stopped, a master base station may be informed by the wireless device of a SCG failure type, and/or for a split bearer the DL data transfer over the master base station may be maintained. The RLC AM bearer may be configured for the split bearer. Like the PCell, a PSCell may not be de-activated. A PSCell may be changed with an SCG change, e.g., with security key change and a RACH procedure. A direct bearer type change, between a split bearer and an SCG bearer, may not be supported. Simultaneous configuration of an SCG and a split bearer may not be supported.

With respect to the interaction between a master base station and a secondary base station, one or more of the following may be applied. The master base station may maintain the RRM measurement configuration of the wireless device. The master base station may determine to ask a secondary base station to provide additional resources (e.g., serving cells) for a wireless device. This determination may be based on, e.g., received measurement reports, traffic conditions, and/or bearer types. If a request from the master base station is received, a secondary base station may create a container that may result in the configuration of additional serving cells for the wireless device, or the secondary base station may determine that it has no resource available to do so. The master base station may provide at least part of the AS configuration and the wireless device capabilities to the secondary base station, e.g., for wireless device capability coordination. The master base station and the secondary base station may exchange information about a wireless device configuration such as by using RRC containers (e.g., inter-node messages) carried in Xn or Xx messages. The secondary base station may initiate a reconfiguration of its existing serving cells (e.g., PUCCH towards the secondary base station). The secondary base station may determine which cell is the PSCell within the SCG. The master base station may not change the content of the RRC configuration provided by the secondary base station. If an SCG is added and/or an SCG SCell is added, the master base station may provide the latest measurement results for the SCG cell(s). Either or both of a master base station and a secondary base station may know the SFN and subframe offset of each other by OAM, (e.g., for the purpose of DRX alignment and identification of a measurement gap). If a new SCG SCell is added, dedicated RRC signaling may be used for sending required system information of the cell, such as for CA, except, e.g., for the SFN acquired from an MIB of the PSCell of an SCG.

FIG. 13A and FIG. 13B show examples for gNB deployment. A core 1301 and a core 1310, in FIG. 13A and FIG. 13B, respectively, may interface with other nodes via RAN-CN interfaces. In a non-centralized deployment example in FIG. 13A, the full protocol stack (e.g., NR RRC, NR PDCP, NR RLC, NR MAC, and NR PHY) may be supported at one node, such as a gNB 1302, a gNB 1303, and/or an eLTE eNB or LTE eNB 1304. These nodes (e.g., the gNB 1302, the gNB 1303, and the eLTE eNB or LTE eNB 1304) may interface with one of more of each other via a respective inter-BS interface. In the centralized deployment example in FIG. 13B, upper layers of a gNB may be located in a Central Unit (CU) 1311, and lower layers of the gNB may be located in Distributed Units (DU) 1312, 1313, and 1314. The CU-DU interface (e.g., Fs interface) connecting CU 1311 and DUs 1312, 1312, and 1314 may be ideal or non-ideal. The Fs-C may provide a control plane connection over the Fs interface, and the Fs-U may provide a user plane connection over the Fs interface. In the centralized deployment, different functional split options between the CU 1311 and the DUs 1312, 1313, and 1314 may be possible by locating different protocol layers (e.g., RAN functions) in the CU 1311 and in the DU 1312, 1313, and 1314. The functional split may support flexibility to move the RAN functions between the CU 1311 and the DUs 1312, 1313, and 1314 depending on service requirements and/or network environments. The functional split option may change during operation (e.g., after the Fs interface setup procedure), or the functional split option may change only in the Fs setup procedure (e.g., the functional split option may be static during operation after Fs setup procedure).

Figure 14:
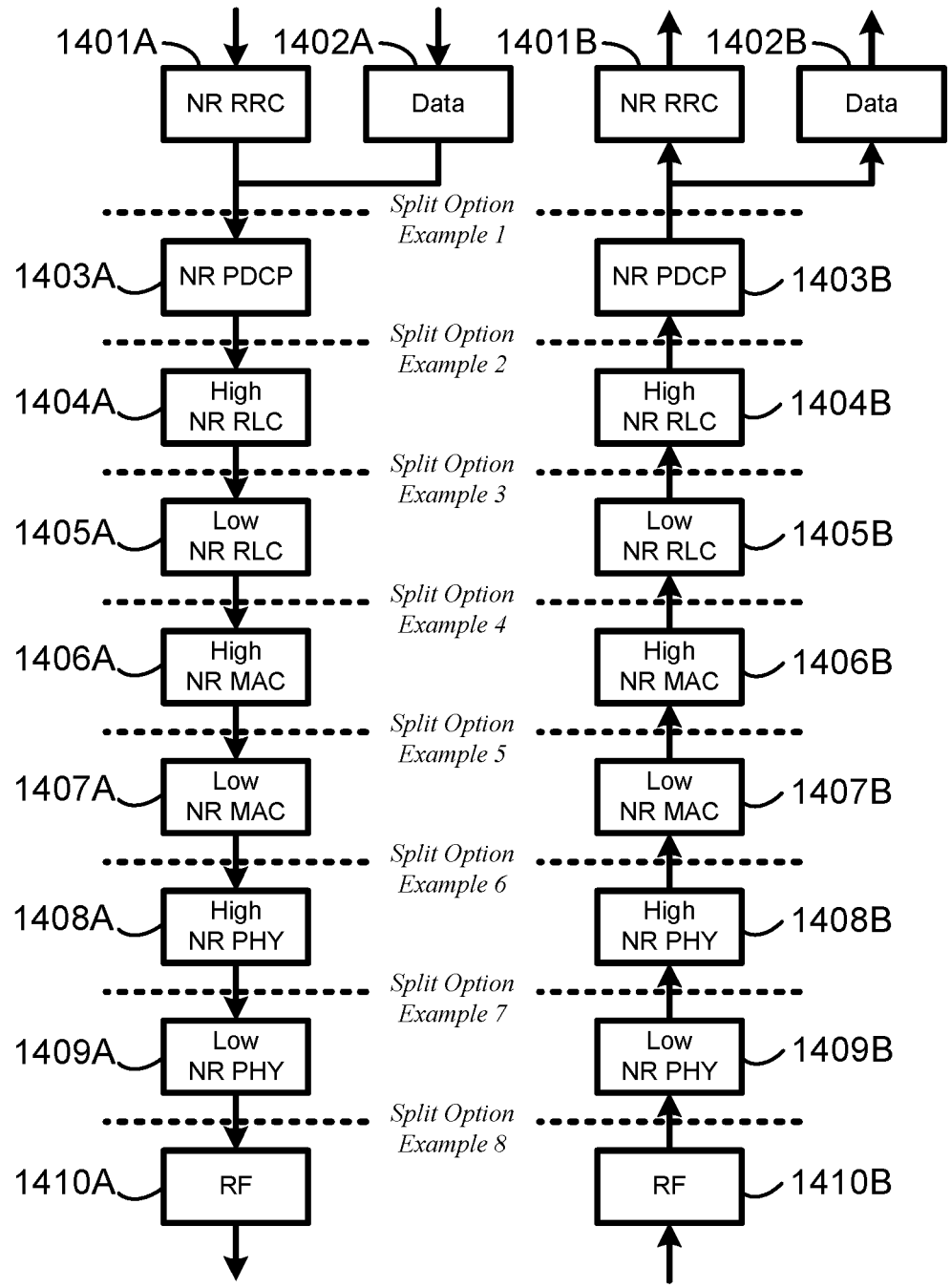
FIG. 14 shows functional split option examples of a centralized gNB deployment.

FIG. 14 shows examples for different functional split options of a centralized gNB deployment. Element numerals that are followed by "A" or "B" designations in FIG. 14 may represent the same elements in different traffic flows, e.g., either receiving data (e.g., data 1402A) or sending data (e.g., 1402B). In the split option example 1, an NR RRC 1401 may be in a CU, and an NR PDCP 1403, an NR RLC (e.g., comprising a High NR RLC 1404 and/or a Low NR RLC 1405), an NR MAC (e.g., comprising a High NR MAC 1406 and/or a Low NR MAC 1407), an NR PHY (e.g., comprising a High NR PHY 1408 and/or a LOW NR PHY 1409), and an RF 1410 may be in a DU. In the split option example 2, the NR RRC 1401 and the NR PDCP 1403 may be in a CU, and the NR RLC, the NR MAC, the NR PHY, and the RF 1410 may be in a DU. In the split option example 3, the NR RRC 1401, the NR PDCP 1403, and a partial function of the NR RLC (e.g., the High NR RLC 1404) may be in a CU, and the other partial function of the NR RLC (e.g., the Low NR RLC 1405), the NR MAC, the NR PHY, and the RF 1410 may be in a DU. In the split option example 4, the NR RRC 1401, the NR PDCP 1403, and the NR RLC may be in a CU, and the NR MAC, the NR PHY, and the RF 1410 may be in a DU. In the split option example 5, the NR RRC 1401, the NR PDCP 1403, the NR RLC, and a partial function of the NR MAC (e.g., the High NR MAC 1406) may be in a CU, and the other partial function of the NR MAC (e.g., the Low NR MAC 1407), the NR PHY, and the RF 1410 may be in a DU. In the split option example 6, the NR RRC 1401, the NR PDCP 1403, the NR RLC, and the NR MAC may be in CU, and the NR PHY and the RF 1410 may be in a DU. In the split option example 7, the NR RRC 1401, the NR PDCP 1403, the NR RLC, the NR MAC, and a partial function of the NR PHY (e.g., the High NR PHY 1408) may be in a CU, and the other partial function of the NR PHY (e.g., the Low NR PHY 1409) and the RF 1410 may be in a DU. In the split option example 8, the NR RRC 1401, the NR PDCP 1403, the NR RLC, the NR MAC, and the NR PHY may be in a CU, and the RF 1410 may be in a DU.

The functional split may be configured per CU, per DU, per wireless device, per bearer, per slice, and/or with other granularities. In a per CU split, a CU may have a fixed split, and DUs may be configured to match the split option of the CU. In a per DU split, each DU may be configured with a different split, and a CU may provide different split options for different DUs. In a per wireless device split, a gNB (e.g., a CU and a DU) may provide different split options for different wireless devices. In a per bearer split, different split options may be utilized for different bearer types. In a per slice splice, different split options may be applied for different slices.

A new radio access network (new RAN) may support different network slices, which may allow differentiated treatment customized to support different service requirements with end to end scope. The new RAN may provide a differentiated handling of traffic for different network slices that may be pre-configured, and the new RAN may allow a single RAN node to support multiple slices. The new RAN may support selection of a RAN part for a given network slice, e.g., by one or more slice ID(s) or NSSAI(s) provided by a wireless device or provided by an NGC (e.g., an NG CP). The slice ID(s) or NSSAI(s) may identify one or more of pre-configured network slices in a PLMN. For an initial attach, a wireless device may provide a slice ID and/or an NSSAI, and a RAN node (e.g., a gNB) may use the slice ID or the NSSAI for routing an initial NAS signaling to an NGC control plane function (e.g., an NG CP). If a wireless device does not provide any slice ID or NSSAI, a RAN node may send a NAS signaling to a default NGC control plane function. For subsequent accesses, the wireless device may provide a temporary ID for a slice identification, which may be assigned by the NGC control plane function, to enable a RAN node to route the NAS message to a relevant NGC control plane function. The new RAN may support resource isolation between slices. If the RAN resource isolation is implemented, shortage of shared resources in one slice does not cause a break in a service level agreement for another slice.

The amount of data traffic carried over networks is expected to increase for many years to come. The number of users and/or devices is increasing and each user/device accesses an increasing number and variety of services, e.g., video delivery, large files, and images. This requires not only high capacity in the network, but also provisioning very high data rates to meet customers' expectations on interactivity and responsiveness. More spectrum may be required for network operators to meet the increasing demand. Considering user expectations of high data rates along with seamless mobility, it is beneficial that more spectrum be made available for deploying macro cells as well as small cells for communication systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, if present, may be an effective complement to licensed spectrum for network operators, e.g., to help address the traffic explosion in some examples, such as hotspot areas. Licensed Assisted Access (LAA) offers an alternative for operators to make use of unlicensed spectrum, e.g., while managing one radio network, offering new possibilities for optimizing the network's efficiency.

Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

Discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access, e.g., via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices, time synchronization of wireless devices, and frequency synchronization of wireless devices.

DL LAA design may employ subframe boundary alignment according to LTE-A carrier aggregation timing relationships across serving cells aggregated by CA. This may not indicate that the eNB transmissions may start only at the subframe boundary. LAA may support transmitting PDSCH if not all OFDM symbols are available for transmission in a subframe according to LBT. Delivery of necessary control information for the PDSCH may also be supported.

LBT procedures may be employed for fair and friendly coexistence of LAA with other operators and technologies operating in unlicensed spectrum. LBT procedures on a node attempting to transmit on a carrier in unlicensed spectrum may require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. A Category 4 LBT mechanism or other type of LBT mechanisms may be implemented.

Various example LBT mechanisms may be implemented. For some signals, in some implementation scenarios, in some situations, and/or in some frequencies, no LBT procedure may performed by the transmitting entity. For example, Category 2 (e.g., LBT without random back-off) may be implemented. The duration of time that the channel is sensed to be idle before the transmitting entity transmits may be deterministic. For example, Category 3 (e.g., LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle, e.g., before the transmitting entity transmits on the channel. For example, Category 4 (e.g., LBT with random back-off with a contention window of variable size) may be implemented. The transmitting entity may draw a random number N within a contention window. The size of contention window may be specified by the minimum and maximum value of N. The transmitting entity may vary the size of the contention window if drawing the random number N. The random number N may be used in the LBT procedure to determine the duration of time that the channel is sensed to be idle, e.g., before the transmitting entity transmits on the channel.

A DL transmission burst may be a continuous transmission from a DL transmitting node, e.g., with no transmission immediately before or after from the same node on the same CC. An UL transmission burst from a wireless device perspective may be a continuous transmission from a wireless device, e.g., with no transmission immediately before or after from the same wireless device on the same CC. A UL transmission burst may be defined from a wireless device perspective or from an eNB perspective. If an eNB is operating DL and UL LAA over the same unlicensed carrier, DL transmission burst(s) and UL transmission burst(s) on LAA may be scheduled in a TDM manner over the same unlicensed carrier. An instant in time may be part of a DL transmission burst or part of an UL transmission burst.

With slicing, Mobile Network Operators (MNO) may be able to determine, for users and/or devices or groups of users and/or devices, one or more different types, such as tenant types, user types, use types, service types, device types, communication types, etc. Each type may comprise different service requirements. As examples, communications may be for enhanced mobile broadband (eMBB), ultra-reliable low-latency communications (URLLC), or any other type of communications. One or more Service Level Agreements (SLAs) or subscriptions may be associated with different service requirements and may determine what slice types each different type (e.g., tenant, user, use, service, device, communication, etc.) may be eligible to use. NSSAI (Network Slice Selection Assistance Information) may comprise one or more S-NSSAIs (Single NSSAI). Each network slice may be uniquely identified by a S-NSSAI. A wireless device may store a Configured and/or Accepted NSSAI per PLMN. The NSSAI may have standard values or PLMN specific values. For signaling between RAN and CN, a slice ID may be represented by an NSSAI and/or S-NSSAI. In this way, network slicing may allow differentiated treatment depending on requirements for each type of tenant, user, use, service, device, communications, etc.

Base stations and wireless devices may use resource status information to provide dynamic operations for a wireless device that requires service of one or more slices. Resource status information may comprise information about resources in a network (e.g., a RAN), such as radio resources, hardware resources, or interface resources. Decisions for handover, multi-connectivity initiation, and/or multi-connectivity modification for a wireless device may use resource status information to provide improved decisions to serve network slices for the wireless device based on current network conditions. For example, a wireless device with particular requirements or requests relating to the use of one or more network slices, or one or more services associated therewith, may be served by a base station making a decision for a handover, multi-connectivity initiation, and/or multi-connectivity modification for the wireless device that accounts for resources related to the one or more network slices, or associated services, for the wireless device.

A base station and/or a cell may support a resource isolation between different network slices. For example, a base station and/or a cell may provide a reliable service for a first slice if a second slice is in a high load status. To achieve the resource isolation between network slices, Neighboring base stations may provide load balancing and/or differentiated handling of communications by, e.g., controlling multiple network slices. Base stations may control multiple network slices separately or simultaneously. Base stations may exchange resource status information for different network slices with Neighboring base stations.

Network slicing in a RAN may be based on the following. RAN awareness of slices may indicate that the RAN may support a differentiated handling of traffic for different network slices, e.g., which may have been pre-configured. RAN may support the slice enabling in terms of RAN functions (e.g., the set of network functions that comprises each slice) in various ways. Selection of the RAN part of the network slice may indicate that the RAN may support the selection of the RAN part of the network slice. One or more slice ID(s) may be provided by the wireless device or the CN, which may identify one or more pre-configured network slices in the PLMN. The accepted NSSAI may be sent, e.g., by a CN to a wireless device and a RAN, after network slice selection. Resource management between slices may indicate that the RAN may support policy enforcement between slices, e.g., based on service level agreements. A single RAN node may support multiple slices. The RAN may be able to apply the best RRM policy for the SLA in place to each supported slice. Support of QoS may indicate that the RAN may support QoS differentiation within a slice.

RAN selection of a CN entity may be supported. For an initial attach, a wireless device may provide one or more slice ID(s). If available, the RAN may use the slice ID(s) for routing the initial NAS to an NGC CP function. If the wireless device does not provide any slice ID(s), the RAN may send the NAS signaling to a default NGC CP function. For subsequent accesses, the wireless device may provide a temporary identifier (e.g., Temp ID), which may be assigned to the wireless device by the NGC, e.g., to enable the RAN to route the NAS message to the appropriate NGC CP function as long as the Temp ID is valid (e.g., the RAN may be aware of and may be able to reach the NGC CP function which may be associated with the Temp ID). Additionally or alternatively, one or more methods for initial attach may apply. Resource isolation between slices may be supported by the RAN. RAN resource isolation may be achieved by using one or more RRM policies or protection mechanisms. For example, a shortage of shared resources in one slice that may otherwise break the service level agreement for another slice may be avoided. It may be possible to fully dedicate RAN resources to a certain slice.

Slice availability may be dependent on the RAN. Some slices may be available only in part of a network. Awareness in a gNB of the slices supported in the cells of its Neighboring gNBs may be beneficial for inter-frequency mobility, e.g., in a connected mode. It may be assumed that the slice configuration may or may not change within the wireless device's registration area. The RAN and the CN handle a service request for a slice that may or may not be available in a given area. Admission or rejection of access to a slice may depend upon one or more factors such as support for the slice, availability of resources, or support of the requested service by other slices. Slice availability in a RAN may be handled during mobility. Neighbor gNBs may exchange slice availability on the interface connecting two nodes, e.g., an Xn interface between gNBs or any other interface between base stations. The core network may provide the RAN a mobility restriction list. This list may comprise those TAs (Tracking Areas) which support, or do not support, the slices for the wireless device. The slices supported at the source node may be mapped, e.g., if possible, to other slices at a target node. Examples of possible mapping mechanisms may comprise one or more of: mapping by the CN, e.g., if there may be a signaling interaction between the RAN and the CN and performance may not be impacted; mapping by the RAN, e.g., as an action following prior negotiation with the CN during a wireless device connection setup; or mapping by the RAN autonomously, e.g., if prior configuration of mapping policies took place at the RAN. Associating a wireless device with multiple network slices simultaneously may be supported. If a wireless device is associated with multiple slices simultaneously, a single signaling connection may be maintained.

A slice ID may be included as part of a PDU session information that may be transferred during mobility signaling, e.g., to provide mobility slice awareness for network slicing. By providing the slice ID, slice-aware admission and congestion control may be enabled. If a target cell is selected, handover signaling may be initiated and may attempt to move PDU session resources for active slices of the wireless device from one node to another node. A first gNB (e.g., source gNB) may be required to hand over slices, which a wireless device in question may be using, to a second gNB (e.g., target gNB) as part of a handover procedure. If a handover procedure involves a NGC (e.g., a core network node), during the procedure the target AMF (Access and Mobility Management Function, e.g., a core network node) may align the set of slices supported in the new registration area between the wireless device and the network at a NAS level. PDU sessions that may be associated with the removed slices may be not admitted at a target node.

A core network node may validate that a wireless device has the rights to access a network slice. Prior to receiving an initial context setup request message, the RAN may be allowed to apply some provisional and/or local policies, e.g., based on awareness of to which slice the wireless device may be requesting access. The CN may be aware of network slices to which the wireless device may belong. During the initial context setup, the RAN may be informed of network slices for which resources may be requested.

Network slicing in a RAN may include slice awareness in the RAN that may be introduced at a PDU session level, e.g., by indicating the slice ID corresponding to the PDU session. An indication of a slice ID may further indicate: that QoS flows within a PDU session may belong to the same network slice; that, within a slice, QoS differentiation may be supported; that connection of a wireless device to multiple network slices may be supported, e.g., as multiple PDU sessions per wireless device may be able to be established; that, as a consequence of slice awareness at a PDU session level, user data pertinent to different network slices may or may not share the same NG-U tunnel; and/or that, by adding the slice ID information to the PDU session information, mobility signaling may also become slice-aware and may enable per-slice admission and/or congestion control.

Following one or more of an initial access, an establishment of a RRC connection, and a selection of a correct CN instance, the CN may establish the complete wireless device context by sending the initial context setup request message to the gNB over a NG-C interface. The message may contain the slice ID as part of the PDU session(s) resource description. Upon successful establishment of the wireless device context and allocation of PDU resources to the relevant network slice(s), the RAN may respond with the initial context setup response message.

If new PDU sessions are to be established, and/or if existing PDU sessions are to be modified or released, the CN may request the RAN to allocate and/or release resources relative to the relevant PDU sessions, e.g., using the PDU session setup/modify/release procedures over a NG-C interface. For network slicing, slice ID information may be added per PDU session. By adding slice ID information, the RAN may be enabled to apply policies at the PDU session level according to the SLA represented by the network slice, e.g., while still being able to apply differentiated QoS within the slice. The RAN may confirm the establishment, modification, and/or release of a PDU session associated with a certain network slice, e.g., by responding with the PDU session setup/modify/release response message over the NG-C interface.

New Radio (NR) may expand and support diverse use cases and applications that may continue beyond the 3G and 4G standards, such as enhanced Mobile Broadband (eMBB), Ultra Reliable Low Latency Communication (URLLC), and massive Machine Type Communication (mMTC). In NR, the performance requirements for URLLC may be different from those for eMBB and/or mMTC. URLLC may have stringent requirements on latency and reliability. URLLC traffic may be sporadic or periodic such as the one observed in vehicular communications that may enable autonomous driving and/or in a control network of industrial plants. The packet sizes of URLLC traffic may depend on time and may vary in different transmissions. It may be possible that a wireless device may not finish an uplink (UL) transmission within the resources allocated by a base station in NR, referred to as a gNB. The different requirement for URLLC may necessitate a different treatment of URLLC traffic and the varying packet sizes of URLLC may require a flexible radio resource allocation that may reflect the change of packet size. The periodic URLLC traffic may require one or more radio resources allocated to a wireless device in accordance with the traffic periodicity. Considering these requirements, a semi-static resource configuration dedicated to a wireless device for URLLC may not satisfy URLLC services and/or packet sizes, which may result in wasting the radio resources and leading inefficient resource utilization.

NR may support an uplink (UL) transmission without a UL grant for one or more service types, which may be referred to as a grant-free (GF) UL transmission. A gNB may allocate to wireless device one or more GF UL radio resources. A wireless device configured by the gNB with the GF UL radio resources may transmit one or more data packets via the GF UL radio resources without a UL grant, which may result in reducing the signaling overhead comparing with a grant-based (GB) UL transmission. Such a service type that has strict requirements, for example in terms of latency and reliability such as URLLC, may be a candidate for which a gNB may configure a wireless device with the GF UL transmission. The wireless device configured with the GF UL radio resource may skip a UL transmission on the GF UL radio resource if there is no data to transmit. GF UL transmission may support multiple wireless devices to access the same GF UL radio resources, which may be referred to as a GF radio resource pool. GF radio resource pool may be utilized to achieve lower latency and lower signaling overhead than a GB UL transmission. A GF radio resource pool may be defined as a subset of one or more radio resources from a common radio resource set (e.g. from all uplink shared channel radio resources). The GF radio resource pool may be used to allocate exclusive or partially overlapped one or more radio resources for GF UL transmissions in a cell or to organize frequency/time reuse between different cells or parts of a cell (e.g. cell-center and cell-edge).

If a gNB configures multiple wireless devices with the same (or partially overlapped) GF radio resource pool, there may be a collision between two or more wireless devices on the GF UL transmissions. The gNB may configure one or more parameters to assign a wireless device specific demodulation reference signal (DMRS) along with the GF radio resource configuration in order to identify a wireless device ID from multiple wireless devices. The one or more parameters may indicate one or more of a root index of a set of Zadoff-Chu (ZC) sequences, a cyclic shift (CS) index, a TDM/FDM pattern index, or an orthogonal cover code (OCC) sequences or index.

For wireless device ID identification, a gNB may employ one or more preamble sequences that may be transmitted together with the uplink e.g., PUSCH, data. The one or more preamble sequences may be designed to be reliable enough to meet the detection requirement of a service, e.g., URLLC. For a wireless device configured with a GF radio resource pool, a preamble sequence may be uniquely allocated to the wireless device. A gNB may configure different GF radio resources for different sets of wireless devices such that the preamble sequences may be reused in different GF radio resources. To have reliable detection performance, the preamble sequences may be mutually orthogonal, e.g. orthogonality between ZC root sequences with different cyclic shifts. A wireless device may transmit one or more preambles together with the data block and receive a response. The data may be repeated an arbitrary number times depending on the configuration. One or more preambles may not be repeated based on reliability metrics, which may be predetermined and/or determined dynamically. The response from a gNB may be a UL grant or a dedicated ACK/NACK transmitted in the downlink control information (DCI).

The GF resource pool configuration may not be known to wireless devices and/or may be coordinated between different cells for interference coordination. If the GF resource pools are known to wireless devices, they may be semi-statically configured by wireless device-specific RRC signaling or non-wireless device-specific RRC signaling (e.g., via broadcasting SIB). The RRC signaling for GF radio resource configuration may comprise one or more parameters indicating one or more of following: GF time and frequency radio resources, DMRS parameters, a modulation and coding scheme (MCS), a transport block size (TBS), number of repetitions, a hopping pattern, and/or power control parameters.

A wireless device may need to know necessary parameters for UL GF transmission before transmitting on the resource. Accordingly, L1 signaling may be used in conjunction with RRC signaling. RRC signaling may configure the necessary parameters for GF UL transmission to the wireless device and L1 signaling may activate or deactivate the configured GF UL transmission. L1 signaling may be used to adjust, modify, or update one or more parameters associated with GF UL transmission. The L1 activation signaling may be transmitted via a PDCCH using a variety of implementations, including those similar to the signaling used for LTE UL semi-persistent scheduling (SPS). A gNB may assign a radio network temporary identifier (RNTI) for a wireless device along with GF configuration parameters in the RRC signaling. With the assigned RNTI, wireless device may monitor the PDCCH to receive the L1 activation signaling masked by the RNTI.

The MCS may be indicated by the wireless device within the grant-free data. In order to avoid the blind decoding of MCS indication, the limited number of MCS levels may be pre-configured by a gNB, e.g., K bits may be used to indicate MCS of grant-free data, where K may be as small as possible (or any number as appropriate). The number of resource elements (REs) used to transmit MCS indication in a resource group may be statically and/or dynamically configured. In GF operation, there may be one common MCS predefined for all wireless devices. In this case, there may be a trade-off between a spectrum efficiency and decoding reliability, e.g., the spectrum efficiency may be reduced if a low level of MCS is used while the data transmission reliability gets higher. NR may predefine a mapping rule between multiple time/frequency resources for UL grant-free transmission and MCSs. A wireless device may select an appropriate MCS according to a DL measurement and associated time/frequency resources to transmit UL data. In this way, a wireless device may choose a MCS based on the channel status and increase the resource utilization.

When a wireless device is configured with a GF UL transmission, the GF UL transmission may be activated in different ways, e.g., via RRC signaling and/or via L1 activation signaling. The need for L1 activation signaling may depend on actual service types, and the dynamic activation (e.g., activation via L1 signaling) may not be supported in NR or may be configurable based on service and traffic considerations. A gNB may determine whether to configure a wireless device with or without L1 activation signaling. The configuration of a wireless device may be determined based on, for example, traffic pattern, latency requirements, and/or other possible aspects. With L1 activation signaling, a wireless device may be able to transmit data with the configured time frequency radio resource after receiving L1 activation signaling from the gNB. If the L1 activation is not configured, a wireless device may start a UL transmission with the configured GF radio resource at any moment or in a certain time interval, which may be configured by RRC signaling or pre-defined, when the configuration is completed.

RRC signaling, transmitted from a gNB to a wireless device to configure a UL GF transmission, may comprise an indicator used for indicating whether the activation of the UL GF transmission needs a L1 activation signaling. If the indicator indicates a need of L1 activation signaling, the wireless device may wait for a L1 activation signaling and activate the configured UL GF transmission, e.g., in response to receiving the L1 activation signaling. When the L1 signaling is used, gNB may need to know whether the wireless device correctly receives it. The wireless device may transmit an acknowledgement in response to the L1 signaling from the gNB.

If the indicator indicates no need of L1 activation signaling, the UL GF transmission may be activated, e.g., in response to the RRC signaling configuring the GF UL transmission. For the activation of GF UL transmissions without the L1 activation signaling, the wireless device may not determine when to start the GF UL transmission. The gNB and the wireless device may predefine the start timing based on the subframe, slot, or mini-slot where the wireless device received the RRC signaling for the GF UL transmission configuration. The RRC configuration may comprise one or more parameters indicating the start timing in terms of a subframe, slot, and/or mini-slot.

The RRC signaling may not include an indicator (e.g., a dedicated flag or other data element) indicating whether a L1 activation signaling shall be utilized. A wireless device may determine whether the configured GF transmission is activated by RRC or L1 signaling based on a format of RRC configuration. For a GF UL transmission without L1 activation signaling, the RRC signaling for configuring and activating the GF UL transmission may comprise one or more parameters necessary for the UL GF transmission. For a GF UL transmission requiring the L1 activation signaling, a RRC signaling may comprise a different set of parameters. In this case, the absence of one or more parameters in the RRC signaling may be an implicit indicator for a wireless device to activate the GF UL transmission via L1 activation signaling.

The L1 activation signaling may comprise one or more parameters indicating one or more of GF configuration (e.g., start timing of GF UL transmission, GF time and frequency radio resources), DMRS parameters, a modulation and coding scheme (MCS), a transport block size (TBS), number of repetitions K, a hopping pattern, and/or power control parameters. A downlink control information (DCI) format used for the activation of the GF UL transmission may comprise one or more fields indicating a MCS for the GF UL transmission. In this case, the GF UL transmission requiring the L1 activation signaling may be configured with a RRC signaling that may not comprise one or more parameters indicating the MCS for the GF UL transmission. The MCS information may be carried by a L1 signaling which activate the GF UL transmission. If a wireless device receives a RRC signaling comprising a MCS for a GF UL transmission, the wireless device may activate the GF UL transmission in response to the RRC signaling without waiting for a L1 signaling.

The L1 activation signaling may be configured to control network resource load and utilization. For a delay sensitive service, the additional activation signaling may cause additional delay and may lead to potential service interruption or unavailability for the period of applying and requesting the activation. A gNB may configure the wireless device with a GF UL transmission such that the GF UL transmission is activated in response to the RRC signaling comprising a GF radio resource configuration and transmission parameters.

If the GF radio resource is over-allocated, there may be a waste of radio resources when few wireless devices are present. In this case, L1 signaling may be used to reconfigure the GF UL radio resource or one or more GF transmission parameters. By allowing L1 signaling-based reconfiguration, wireless devices may periodically monitor downlink control channel(s) to detect the L1 signaling, scrambled by a RNTI, that may indicate whether the configured GF radio resources or parameters are changed. This may increase the power consumption of wireless device, and the periodicity to check the downlink control signaling may be configurable. If a radio resource utilization is important, the periodicity may be configured to be short (such as every 1 minute or every radio frame), although any period may be chosen. If the power consumption is important, the periodicity may be configured to be long (such as every hour), although any period may be chosen. The periodicity to check downlink control signaling may be allowed to be separated from the periodicity of GF UL transmission, e.g., in order to shorten the latency. For example, the periodicity of GF radio resource may be less than 1 ms but the periodicity to check downlink control signaling may be 1 minute or 1 hour. For deactivating the activated GF operation, L1 deactivation signaling may be used for all services in order to release resources as fast as possible.

In NR, a time alignment timer (TAT) of a timing advance group (TAG) associated with a cell may expire when a wireless device configured with a GF UL transmission is in the cell. When the TAT expires, the wireless device may release the GF configuration associated with the GF UL transmission. If the wireless device is configured with one or more GF UL transmissions on other serving cells belonging to the same TAG, the wireless device may release one or more GF configurations associated with the other serving cells in response to the expiry of the TAT of the TAG. A gNB may reconfigure the wireless device with a GF UL transmission on the cell when the wireless device receives a timing advance command (TAC) MAC control element (CE) or a TAC in a random access response message for the cell.

Grant-free uplink transmission may be activated, by a wireless device, after or in response to receiving a RRC message. The RRC message may configure the grant-free uplink transmission. If an SCell is not activated, the wireless device may not be able to activate grant-free uplink transmissions via the SCell, and the wireless device may not be able to use the grant-free uplink transmission. A base station may transmit, and the wireless device may receive, a medium access control (MAC) control element (CE) to activate the SCell, and the wireless device may activate radio resources associated with grant-free uplink transmissions via the SCell. Additionally or alternatively, the base station may transmit (and the wireless device may receive) an activation message, via a RRC message or via downlink control information or via an indicator in any other message, to activate radio resources associated with grant-free uplink transmissions via the SCell.

Figure 15:
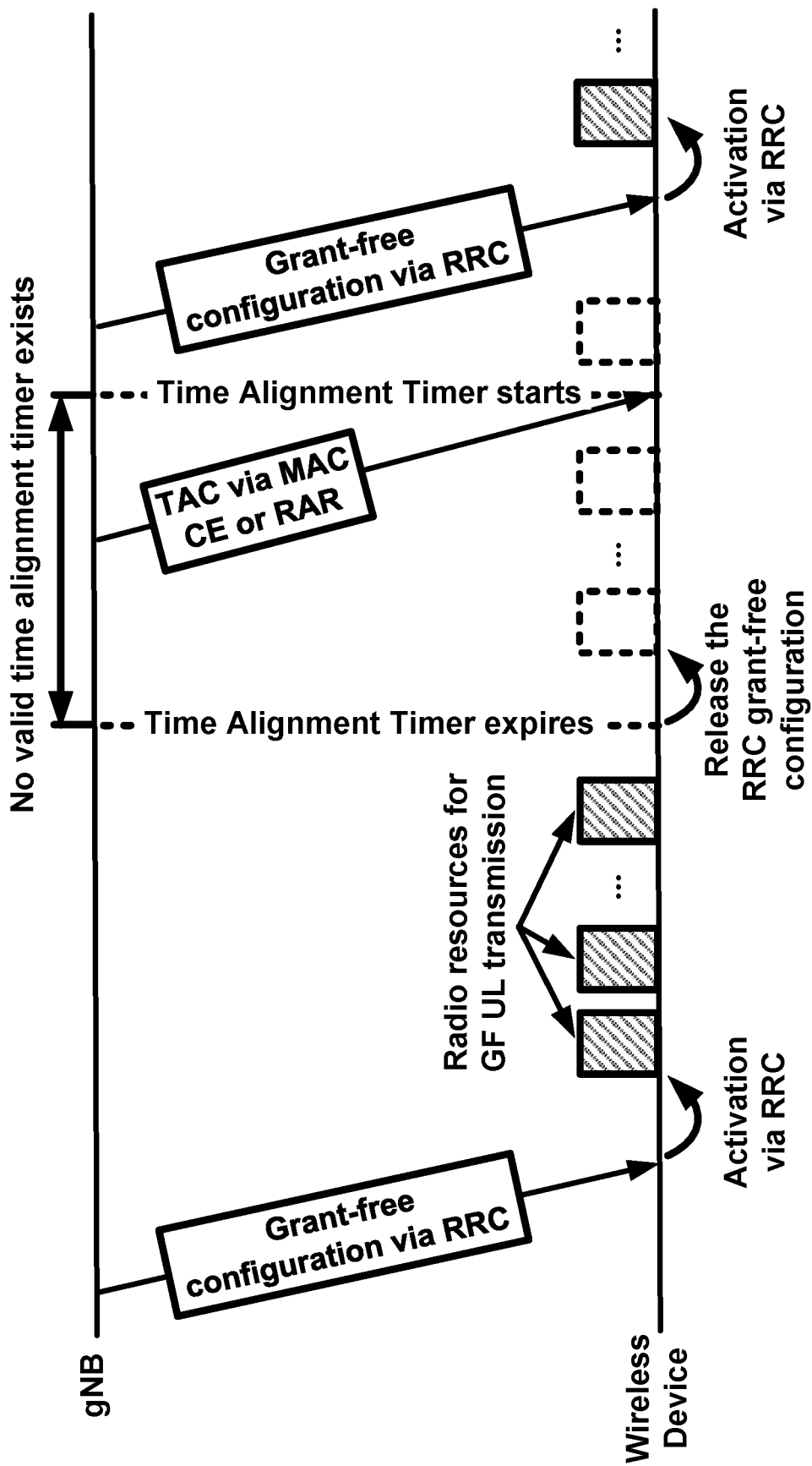
FIG. 15 is an example of an activation of GF UL transmission via RRC release and re-configuration when a time alignment timer expires.

FIG. 15 is an example of an activation of GF UL transmission via RRC release and re-configuration when a time alignment timer expires. A base station may transmit one or more messages comprising parameters indicating one or more radio resources. With respect to FIG. 15, a base station (e.g., a gNB) may transmit a GF configuration, via a RRC message, to a wireless device to activate the one or more radio resources. The one or more resources may be for a PCell or an SCell. The wireless device may execute an activation of radio resources indicated by the GF configuration for GF UL transmission, e.g., after or in response to the RRC message. Prior to receiving the GF configuration, the wireless device may not be able to use the radio resources for GF UL transmission. If a timer alignment timer expires, the wireless device may release the radio resources associated with the RRC GF configuration and the wireless device may not be able to transmit uplink transmissions via the radio resources associated with the RRC GF configuration. If there is no valid time alignment timer, the gNB may transmit a TAC, e.g., via MAC CE or RAR, to start a time alignment timer (or restart an expired time alignment timer). If the time alignment timer starts (or restarts), and the time alignment timer has not expired, the base station (e.g., gNB) may transmit a GF configuration, e.g., via a RRC message, to the wireless device, and the wireless device may activate the radio resources indicated by the received GF configuration as described above. After a time alignment timer expires, the wireless device may be able to use the released radio resources for the GF UL transmission, without initiating a random access procedure, by: receiving the TAC to restart the time alignment timer, and receiving a GF configuration via a RRC message to reactivate the radio resources. By not having to initiate a random access procedure to reactivate released radio resources, latency may be reduced.

Releasing and reconfiguring of the GF configuration may utilize one or more RRC signals that may result in increasing a signaling overhead and latency. In NR, a wireless device may not release a GF configuration configured on a cell when a TAT of a TAG associated with the cell expires. In this case, instead of releasing the GF configuration, the wireless device may keep the GF configuration and activate a GF UL transmission associated with the GF configuration in response to a TAT associated with the cell being started. There may be different ways to activate the GF configuration without release and reconfiguration of the GF configuration. When a TAT associated with a cell configured with a GF configuration for a wireless device expires, the wireless device may clear one or more scheduled GF UL transmissions without releasing the GF configuration configured by one or more RRC signals. A gNB may transmit a L1 signaling message to activate the configured GF UL transmission, e.g., after or in response to a TAT associated with the cell being updated via RAR and/or MAC CE. For a GF UL transmission activated by a RRC signaling, gNB may transmit a L1 signaling to activate the GF UL transmission.

Figure 16:
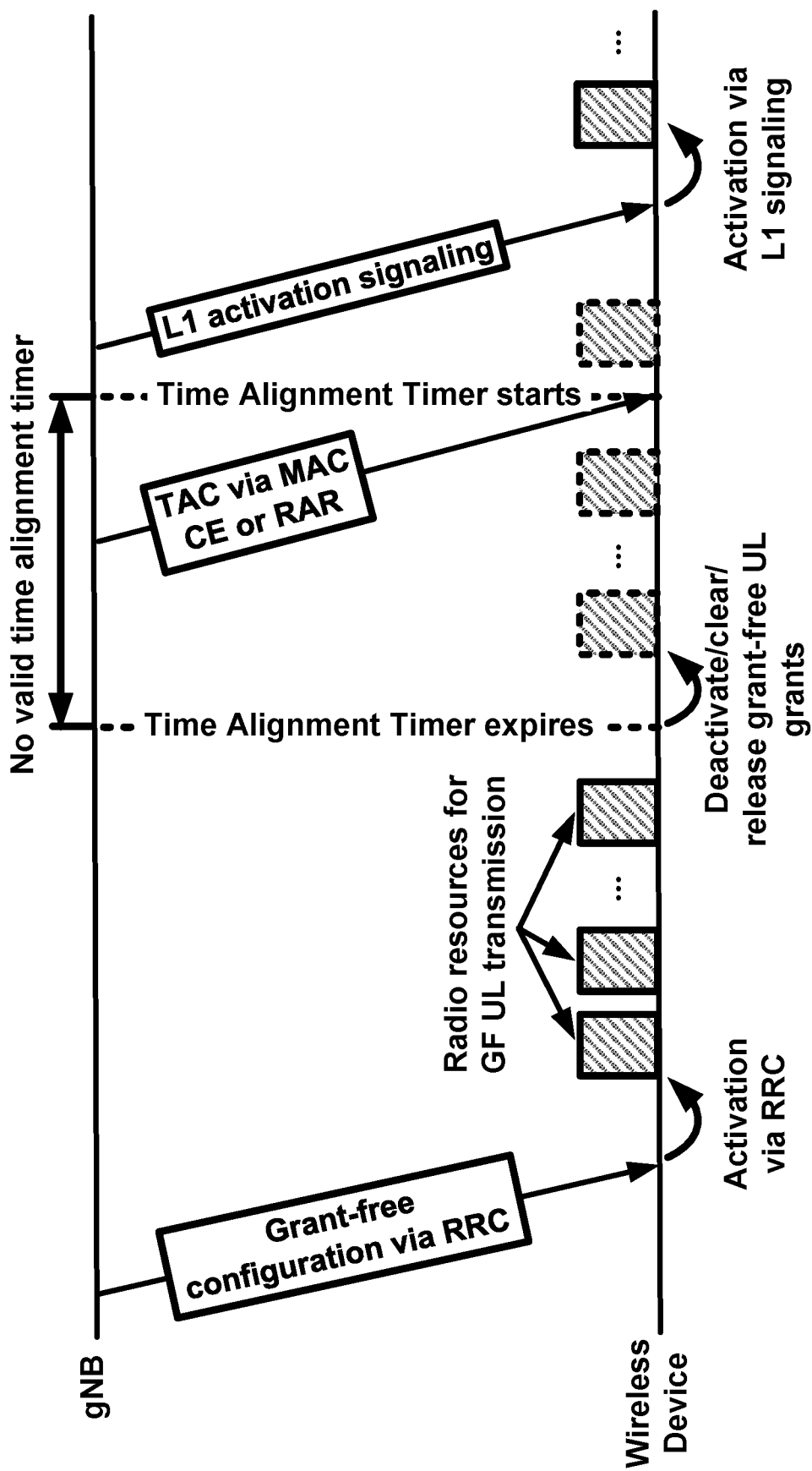
FIG. 16 is an example of an activation of GF UL transmission via L1 activation signalling without RRC release when a time alignment timer expires.

FIG. 16 is an example of an activation of GF UL transmission via L1 activation signalling without a RRC release when a time alignment timer expires. A base station may transmit one or more messages comprising parameters indicating one or more radio resources. With respect to FIG. 16, a base station (e.g., a gNB) may transmit a GF configuration, e.g., via a RRC message, to a wireless device to activate the one or more radio resources. The one or more resources may be for a PCell or an SCell. The wireless device may execute an activation of radio resources for GF UL transmission, e.g., after or in response to the RRC message. If a timer alignment timer expires, the wireless device may release the radio resources associated with the GF UL configuration. If there is no valid time alignment timer, the gNB may transmit a TAC, e.g., via MAC CE or RAR, to start a time alignment timer (or restart an expired time alignment timer). If the time alignment timer starts (or restarts), and the time alignment timer has not expired, the base station (e.g., gNB) may transmit a GF configuration, e.g., via L1 activation signaling, to the wireless device, and the wireless device may activate the radio resources, e.g., via the L1 signaling. After a time alignment timer expires, the wireless device may be able to use the released radio resources for the GF UL transmission, without initiating a random access procedure, by: receiving the TAC to restart the time alignment timer, and receiving L1 activation signaling to reactivate the radio resources. By not having to initiate a random access procedure to reactivate released radio resources, latency may be reduced A wireless device may be configured with multiple GF configurations. A gNB may assign an index to a GF UL configuration along with the GF configuration. The L1 signaling may comprise one or more parameters indicating an index of a GF UL configuration. If the GF UL configuration is activated via L1 signaling, the L1 signaling may comprise the index to indicate an activation of the GF UL configuration associated with the index. For the L1 activation signaling, a DCI format that comprises one or more parameters used for indicating the index may be used in NR. If a wireless device receives a L1 activation signaling comprising an index, the wireless device may activate the GF UL transmission associated with the GF configuration indicated by the index. A gNB may assign a logical channel ID (LCID) to the service and configure the wireless device with a GF configuration, along with the assigned LCID, to restrict the use of the GF configuration to the service indicated by the LCID. A gNB may transmit an activation signaling that comprises one or more LCIDs associated with the GF UL configuration. For the activation signaling, a MAC CE that comprises one or more parameters used for indicating one or more LCID of a GF UL configuration may be used in NR. If a wireless device receives an activation signaling comprising one or more LCIDs, the wireless device may activate the GF UL transmission associated with one or more GF configurations indicated by the one or more LCIDs. A GF UL transmission may be activated on a subframe, slot, and/or mini-slot, if a wireless device receives an activation signaling, with a time offset. The time offset may be pre-defined or configured, e.g., in the RRC signaling or in the activation signaling.

If a first TAT associated with a cell expires, and if a wireless device is configured with a GF configuration, the wireless device may clear one or more scheduled GF UL transmissions without releasing the GF configuration. The GF configuration may be configured, e.g., by one or more RRC signals. A second TAT associated with the cell may start, and the wireless device may be configured for a GF UL transmission via the cell using one or more messages, e.g., comprising a TAC associated with the second TAT, to activate the GF UL transmission. The wireless device may receive the second TAC, e.g., via a TAC MAC CE and/or a random access response message. In this case, an activation of GF UL transmission may not need a L1 signaling for reactivation nor RRC signaling for reconfiguration. A wireless device may have a TAT configured for a TAG associated with a cell if the wireless device is configured with a GF UL transmission. If the TAT expires, the wireless device may clear the activated GF UL transmission without releasing the GF RRC configuration associated with the GF UL transmission. The wireless device may reactivate the configured GF UL transmission associated with the GF RRC configuration, e.g., after or in response to receiving a TAC associated with the TAT of the cell.

Figure 17:
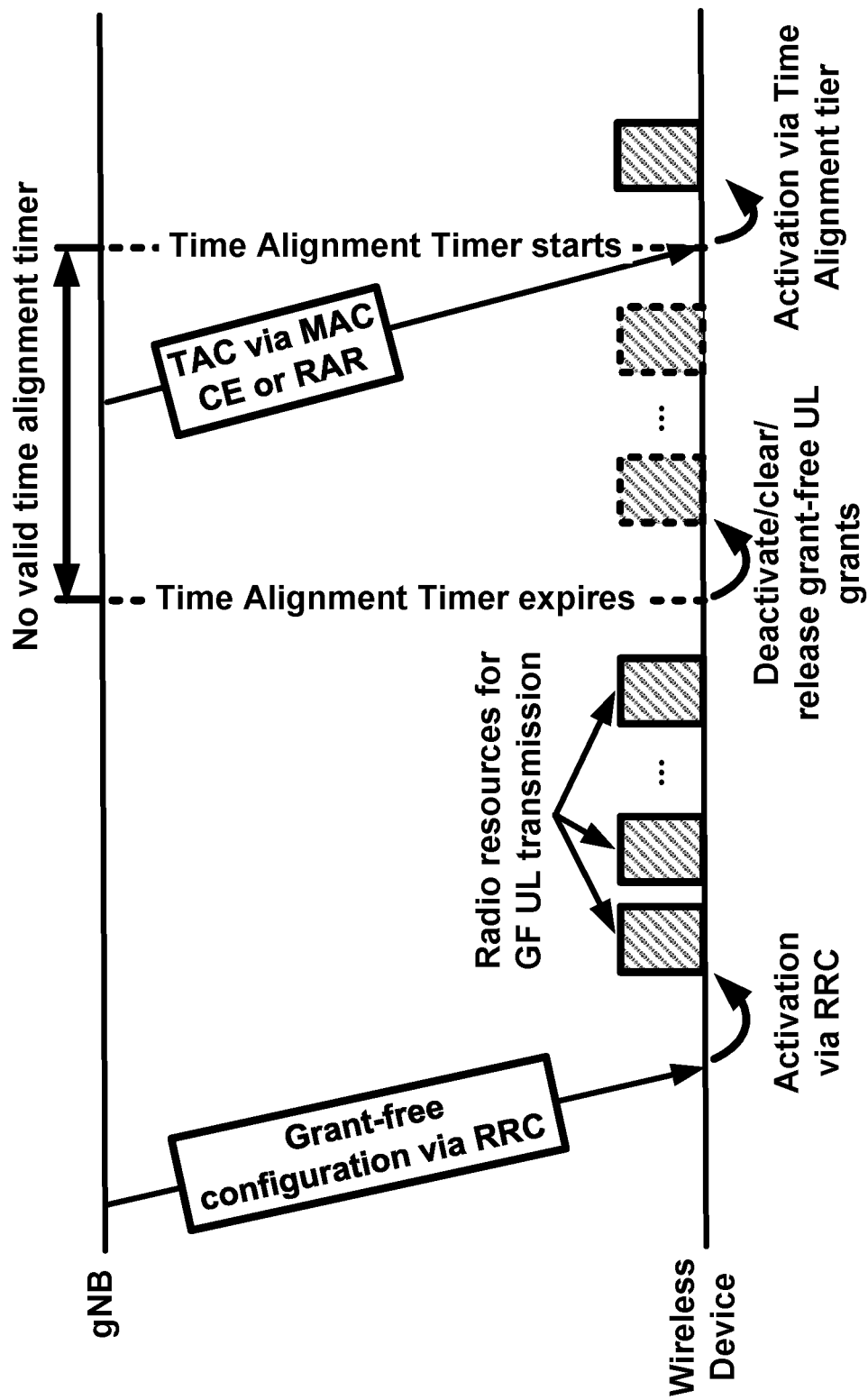
FIG. 17 is an example of an activation of GF UL transmission via a time alignment timer (TAT) without RRC release, RRC re-configuration, or L1 activation signaling when a time alignment timer expires.

FIG. 17 is an example of an activation of GF UL transmission, e.g., via a TAT without a RRC release, a RRC re-configuration, or L1 activation signaling if a time alignment timer expires. A base station may transmit one or more messages comprising parameters indicating one or more radio resources. With respect to FIG. 17, a base station (e.g., a gNB) may transmit a GF configuration, e.g., via a RRC message, to a wireless device to activate the one or more radio resources. The one or more resources may be for a PCell or an SCell. The wireless device may execute an activation of radio resources for GF UL transmission, e.g., via the RRC message. If a timer alignment timer expires, the wireless device may deactivate, clear, and/or release the radio resources associated with the GF UL configuration, and the wireless device may not be able to transmit uplink transmissions via the radio resources associated with the RRC GF configuration. If there is no valid time alignment timer, the gNB may transmit a TAC, e.g., via MAC CE or RAR, to start (or restart) a time alignment timer. If the time alignment timer starts (or restarts), and the time alignment timer has not expired, the wireless device may activate the radio resources, e.g., after or in response to the staring (or restarting) of the time alignment timer. After a time alignment timer expires, the wireless device may be able to use the released radio resources for the GF UL transmission, without initiating a random access procedure, by: receiving the TAC to restart the time alignment timer. By not having to initiate a random access procedure to reactivate released radio resources, latency may be reduced.

A wireless device may be configured with multiple GF UL transmissions on multiple serving cells associated with a same TAG. In this case, if the TAT associated with the TAG expires, the wireless device may clear the activated multiple GF UL transmissions associated with the serving cells in the TAG.

A TAT associated with a TAG may not be running if a wireless device is configured with one or more GF UL transmissions for one or more serving cells belonging to the TAG. In this case, if the wireless device receives a TAC for the TAG, the one or more GF UL transmission for one or more serving cells belonging to the TAG may be activated, e.g., after or in response to the receiving the TAC.

A wireless device may receive, from a base station (e.g. gNB), one or more messages comprising a plurality of parameters for configuring a GF UL transmission for a cell belonging to a first time alignment group. The first time alignment group may be configured with a first time alignment timer (TAT). The wireless device may activate the GF UL transmission, e.g., after or in response to the receiving the one or more messages. The wireless device may clear the activated GF UL transmission, e.g., after or in response to an expiry of the first TAT. The wireless device may receive, from the base station via a downlink control channel, a downlink channel information comprising one or more parameters activating the GF UL transmission. The wireless device may activate the GF UL transmission, e.g., after or in response to the receiving the downlink channel information.

A wireless device may receive, from a base station, one or more messages comprising a plurality of parameters for configuring a GF UL transmission for a cell belonging to a first time alignment group (TAG). The first time alignment group may be configured with a first time alignment timer (TAT). The wireless device may activate the GF UL transmission, e.g., after or in response to the receiving the one or more messages. The wireless device may clear the activated GF UL transmission, e.g., after or in response to an expiry of the first TAT. The wireless device may receive, from the base station, one or more messages comprising a timing advance command (TAC) for a second TAG associated with the cell. The wireless device may activate the GF UL transmission, e.g., after or in response to receiving the TAC. The first TAG and the second TAG may be the same. The wireless device may receive the TAC in a timing advance command MAC control element associated with the second TAG. The wireless device may receive the TAC in a random access response message associated with the second TAG.

A wireless device may receive, from a base station, one or more messages comprising a plurality of parameters for configuring a GF UL transmission for a cell belonging to a first time alignment group (TAG) configured with a first time alignment timer (TAT). The wireless device may receive, from the base station via a downlink control channel, a downlink channel information comprising one or more parameters activating the GF UL transmission. The wireless device may activate the GF UL transmission, e.g., after or in response to the receiving the downlink channel information. The wireless device may clear the activated GF UL transmission, e.g., after or in response to an expiry of the first TAT. The wireless device may receive, from the base station, one or more messages comprising a timing advance command (TAC) for a second TAG associated with the cell. The wireless device may activate the GF UL transmission, e.g., after or in response to receiving the TAC. For example, the first TAG and the second TAG may be the same. The wireless device may receive the TAC in a timing advance command MAC control element associated with the second TAG. The wireless device may receive the TAC in a random access response message associated with the second TAG.

Secondary cells (SCells) may be supported in NR, particularly when a variety of additional resources (such as bandwidth, latency, frequency spectrum, etc.) are needed to provide the requested level of service. NR may support a GF UL transmission on a secondary cell. For example, a primary cell may be configured for serving an eMBB service, and a SCell may be configured for serving mMTC or URLLC service for which a GF UL transmission may be configured. A GF UL transmission via a secondary cell may be configured by one or more RRC messages comprising a plurality of GF configuration parameters. A wireless device may receive the one or more RRC messages from a base station via a primary cell. The plurality of GF configuration parameters may indicate one or more of GF time and frequency radio resources, DMRS parameters, a modulation and coding scheme (MCS), a transport block size (TBS), number of repetitions K, a hopping pattern, an indicator indicating whether the GF UL transmission is activated via RRC signaling, power control parameters, or a RNTI.

For a GF UL transmission on a SCell, if the SCell is not activated, the GF UL transmission may not be activated at least until the SCell is activated. In this case, a message transmitted from a base station to activate a configured SCell may activate the configured GF UL transmission. If a wireless device configured with a SCell receives an activation/deactivation MAC control element (CE) in this TTI, the wireless device may, in the TTI, activate the SCell. If the wireless device is configured with a GF UL transmission on the SCell, the wireless device may activate the configured GF UL transmission in response to activating the SCell. If a wireless device receives one or more RRC messages configuring a GF UL transmission via an activated SCell, the wireless device may activate the GF UL transmission in response to receiving the one or more RRC messages.

Figure 18:
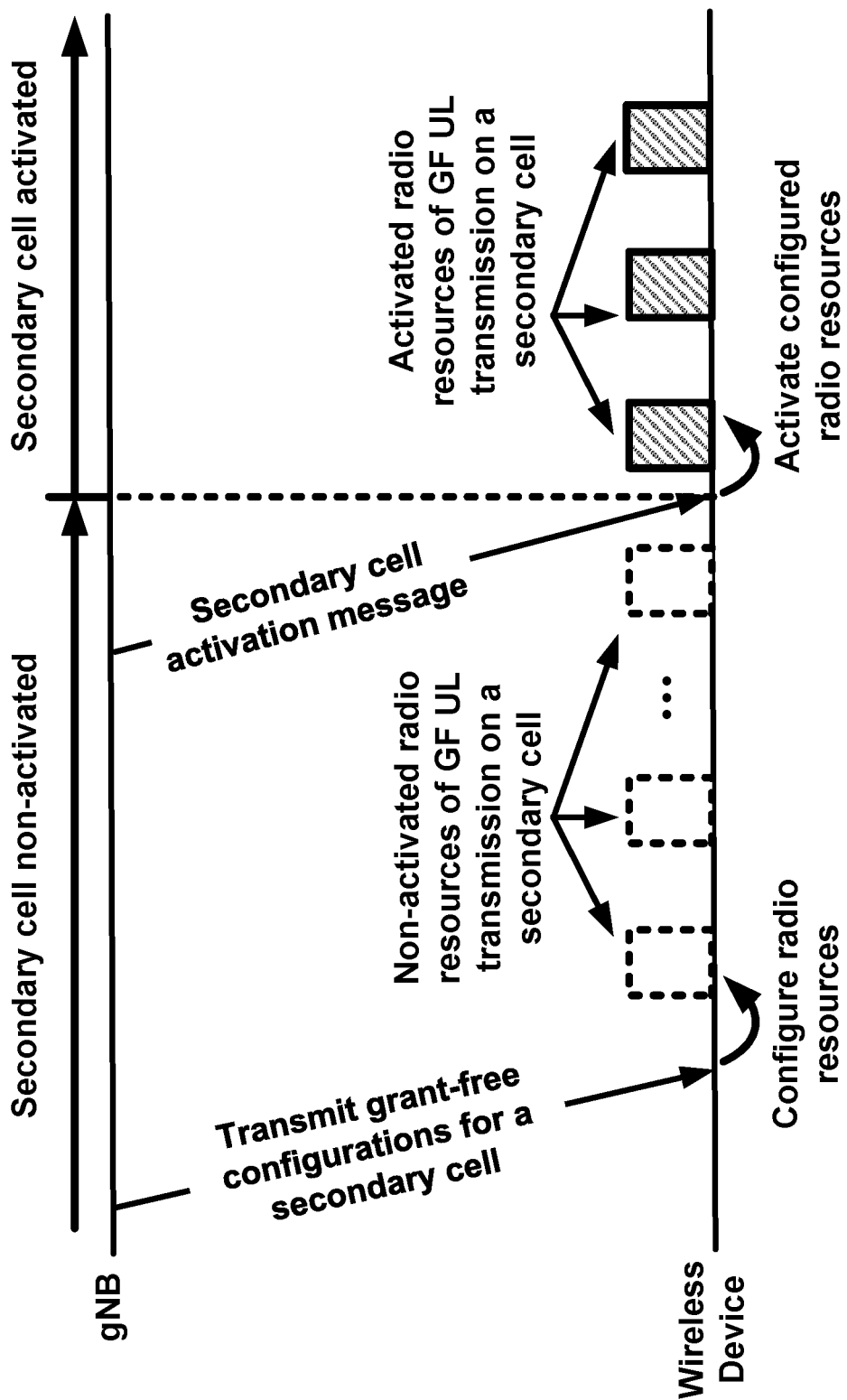
FIG. 18 is an example of an activation of a secondary cell.

FIG. 18 is an example of an activation of a secondary cell. A base station may transmit one or more messages comprising parameters indicating one or more radio resources. With respect to FIG. 18, a base station (e.g., gNB) may transmit GF configurations for a SCell to a wireless device, e.g., if a SCell is not activated. The wireless device may configure radio resources for the non-activated radio resources associated with GF UL transmission on a SCell. The gNB may transmit a secondary cell activation message to the wireless device and, if the SCell is activated, the wireless device may activate the configured radio resources. By using a MAC CE to activate an SCell, a base station may activate an SCell with reduced signaling overhead and reduced latency.

There may be a case that the activation/deactivation MAC CE may not activate a configured GF UL transmission on a SCell. One or more RRC messages configuring a GF UL transmission may comprise an indicator indicating that the activation of the configured GF UL transmission requires L1 signaling. If a wireless device receives such an indicator, the wireless device may not activate a configured GF UL transmission, e.g., after or in response to receiving an activation/deactivation MAC CE. The wireless device may start to monitor a PDCCH with a RNTI for the SCell, e.g., after or in response to receiving the activation/deactivation MAC CE. The RNTI may be assigned to the wireless device for monitoring a PDCCH order for a GF UL transmission and may be transmitted, e.g., via a RRC signaling configuring the GF UL transmission. The wireless device may activate the GF UL transmission, e.g., based on the wireless device receiving the L1 signaling via the monitoring PDCCH.

L1 signaling may be used to activate a configured GF UL transmission without an indicator of whether to activate a GF UL transmission via L1 signaling. For example, a wireless device may receive one or more RRC messages configuring a GF UL transmission on an activated SCell, wherein the one or more RRC messages may not comprise an indicator of whether to activate a GF UL transmission via L1 signaling. In this case, the activation of a GF UL transmission on the activated SCell may be done by L1 signaling. The wireless device may monitor a PDCCH for the activated SCell to detect a L1 signaling activating the GF UL transmission and activate the GF UL transmission, e.g., after or in response to receiving the L1 signaling transmitted for the activation of the GF UL transmission.

Figure 19:
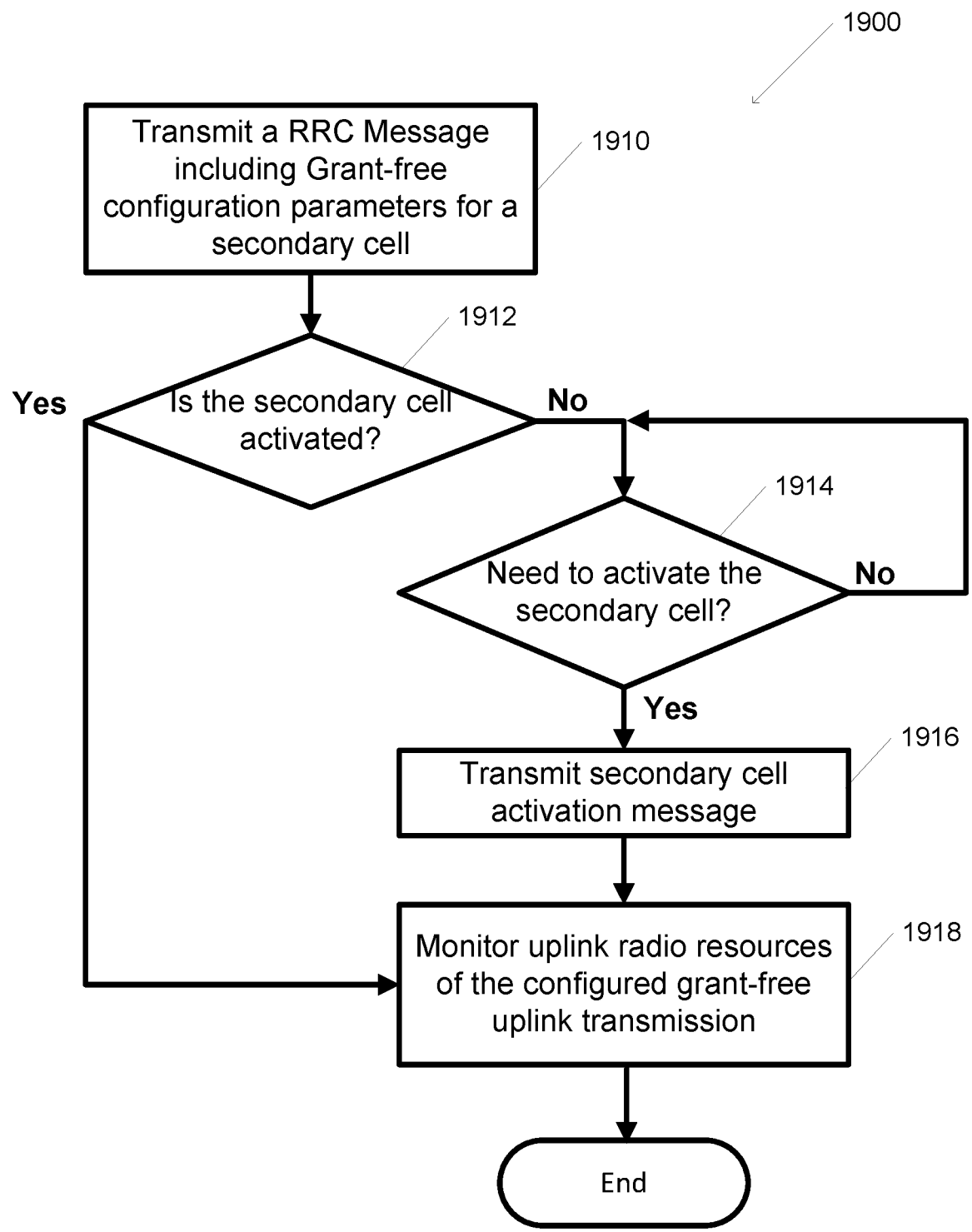
FIG. 19 is an example of monitoring uplink radio resources using a base station.

FIG. 19 shows an example process of monitoring uplink radio resources performed by and/or using a base station (e.g., a gNB). The process 1900 comprises transmitting (1910) a RRC message. The RRC message may comprise GF configuration parameters. The GF configuration parameters may be for a SCell. The base station may activate an SCell based on, e.g., a determination that the wireless requires additional capacity (e.g., more than the capacity provided by a PCell). If the SCell is activated (1912), uplink radio resources associated with the configured GF UL transmission of the SCell may be monitored (1918). For example, the base station may periodically monitor (1918) to determine whether the wireless device has transmitted data via uplink radio resources associated with the configured grant-free uplink transmission. The base station may continue periodically monitoring (1918) until it transmits a second message comprising a release of the GF UL radio resources and/or a deactivation of the SCell. If the SCell is not activated (1912), a determination may be made if the SCell needs to be activated (1914). For example, if the base station determines the wireless device requires additional bandwidth and/or capacity (e.g., if the wireless device is streaming data the wireless device may require the base station to add a carrier to support the wireless device by activating the SCell). If the SCell needs to be activated (1914), a secondary cell activation messaged may be transmitted (1916) and radio resources monitored (1918). If the SCell does not need to be activated (1914), the process may wait until the SCell needs to be activated and/or the process may end. For example, the base station may end the process by transmitting an RRC release message.

Figure 20:
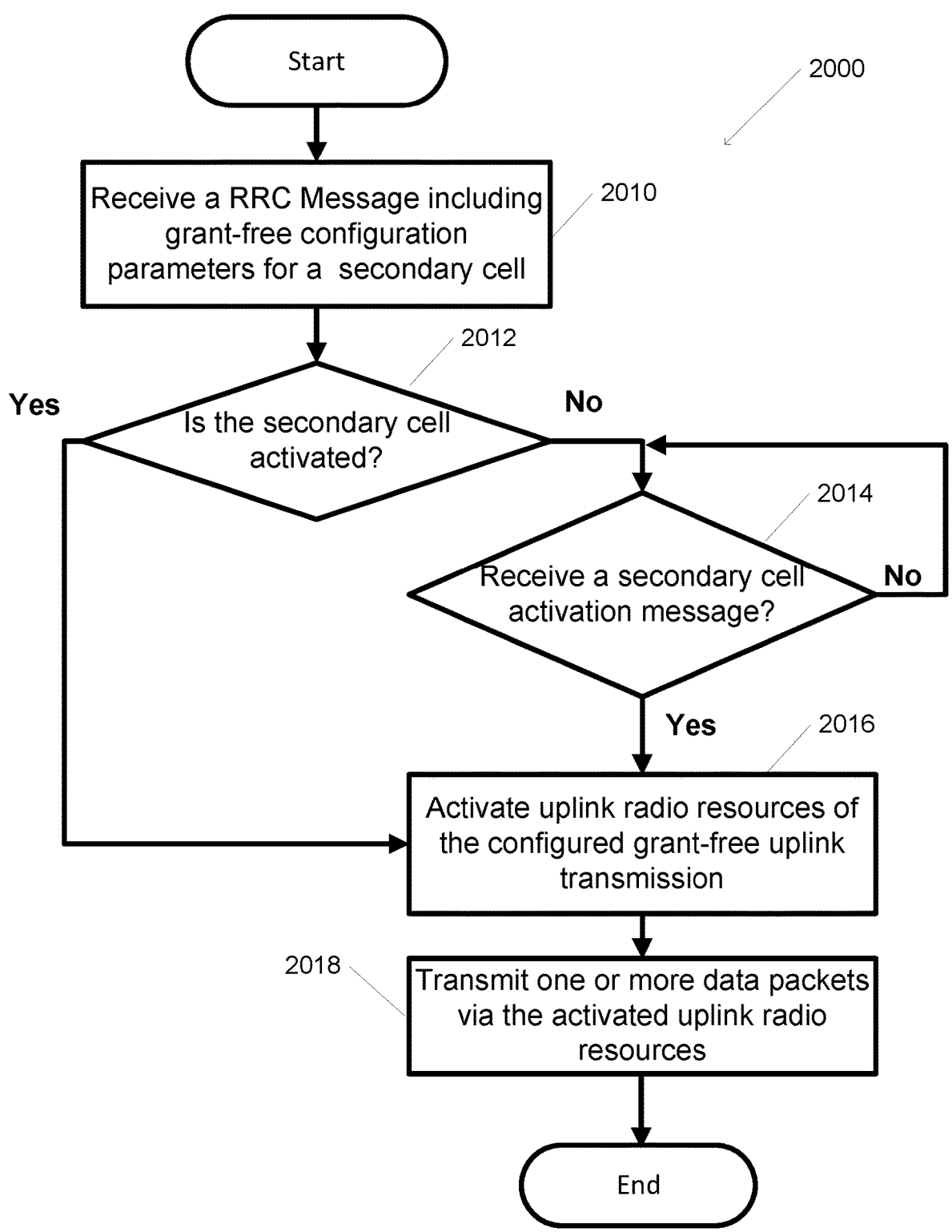
FIG. 20 is an example of activating uplink radio resources using a wireless device.

FIG. 20 shows an example process of activating uplink radio resources performed by and/or using a wireless device. The process 2000 comprises receiving (2010) a RRC message. The RRC message may comprise GF configuration parameters and the GF configuration parameters may be for a SCell. The wireless may receive from a base station a message indicating activation of the SCell. If the SCell is activated (2012), UL radio resources for the configured GF UL transmission may be activated (2016) and one or more data packets may be transmitted (2018) via the activated uplink radio resources. For example, the wireless device may activate the UL radio resources indicated in the RRC message comprising the GF configuration parameters. If the SCell is not activated (2012), a secondary cell activation message may be received (2014). If the secondary cell activation message is received (2014), the SCell may be activated and the UL radio resources may be activated (2016). After the SCell is activated and the UL radio resources are activated, data packets may be transmitted (2018). If the secondary cell activation message is not received (2014), the wireless device may wait until the message is received (2014) and/or the process may end. For example, if the wireless device receives a deactivation of the SCell or if the wireless device receives an RRC release message of the GF configuration parameters, the process may end. Additionally or alternatively, the wireless device may stop the step of transmitting data packets via the activated uplink radio resources (2018) if the wireless device receives a deactivation of the SCell or if the wireless device receives an RRC release message of the GF configuration parameters.

A base station (e.g. a gNB) and/or a wireless device may perform any combination of a step and/or a complementary step of one or more of the steps described herein. Any step performed by a gNB may be performed by any base station. A core network device, or any other device, may perform any combination of a step, or a complementary step, of one or more of the above steps. Some or all of these steps may be performed, and the order of these steps may be adjusted. Additional steps may also be performed. Any base station described herein may be a current base station, a serving base station, a source base station, a target base station, or any other base station.

A wireless device may receive from a base station, and a base station may transmit to a wireless device, at least one radio resource control message comprising one or more grant-free uplink configuration parameters for a cell. The cell may comprise a secondary cell. The one or more configuration parameters may comprise and/or indicate one or more of: radio resources associated with the cell, demodulation reference signal configuration parameters, a radio network temporary identifier, a modulation and coding scheme, a number of repeated transmissions of data packets, an indication that radio resources associated with the cell are activated (which may be based on the receiving the receiving the at least one radio resource control message and/or based on receiving a control signal from the base station), or a preamble identifier. The preamble identifier may comprise a Zadoff-Chu sequence. The wireless device may receive, and the base station may transmit, a medium access control (MAC) control element (CE) indicating an activation of the cell. The wireless device may activate, based on the receiving the MAC CE, the cell. The wireless device may activate the indicated radio resources associated with the cell, e.g., after or in response to activating the cell. The wireless device may receive, via a downlink control channel, a control signal. The wireless device may activate, based on the receiving the control signal, the radio resources associated with the cell. The control signal may be scrambled by a radio network temporary identifier. The wireless device may activate the cell by reactivating a deactivated cell. The wireless device may transmit, based on receiving the control signal, an acknowledgement to the base station. The wireless device may transmit to the base station, and the base station may receive from the wireless device, via the indicated radio resources, one or more data packets. The wireless device may transmit the one or more data packets using a modulation and coding scheme indicated by the one or more configuration parameters. The wireless device may receive, and the base station may send, a response message associated with the one or more data packets. The response message may comprise a downlink control information. A system may comprise the wireless device and the base station.

A wireless device may activate radio resources associated with a cell based on receiving, from a base station, at least one radio resource control message. The cell may comprise a secondary cell. The wireless device may determine an expiry of a time alignment timer of a cell group comprising the cell. The wireless device may clear, based on the expiry of the time alignment timer, the radio resources. The wireless device may receive, and the base station may transmit, a timing advance command of the cell group. The wireless device may activate, based on the receiving the timing advance command, the radio resources. The wireless device may transmit, based on the timing advance command and via the radio resources, one or more data packets to the base station. A system may comprise the wireless device and the base station.

Figure 21:
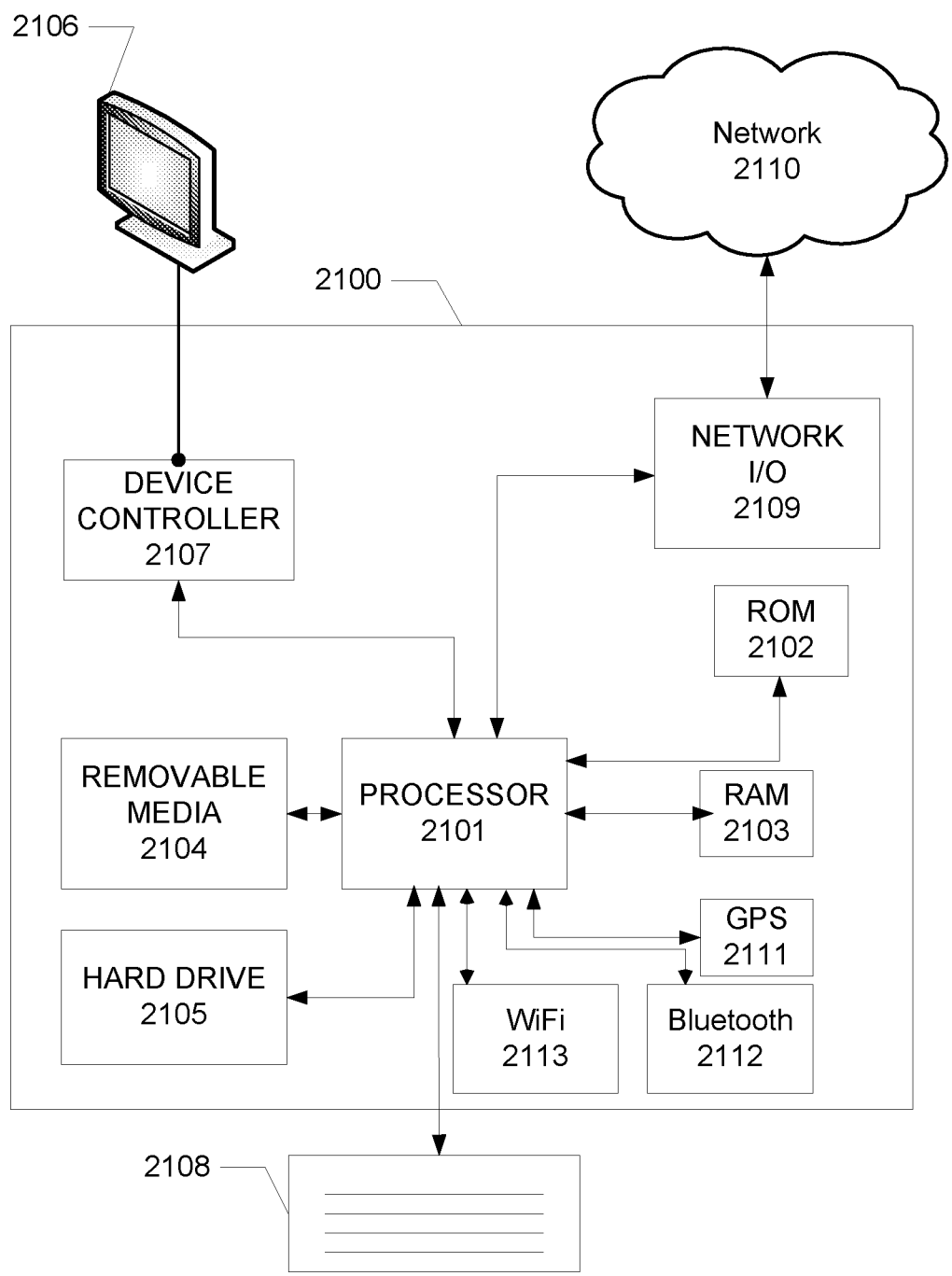
FIG. 21 shows example elements of a computing device and/or a base station.

FIG. 21 shows general hardware elements that may be used to implement any of the various computing devices discussed herein, including, e.g., the base station 401, the wireless device 406, or any other base station, wireless device, or computing device described herein. The computing device 2100 may include one or more processors 2101, which may execute instructions stored in the random access memory (RAM) 2103, the removable media 2104 (such as a Universal Serial Bus (USB) drive, compact disk (CD) or digital versatile disk (DVD), or floppy disk drive), or any other desired storage medium. Instructions may also be stored in an attached (or internal) hard drive 2105. The computing device 2100 may also include a security processor (not shown), which may execute instructions of one or more computer programs to monitor the processes executing on the processor 2101 and any process that requests access to any hardware and/or software components of the computing device 2100 (e.g., ROM 2102, RAM 2103, the removable media 2104, the hard drive 2105, the device controller 2107, a network interface 2109, a GPS 2111, a Bluetooth interface 212, a WiFi interface 2113, etc.). The computing device 2100 may include one or more output devices, such as the display 2106 (e.g., a screen, a display device, a monitor, a television, etc.), and may include one or more output device controllers 2107, such as a video processor. There may also be one or more user input devices 2108, such as a remote control, keyboard, mouse, touch screen, microphone, etc. The computing device 2100 may also include one or more network interfaces, such as a network interface 2109, which may be a wired interface, a wireless interface, or a combination of the two. The network interface 2109 may provide an interface for the computing device 2100 to communicate with a network 2110 (e.g., a RAN, or any other network). The network interface 2109 may include a modem (e.g., a cable modem), and the external network 2110 may include communication links, an external network, an in-home network, a provider's wireless, coaxial, fiber, or hybrid fiber/coaxial distribution system (e.g., a DOCSIS network), or any other desired network. Additionally, the computing device 2100 may include a location-detecting device, such as a global positioning system (GPS) microprocessor 2111, which may be configured to receive and process global positioning signals and determine, with possible assistance from an external server and antenna, a geographic position of the computing device 2100.

The example in FIG. 21 is a hardware configuration, although the components shown may be implemented as software as well. Modifications may be made to add, remove, combine, divide, etc. components of the computing device 2100 as desired. Additionally, the components may be implemented using basic computing devices and components, and the same components (e.g., processor 2101, ROM storage 2102, display 2106, etc.) may be used to implement any of the other computing devices and components described herein. For example, the various components described herein may be implemented using computing devices having components such as a processor executing computer-executable instructions stored on a computer-readable medium, as shown in FIG. 21. Some or all of the entities described herein may be software based, and may co-exist in a common physical platform (e.g., a requesting entity may be a separate software process and program from a dependent entity, both of which may be executed as software on a common computing device).

One or more features of the disclosure may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above mentioned technologies may be used in combination to achieve the result of a functional module.

Systems, apparatuses, and methods may perform operations of multi-carrier communications described herein. Additionally or alternatively, a non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a UE, a base station, and the like) to enable operation of multi-carrier communications described herein. The device, or one or more devices such as in a system, may include one or more processors, memory, interfaces, and/or the like. Other examples may comprise communication networks comprising devices such as base stations, wireless devices or user equipment (UE), servers, switches, antennas, and/or the like. Any device (e.g., a wireless device, a base station, or any other device) or combination of devices may be used to perform any combination of one or more of steps described herein, including, e.g., any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A wireless device comprising:
   one or more processors; and
   memory storing instructions that, when executed by the one or more processors, cause the wireless device to:
      receive, from a base station, at least one radio resource control message comprising one or more configuration parameters of a cell, wherein the one or more configuration parameters indicate grant-free uplink radio resources associated with the cell;
      receive, after receiving the at least one radio resource control message, a medium access control (MAC) control element (CE) indicating an activation of the cell;
      based on receiving the MAC CE, activate the cell;
      based on receiving the MAC CE, activate the grant-free uplink radio resources; and
      send, via the grant-free uplink radio resources, one or more data packets.

2. The wireless device of claim 1, wherein the instructions, when executed by the one or more processors, cause the wireless device to send the one or more data packets to the base station.

3. The wireless device of claim 1, wherein the cell comprises a secondary cell.

4. The wireless device of claim 1, wherein the one or more configuration parameters further indicate at least one of:
   demodulation reference signal configuration parameters;
   a radio network temporary identifier; or
   a preamble identifier.

5. The wireless device of claim 1, wherein the instructions, when executed by the one or more processors, cause the wireless device to send the one or more data packets according to a modulation and coding scheme, wherein the one or more configuration parameters comprise the modulation and coding scheme.

6. The wireless device of claim 1, wherein the instructions, when executed by the one or more processors, cause the wireless device to send, based on a quantity of permitted repeat transmissions, the one or more data packets, wherein the one or more configuration parameters comprise the quantity of permitted repeat transmissions for the one or more data packets.

7. The wireless device of claim 1, wherein the one or more configuration parameters further comprise at least one of:
   an indication that the grant-free uplink radio resources associated with the cell are activated based on receiving the at least one radio resource control message; or
   an indication that the grant-free uplink radio resources associated with the cell are activated based on receiving a control signal from the base station.

8. The wireless device of claim 7, wherein the instructions, when executed by the one or more processors, cause the wireless device to:

receive, via a downlink control channel, the control signal; and activate the grant-free uplink radio resources by activating the grant-free uplink radio resources based on receiving the control signal.

9. The wireless device of claim 7, wherein the control signal is scrambled by a radio network temporary identifier.

10. The wireless device of claim 7, wherein the instructions, when executed by the one or more processors, cause the wireless device to send, based on receiving the control signal, an acknowledgement.

11. The wireless device of claim 1, wherein the instructions, when executed by the one or more processors, cause the wireless device to receive a response message associated with the one or more data packets, wherein the response message comprises downlink control information.

12. The wireless device of claim 1, wherein the instructions, when executed by the one or more processors, cause the wireless device to:

determine an expiry of a time alignment timer of a cell group comprising the cell;

clear, based on the expiry of the time alignment timer, the grant-free uplink radio resources;

receive a timing advance command associated with the cell group;

re-activate, based on receiving the timing advance command, the grant-free uplink radio resources; and send, via the re-activated grant-free uplink radio resources, one or more second data packets.

13. A wireless device comprising:

one or more processors; and memory storing instructions that, when executed by the one or more processors, cause the wireless device to:

receive, from a base station, at least one radio resource control message comprising one or more configuration parameters of a cell, wherein the one or more configuration parameters indicate grant-free uplink radio resources associated with the cell;

activate, based on receiving the at least one radio resource control message, the grant-free uplink radio resources;

determine an expiry of a time alignment timer of a cell group comprising the cell;

clear, based on the expiry of the time alignment timer, the grant-free uplink radio resources;

receive a timing advance command associated with the cell group;

re-activate, based on receiving the timing advance command, the grant-free uplink radio resources; and send, via the re-activated grant-free uplink radio resources, one or more data packets.

14. The wireless device of claim 13, wherein the one or more configuration parameters further indicate at least one of:

demodulation reference signal configuration parameters;

a radio network temporary identifier; or a preamble identifier.

15. The wireless device of claim 13, wherein the instructions, when executed by the one or more processors, cause the wireless device to send the one or more data packets according to a modulation and coding scheme, wherein the one or more configuration parameters comprise the modulation and coding scheme.

16. The wireless device of claim 13, wherein the instructions, when executed by the one or more processors, cause the wireless device to send, based on a quantity of permitted repeat transmissions, the one or more data packets, wherein the one or more configuration parameters comprise the quantity of permitted repeat transmissions for the one or more data packets.

17. The wireless device of claim 13, wherein the instructions, when executed by the one or more processors, cause the wireless device to receive a response message associated with the one or more data packets, wherein the response message comprises downlink control information.

18. A non-transitory computer-readable medium comprising instructions that, when executed, configure a wireless device to:

receive, from a base station, at least one radio resource control message comprising one or more configuration parameters of a cell, wherein the one or more configuration parameters indicate grant-free uplink radio resources associated with the cell;

receive, after receiving the at least one radio resource control message, a medium access control (MAC) control element (CE) indicating an activation of the cell;

based on receiving the MAC CE, activate the cell;

based on receiving the MAC CE, activate the grant-free uplink radio resources; and send, via the grant-free uplink radio resources, one or more data packets.

19. The non-transitory computer-readable medium of claim 18, wherein the instructions, when executed, configure the wireless device to send the one or more data packets to the base station.

20. The non-transitory computer-readable medium of claim 18, wherein the cell comprises a secondary cell.

21. The non-transitory computer-readable medium of claim 18, wherein the one or more configuration parameters further indicate at least one of:

demodulation reference signal configuration parameters;

a radio network temporary identifier; or a preamble identifier.

22. The non-transitory computer-readable medium of claim 18, wherein the instructions, when executed, configure the wireless device to send the one or more data packets according to a modulation and coding scheme, wherein the one or more configuration parameters comprise the modulation and coding scheme.

23. The non-transitory computer-readable medium of claim 18, wherein the instructions, when executed, configure the wireless device to send, based on a quantity of permitted repeat transmissions, the one or more data packets, wherein the one or more configuration parameters comprise the quantity of permitted repeat transmissions for the one or more data packets.

24. The non-transitory computer-readable medium of claim 18, wherein the one or more configuration parameters further comprise at least one of:

an indication that the grant-free uplink radio resources associated with the cell are activated based on receiving the at least one radio resource control message; or an indication that the grant-free uplink radio resources associated with the cell are activated based on receiving a control signal from the base station.

25. The non-transitory computer-readable medium of claim 24, wherein the instructions, when executed, configure the wireless device to:

receive, via a downlink control channel, the control signal; and activate the grant-free uplink radio resources by activating the grant-free uplink radio resources based on receiving the control signal.

26. The non-transitory computer-readable medium of claim 24, wherein the control signal is scrambled by a radio network temporary identifier.

27. The non-transitory computer-readable medium of claim 24, wherein the instructions, when executed, configure the wireless device to send, based on receiving the control signal, an acknowledgement.

28. The non-transitory computer-readable medium of claim 18, wherein the instructions, when executed, configure the wireless device to receive a response message associated with the one or more data packets, wherein the response message comprises downlink control information.

29. The non-transitory computer-readable medium of claim 18, wherein the instructions, when executed, configure the wireless device to:
determine an expiry of a time alignment timer of a cell group comprising the cell;
clear, based on the expiry of the time alignment timer, the grant-free uplink radio resources;
receive a timing advance command associated with the cell group;
re-activate, based on receiving the timing advance command, the grant-free uplink radio resources; and
send, via the re-activated grant-free uplink radio resources, one or more second data packets.

30. A non-transitory computer-readable medium comprising instructions that, when executed, configure a wireless device to:
receive, from a base station, at least one radio resource control message comprising one or more configuration parameters of a cell, wherein the one or more configuration parameters indicate grant-free uplink radio resources associated with the cell;
activate, based on receiving the at least one radio resource control message, the grant-free uplink radio resources;
determine an expiry of a time alignment timer of a cell group comprising the cell;
clear, based on the expiry of the time alignment timer, the grant-free uplink radio resources;
receive a timing advance command associated with the cell group;
re-activate, based on receiving the timing advance command, the grant-free uplink radio resources; and
send, via the re-activated grant-free uplink radio resources, one or more data packets.

31. The non-transitory computer-readable medium of claim 30, wherein the one or more configuration parameters further indicate at least one of:
demodulation reference signal configuration parameters;
a radio network temporary identifier; or
a preamble identifier.

32. The non-transitory computer-readable medium of claim 30, wherein the instructions, when executed, configure the wireless device to send the one or more data packets according to a modulation and coding scheme, wherein the one or more configuration parameters comprise the modulation and coding scheme.

33. The non-transitory computer-readable medium of claim 30, wherein the instructions, when executed, configure the wireless device to send, based on a quantity of permitted repeat transmissions, the one or more data packets, wherein the one or more configuration parameters comprise the quantity of permitted repeat transmissions for the one or more data packets.

34. The non-transitory computer-readable medium of claim 30, wherein the instructions, when executed, configure the wireless device to receive a response message associated with the one or more data packets, wherein the response message comprises downlink control information.

35. A system comprising:
a wireless device; and
a base station;
wherein the wireless device is configured to:
receive, from the base station, at least one radio resource control message comprising one or more configuration parameters of a cell, wherein the one or more configuration parameters indicate grant-free uplink radio resources associated with the cell;
receive, after receiving the at least one radio resource control message, a medium access control (MAC) control element (CE) indicating an activation of the cell;
based on receiving the MAC CE, activate the cell;
based on receiving the MAC CE, activate the grant-free uplink radio resources; and
send, via the grant-free uplink radio resources, one or more data packets;
wherein the base station is configured to:
send, to the wireless device, the at least one radio resource control message comprising the one or more configuration parameters;
send, after sending the at least one radio resource control message, a medium access control (MAC) control element (CE) indicating an activation of the cell; and
receive, via the grant-free uplink radio resources, the one or more data packets.

36. The system of claim 35, wherein the cell comprises a secondary cell.

37. The system of claim 35, wherein the one or more configuration parameters further indicate at least one of:
demodulation reference signal configuration parameters;
a radio network temporary identifier; or
a preamble identifier.

38. The system of claim 35, wherein the wireless device is configured to send the one or more data packets according to a modulation and coding scheme, wherein the one or more configuration parameters comprise the modulation and coding scheme.

39. The system of claim 35, wherein the wireless device is configured to send, based on a quantity of permitted repeat transmissions, the one or more data packets, wherein the one or more configuration parameters comprise the quantity of permitted repeat transmissions for the one or more data packets.

40. The system of claim 35, wherein the one or more configuration parameters further comprise at least one of:
an indication that the grant-free uplink radio resources associated with the cell are activated based on receiving the at least one radio resource control message; or
an indication that the grant-free uplink radio resources associated with the cell are activated based on receiving a control signal from the base station.

41. The system of claim 40, wherein the wireless device is configured to:
receive, via a downlink control channel, the control signal; and
activate the grant-free uplink radio resources by activating the grant-free uplink radio resources based on receiving the control signal.

42. The system of claim 40, wherein the control signal is scrambled by a radio network temporary identifier.

43. The system of claim 40, wherein the wireless device is configured to send, based on receiving the control signal, an acknowledgement.

44. The system of claim 35, wherein the wireless device is configured to receive a response message associated with the one or more data packets, wherein the response message comprises downlink control information.

45. The system of claim 35, wherein the wireless device is configured to:
   determine an expiry of a time alignment timer of a cell group comprising the cell;
   clear, based on the expiry of the time alignment timer, the grant-free uplink radio resources;
   receive a timing advance command associated with the cell group;
   re-activate, based on receiving the timing advance command, the grant-free uplink radio resources; and
   send, via the re-activated grant-free uplink radio resources, one or more second data packets.

46. A system comprising:
   a wireless device; and
   a base station,
   wherein the wireless device is configured to:
      receive, from the base station, at least one radio resource control message comprising one or more configuration parameters of a cell, wherein the one or more configuration parameters indicate grant-free uplink radio resources associated with the cell;
      activate, based on receiving the at least one radio resource control message, the grant-free uplink radio resources;
      determine an expiry of a time alignment timer of a cell group comprising the cell;
      clear, based on the expiry of the time alignment timer, the grant-free uplink radio resources;
      re-activate, based on receiving a timing advance command, the grant-free uplink radio resources; and
      send, via the re-activated grant-free uplink radio resources, one or more data packets; and
   wherein the base station is configured to:
      send, to the wireless device, the at least one radio resource control message;
      send, to the wireless device, the timing advance command; and
      receive, via the grant-free uplink radio resources, the one or more data packets.

47. The system of claim 46, wherein the one or more configuration parameters further indicate at least one of:
   demodulation reference signal configuration parameters;
   a radio network temporary identifier; or
   a preamble identifier.

48. The system of claim 46, wherein the wireless device is configured to send the one or more data packets according to a modulation and coding scheme, wherein the one or more configuration parameters comprise the modulation and coding scheme.

49. The system of claim 46, wherein the wireless device is configured to send, based on a quantity of permitted repeat transmissions, the one or more data packets, wherein the one or more configuration parameters comprise the quantity of permitted repeat transmissions for the one or more data packets.

50. The system of claim 46, wherein the wireless device is configured to receive a response message associated with the one or more data packets, wherein the response message comprises downlink control information.

* * * * *

UNITED STATES PATENT AND TRADEMARK OFFICE
CERTIFICATE OF CORRECTION

PATENT NO. : 11,405,978 B2
APPLICATION NO. : 17/024162
DATED : August 2, 2022
INVENTOR(S) : Jeon et al.

It is certified that error appears in the above-identified patent and that said Letters Patent is hereby corrected as shown below:

On the Title Page

Page 2, Column 1, Other Publications, Line 19:
Delete "Dontrol" and insert --Control-- therefor Page 3, Column 1, Other Publications, Line 51:
Delete "R2-1707Z47" and insert --R2-1707247-- therefor Page 3, Column 1, Other Publications, Line 54:
Delete "R2-1707Z68" and insert --R2-1707268-- therefor Page 3, Column 1, Other Publications, Line 57:
Delete "Quingdao," and insert --Qingdao,-- therefor Page 3, Column 1, Other Publications, Line 60:
Delete "R2-170873Z" and insert --R2-1708732-- therefor Page 3, Column 1, Other Publications, Line 64:
Delete "Z017," and insert --2017,-- therefor Page 3, Column 1, Other Publications, Line 66:
Delete "R2-17091Z5" and insert --R2-1709125-- therefor Page 4, Column 1, Other Publications, Line 20:
Delete "Remaing" and insert --Remaining-- therefor In the Drawings Sheet 7 of 21, FIG. 7, Reference Numeral 723, Lines 1-4:
Delete "DL-SCH of SCH" and insert --DL-SCH of SCG-- therefor Signed and Sealed this
Third Day of October, 2023

Katherine Kelly Vidal
*Director of the United States Patent and Trademark Office*

Sheet 7 of 21, FIG. 7, Reference Numeral 724, Lines 1-3:
Delete "UL-SCH of SCH" and insert --UL-SCH of SCG-- therefor In the Specification Column 7, Detailed Description, Line 56:
After "selection", insert --.-- therefor Column 12, Detailed Description, Line 28:
Delete "534" and insert --535-- therefor Column 12, Detailed Description, Line 31:
Delete "535A and 535B" and insert --536A and 536B-- therefor Column 12, Detailed Description, Line 34:
Delete "536A and 536B" and insert --537A and 537B-- therefor Column 13, Detailed Description, Line 9:
Delete "621" and insert --620-- therefor Column 13, Detailed Description, Line 56:
After "bearer", insert --.-- therefor Column 14, Detailed Description, Line 41:
Delete "(HARM)" and insert --(HARQ)-- therefor Column 15, Detailed Description, Line 43:
Delete "PDDCH" and insert --PDCCH-- therefor Column 15, Detailed Description, Line 47:
Delete "PDDCH" and insert --PDCCH-- therefor Column 20, Detailed Description, Line 61:
Delete "1312, 1312," and insert --1312, 1313,-- therefor Column 32, Detailed Description, Line 38:
After "reduced", insert --.--